(12) United States Patent
Takahashi et al.

(10) Patent No.: US 7,113,269 B2
(45) Date of Patent: Sep. 26, 2006

(54) ANGLE MEASURING DEVICE, OPTICAL SWITCHING SYSTEM, AND INFORMATION RECORDING/REPLAYING SYSTEM

(75) Inventors: Junko Takahashi, Sagamihara (JP); Koichi Takahashi, Tokyo (JP)

(73) Assignee: Olympus Corporation, Tokyo (JP)

( * ) Notice: Subject to any disclaimer, the term of this patent is extended or adjusted under 35 U.S.C. 154(b) by 436 days.

(21) Appl. No.: 10/740,554

(22) Filed: Dec. 22, 2003

(65) Prior Publication Data

US 2005/0057746 A1 Mar. 17, 2005

(30) Foreign Application Priority Data

Dec. 27, 2002 (JP) ............................. 2002-381904

(51) Int. Cl.
*G01B 11/26* (2006.01)
(52) U.S. Cl. .................................. 356/138; 356/139.05
(58) Field of Classification Search ................ 356/138, 356/139.05, 139.04; 33/1 N
See application file for complete search history.

(56) References Cited

U.S. PATENT DOCUMENTS

RE37,175 E * 5/2001 Takahashi ................... 359/631

FOREIGN PATENT DOCUMENTS

| JP | 8-227552 | 9/1996 |
|---|---|---|
| JP | 11-144273 | 5/1999 |
| JP | 11-144274 | 5/1999 |

* cited by examiner

*Primary Examiner*—Gregory J. Toatley, Jr.
*Assistant Examiner*—Roy M. Punnoose
(74) *Attorney, Agent, or Firm*—Kenyon & Kenyon LLP

(57) ABSTRACT

A cemented optical element is disposed on a test sample and a laser light which is emitted from a laser light source section is incident into a prismatic plane so as to separate the laser light into a reflected light on the separating plane and a transmitted light on the separating plane on a light path separating plane. The reflected light on the separating plane passes through a prismatic plane so as to be condensed on a light receiving plane. The transmitted light on the separating plane is reflected on a reflecting plane having power so as to be condensed. Spots are formed on the light receiving planes which came through the prismatic plane. Sensitiveness for measuring angles can be changed while changing the length of the light path and the power.

33 Claims, 21 Drawing Sheets

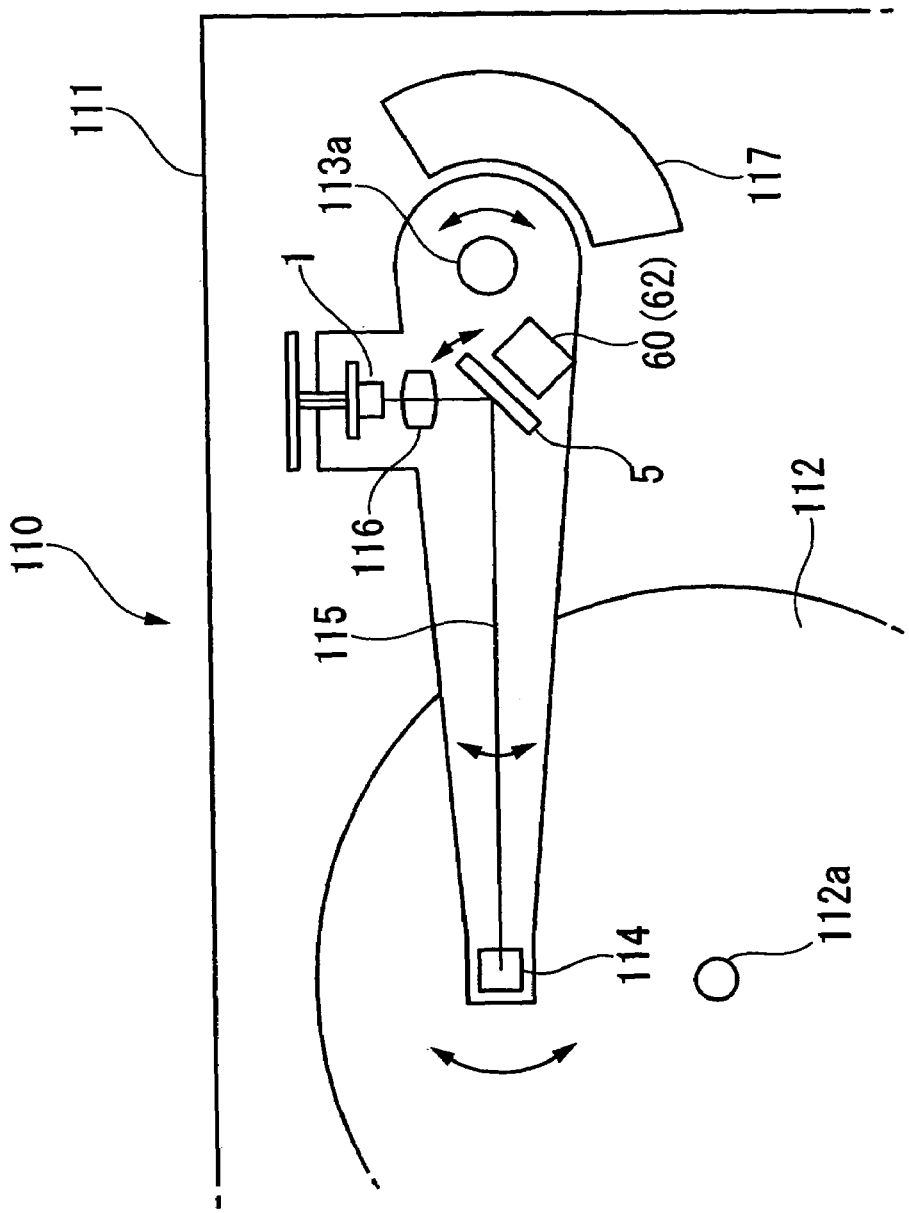

ANGLE MEASURING DEVICE, OPTICAL SWITCHING SYSTEM, AND INFORMATION RECORDING/REPLAYING SYSTEM

Priority is claimed to Japanese Patent Application No. 2002-381904, filed Dec. 27, 2002, the content of which is incorporated herein by reference.

BACKGROUND OF THE INVENTION

1. Field of the Invention

The present invention relates to an angle measuring device, an optical signal switching system, and an information recording/replaying system.

2. Description of Related Art

It has been known that, in a conventional angle measuring device, a light is emitted onto a reflecting plane for a measurement which is disposed on a part of a test sample from a predetermined position and a position of a reflected light is measured so as to measure an angle of the test sample with reference to a predetermined position.

For example, in pages 2 to 3, FIGS. 1, 2 of Japanese Unexamined Patent Application, First Publication No. Hei 8-227552, an optical measuring device is disclosed which is provided with a measuring section which has four-divided light receiving planes for measuring an inclination between a disk (disk information recording medium) and an optical head to which information is recorded and measuring a thickness of a disk protecting layer. The four-divided measuring section emits a light to a disk from an optical element and receives a reflected light. The four-divided measuring section outputs an electric signal which corresponds to an amount of the received light on the light receiving planes respectively so as to measure a central position of the reflected light which is disposed in a center of a four-divided light receiving plane according to a proportional relation of the electric signals. In addition, the four-divided measuring section measures an inclination of the disk according to a shift amount of the disk in a radial direction and a thickness of the disk protecting layer according to a shift amount of the disk in a tangential direction.

Also, in pages 3 to 4, FIGS. 6 and 9 in a Japanese Unexamined Patent Application, First Publication No. Hei 11-144274, a deviation angle measuring device is disclosed in which an angle measurement light is incident onto a back plane of a galvanic mirror, a reflected light therefrom is separated into two light fluxes by a light flux separating section which is provided with a separating plane of which reflecting ratio changes according to the incident angle. Amount of light fluxes are measured independently by the light measuring devices; thus a deviated angle on the galvanic mirror is measured. Thus, a measuring accuracy can be improved by using a measurement output A which increases in accordance with a decrease of the incident angle onto the separating plane and a measurement output B which decreases in accordance with a decrease of the incident angle so as to calculate a difference "A–B".

Also, for a system on which such an angle measuring device is carried which is used for controlling a deviated angle of an light deviating element, for example, an optical signal switching system, or an information recording/replaying system using a laser which are used for an optical communication are known.

SUMMARY OF THE INVENTION

In an aspect of the present invention, angle measuring device which measures an inclination angle of a test sample comprises a light source for emitting a light, a light separating/deviating section which is disposed so as to be tilted in coordination with an inclination angle of the test sample and provided with a plurality of optical planes including an optical path separating plane for separating a light into a reflected light flux and a transmitted light flux and a reflecting plane for reflecting any one of the separated light which is separated on the optical path separating plane so as to emit a plurality of light flux formed by a light which is incident from the light source, and a plurality of light measuring device which receive a plurality of the light flux which are emitted from the optical path separating/deviating section so as to measure the inclination angles of the test samples independently.

Here, in a specification for the present invention, it is understood that an inclination of the test sample is measured with reference to a reference plane which is set preferably; thus, such a reference plane is not limited to a specific reference plane such as a horizontal plane, or a vertical plane.

In an aspect of the present invention, an angle measuring device which measures an inclination angle of a test sample comprises a light source for emitting a light toward a reflecting plane for a measurement which is provided on the test sample, a light separating section having a plurality of optical planes as an eccentric optical plane in which any one of optical planes, which has refractive power, is disposed eccentrically including an optical path separating plane for separating a light into a reflected light flux and a transmitted light flux so as to emit a plurality of light flux after the light reflected in respect of the reflecting plane for a measurement carries out incidence, and a plurality of light measuring device which receive a plurality of the light flux which are emitted from the optical path separating/deviating section so as to measure the inclination angles of the test samples independently.

In an aspect of the present invention, it is preferable that diameters in the light flux on the light-receiving planes in a plurality of the light measuring devices are different from each other.

In an aspect of the present invention, it is preferable that sensitiveness for measuring angles by a plurality of the light measuring devices are different from each other.

In an aspect of the present invention, it is preferable that ranges for measuring angles by a plurality of light measuring devices are different from each other.

In an aspect of the present invention, it is preferable that a light-receiving plane which is randomly selected among a plurality of light measuring devices is disposed near one of the rest of the light-receiving planes.

In an aspect of the present invention, it is preferable that the light-receiving planes of a plurality of the light measuring devices are disposed on an approximate plane.

In an aspect of the present invention, it is preferable that lengths of optical paths are different from each other between the length of the optical path between the light-receiving plane of the light measuring device in an optical path which is reflected on the light separating pane and directed toward the light measuring device and the light path separating plane and the length of the optical path between the light-receiving plane of the light receiving device in a light path which is directed toward the other light measuring device in the light measuring device after transmitted through the light path separating plane and the light path separating plane.

In an aspect of the present invention, it is preferable that at least an optical plane among a plurality of the optical planes has a refractive power.

In an aspect of the present invention, it is preferable that the optical plane having a refractive power is a reflective plane.

In an aspect of the present invention, it is preferable that the optical plane having a refractive power is an eccentric optical plane which is disposed eccentrically.

In an aspect of the present invention, it is preferable that the light path separating plane is an eccentric optical plane in which an optical plane having a refractive power is disposed eccentrically.

In an aspect of the present invention, it is preferable that the optical plane having a refractive power has a positive refractive power.

In an aspect of the present invention, it is preferable that the optical plane having a refractive power is an aspherical plane.

In an aspect of the present invention, it is preferable that eh optical plane having a refractive power is a free-form-surface.

In an aspect of the present invention, it is preferable that an optical element having a positive refractive power for condensing a light which is emitted from the light source between the light source and the light separating plane.

In an aspect of the present invention, it is preferable that the optical plane having a refractive power is disposed between the light source, the optical plane having a refractive power is disposed in a light path of a reflected light flux, and the optical plane having a refractive power is disposed in a light path of the transmitted light flux.

In an aspect of the present invention, it is preferable that at least two optical planes among a plurality of the optical planes are disposed so as to face each other approximately such that the optical path may be folded in a zigzag manner.

In an aspect of the present invention, it is preferable that at least an optical plane among a plurality of the optical planes is a reflecting plane so as to reflect entire light which is incident to the reflecting plane.

In an aspect of the present invention, it is preferable that at least an optical plane among a plurality of the optical planes is formed by a prism member.

In an aspect of the present invention, it is preferable that a plurality of the optical planes are formed so as to be united to the prism member.

In an aspect of the present invention, it is preferable that the light path separating plane is formed by a beam splitter.

In an aspect of the present invention, it is preferable that the light separating plane is formed by a light deviating/separating plane for separating the light path by a deviating component.

In an aspect of the present invention, it is preferable that the light deviating/separating plane is formed by a light deviating beam splitter.

In an aspect of the present invention, it is preferable that at least a light measuring device among a plurality of the light measuring devices is a four-divided light receiving device which is provided with a light receiving plane which is divided into four sections.

In an aspect of the present invention, it is preferable that at least a light measuring device among a plurality of the light measuring devices is a two-dimensional position detecting light receiving device.

In an aspect of the present invention, it is preferable that at least a light measuring device among a plurality of the light measuring devices is a two-dimensional CCD.

In an aspect of the present invention, it is preferable that a plurality of the light measuring devices include a four-divided light receiving device which is provided with a light receiving plane which is divided into four sections and a two-dimensional position detecting light receiving device.

In an aspect of the present invention, it is preferable that a plurality of the light measuring devices include a four-divided light receiving device which is provided with a light receiving plane which is divided into four sections and a two-dimensional CCD.

In an aspect of the present invention, it is preferable that the light source is a laser light source.

In an aspect of the present invention, an optical signal switching system for switching a light path for an optical signal which is transmitted from a light transmission path to other light transmission path among a plurality of the light transmission paths comprises a light deviating element for switching a light path for the optical signal, a reflecting plane which is disposed to the light deviating element unitarily for measuring a deviating angle in the light deviating element, an angle measuring device according to Claim 31 for measuring a deviated angle of a test sample such as a light deviating element, and a deviating angle measuring device for controlling the deviated angle of the light deviating element according to the deviated angle which is measured by the angle measuring device.

In an aspect of the present invention, an information recording/replaying system which performs a recording operation and/or a replaying operation of the information signal on a recording medium having a recording plane on which the recording operation and/or the replaying operation can be operated by emitting a light comprises a light source, an optical system in which a light flux is focused on the recording plane on the recording medium, a light deviating element which is provided with a reflecting plane for a measurement which is disposed in the optical system so as to deviate the light flux in a surface parallel with the recording plane and change an inclination angle of the reflecting plane synchronously according to the deviated angle, and an angle measuring device according to Claim 31 for measuring an inclination of the test sample such as the light deviating element.

BRIEF DESCRIPTION OF THE DRAWINGS

FIG. 22 is a plan view for explaining a general structure of an information recording/replaying system according to a fourth embodiment of the present invention.

DETAILED DESCRIPTION OF THE INVENTION

Figure 1:
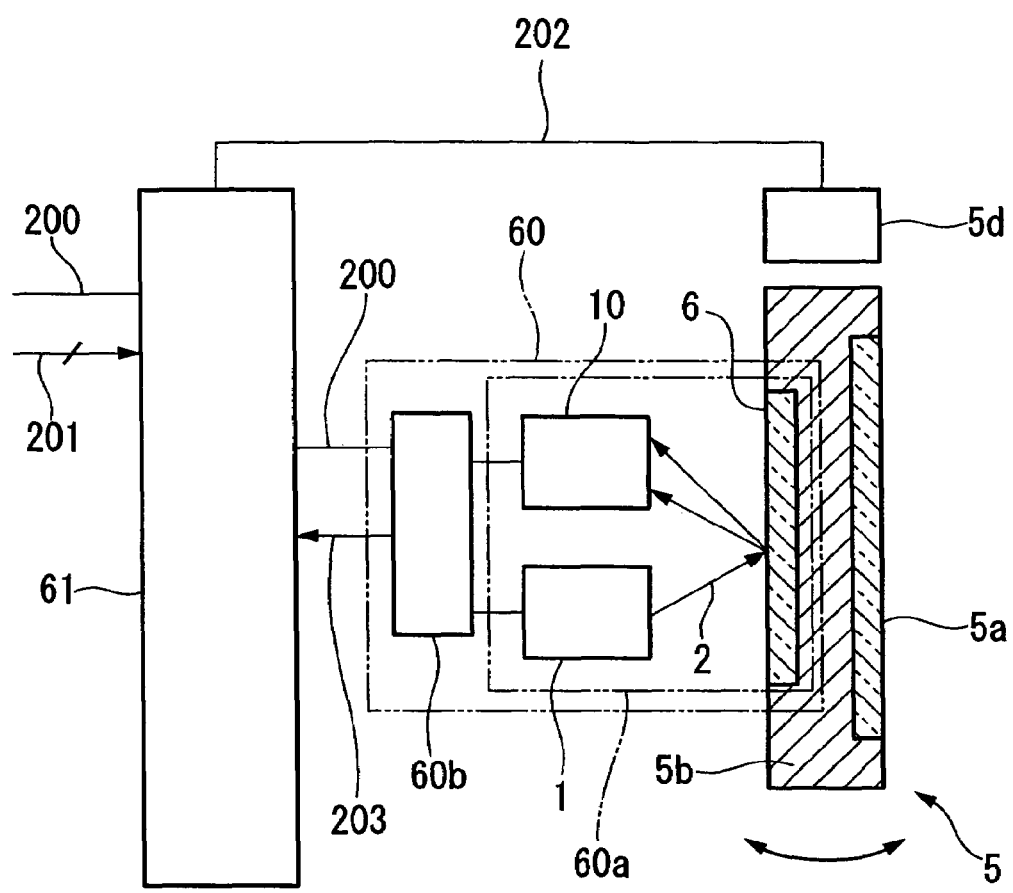
FIG. 1 is a view for showing a general concept for a structure of an angle measuring device according to a first embodiment of the present invention.

Embodiments of the present invention are explained as follows with reference to attached drawings. The same reference numeral is added to the same member through all of drawings. Therefore, explanation for the member having the same reference numeral is omitted.

First Embodiment

An angle measuring device according to a first embodiment of the present invention is explained. FIG. 1 is a view for explaining a general structure of an angle measuring device 60 according to the first embodiment of the present invention. FIG. 2 is a view for explaining a general structure of a light path in a measuring optical system 60a which is used in the angle measuring device 60.

The angle measuring device 60 according to the first embodiment of the present invention comprises a measuring optical system 60a and a signal processing section 60b. For a general structure, the measuring optical system 60a comprises a laser light source section 1 (light source), a light path separating/deviating section 6, and a light measuring section 10. In the measuring optical system 60a, a laser light 2 which is emitted from the laser light source section 1 is emitted on the light path separating/deviating section 6 which is disposed on an object (test sample) of which angle is measured. A light which is reflected on the light path separating/deviating section 6 is received on a light measuring section 10; thus, a plurality of independent angle-measuring operations are performed. The received signals are processed in the signal processing section 60b; thus, a measured level signal 203 which depends on an inclination of the light path separating/deviating section 6 is outputted.

The measurement level signal 203 is outputted to a deviated angle controlling section 61 for controlling the deviated angle of a deviating mirror 5a so as output a driving signal 202 from the deviated angle controlling section 61 to an actuator 5d. Here, a power supply voltage 200 is supplied from power supply which is not shown in the drawing so as to drive an angle measuring device 60 and a deviated angle controlling section 61.

In an example shown in FIG. 1, the test sample in the angle measuring device 60 is a rotating mirror 5 (light deviating element).

The rotating mirror 5 is, for example, formed by a galvanic mirror in which surface-reflecting plane mirrors are embedded in a front plane and a back plane of a plate supporting member 5b unitarily. A deviating mirror plane 5a is disposed on a front plane of the supporting member 5b so as to deviate the light. A light path separating/deviating section 6 is attached on a back plane of the supporting member 5b so as to measure the angle. Thus, the deviated angle on the deviating mirror 5a can be changed by the actuator 5d which is commonly know as an electromagnetic coil.

Here, in FIG. 1, it is described such that the light path separating/deviating section 6 is embedded in the supporting member 5b for a purpose of clarifying a concept of the present invention. That is, the present invention is not limited to a case in which the light path separating/deviating section 6 must be embedded in the supporting member 5b. Also, the light path separating/deviating section 6 may be fixed to the supporting member 5b or attached to the supporting member 5b detachably as long as the light path separating/deviating section 6 can be inclined according to the inclination (deviated angle) of the deviating mirror plane 5a synchronously.

A center for a rotation of the rotating mirror 5 can be disposed on any one of the deviating mirror plane 5a, the reflecting plane 5c for measurement, or a middle of the deviating mirror plane 5a and the reflecting plane 5c for measurement under condition that a designed position of a center for a rotation of the light path separating/deviating section 6 and a position of a center for a rotation of the rotating mirror coincide.

Next, an angle measurement device 60 according to the present embodiment is explained in detail.

First, a measuring optical system 60a is explained with reference to an approximate light path shown in FIG. 2.

Here, XYZ coordinate system is used according to a necessity for describing a direction. The XYZ coordinate system is an orthogonal coordinate system for describing a light path. A Z-axis is an optical axis in which a progressing direction of a light indicates a positive direction so as to indicate an axial principal ray. An X-direction is an axis orthogonal to the Z-axis in which a near side of the drawing indicates a positive direction. A Y-axis is formed by rotating the X-axis by 90° clockwise viewed from a positive direction of the Z-axis. Here, a counter-clockwise direction indicates a positive rotation under condition that an axis is viewed from a positive direction.

Figure 2A:
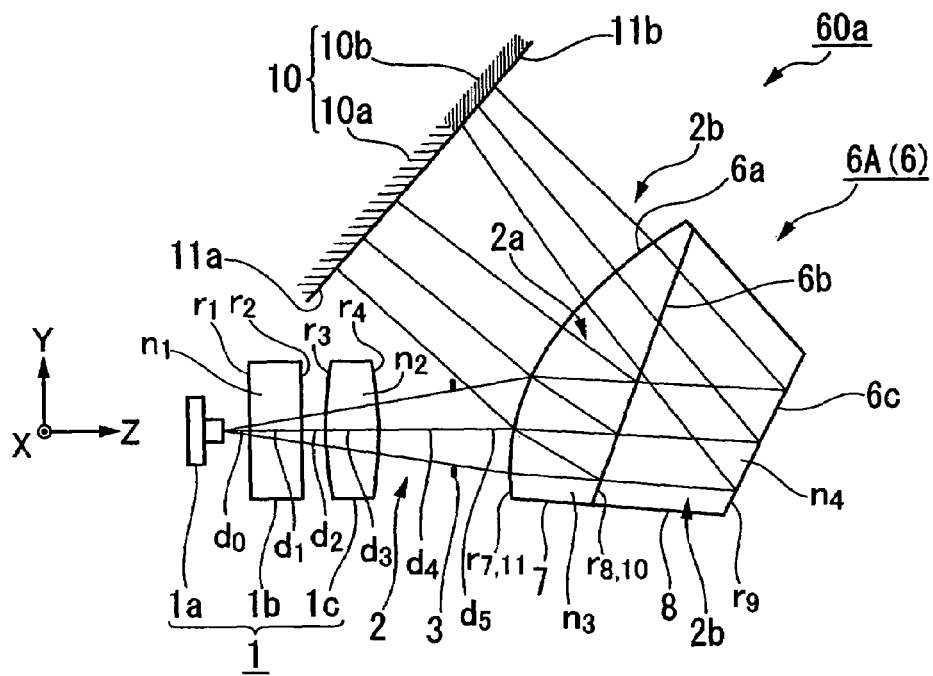
FIGS. 2A and 2B are general views for a light path for explaining a general structure for a measuring optical system which is used for an angle measuring device according to the first embodiment of the present invention.
Figure 2B:
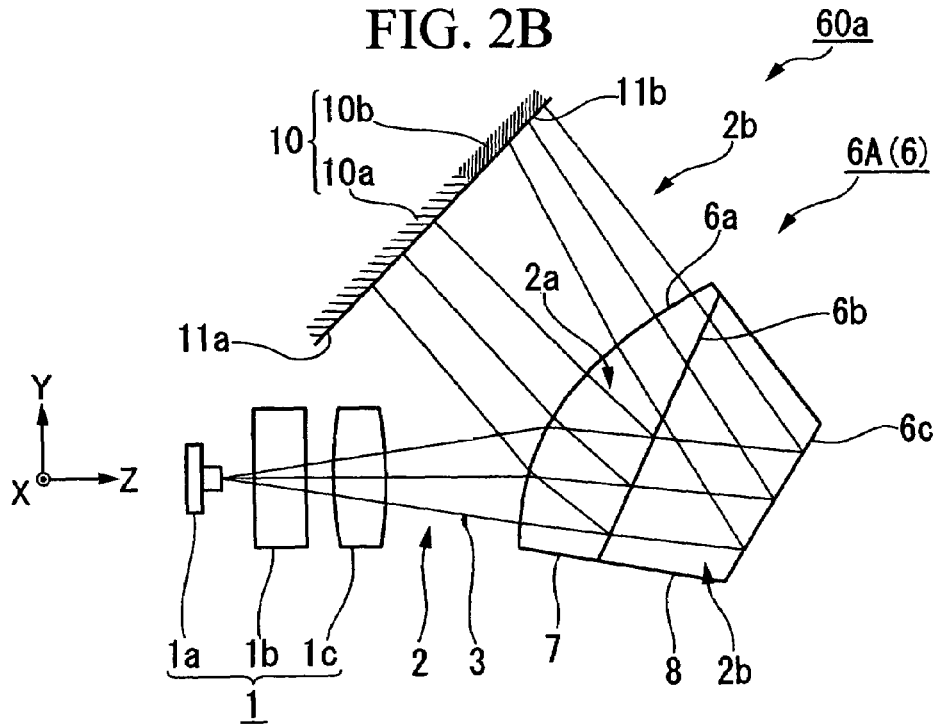

FIGS. 2A and 2B show light paths under condition that the light path separating/deviating sections 6 are rotated by +2° and −2° around the X-axis from a neutral position.

A laser light source section 1 is provided with a semiconductor laser 1a, a cover glass 1b, and a light condensing lens 1c. The semiconductor laser 1a is a light source for emitting a predetermined intensity of laser light 2 to the light path separating/deviating section 6. For a wavelength of the semiconductor laser 1a, any preferable wavelength can be employed according to an optical characteristics in the light path separating/deviating section 6 and a sensitiveness of the light measuring section 10 which are explained later.

The cover glass 1b is a parallel glass plate so as to be disposed approximately orthogonally to the optical axis in a light path of the semiconductor laser 1a so as to prevent a deterioration of the semiconductor laser 1a and protect an element. Although such a cover glass 1b is attached to a packaged element usually, the cover glass is not a structure which is absolutely necessary. For example, it is not necessary to dispose a cover glass in a case in which a port for emitting a laser can be sealed by a light condensing lens 1c which is explained hereinafter.

The light condensing lens 1c is an optical element which is disposed for forming a dispersing light from the semiconductor laser 1a into a light flux which spreads in a predetermined angle. Thus, such a light condensing lens 1c can be used for a light emitting source having various numeral apertures.

In the present embodiment, for example, a biconvex lens having a positive power is used so as to realized a more converged transmitted laser light 2. A diaphragm 3 is disposed on an optical axis in a rear stage of the light condensing lens 1c. The diaphragm 3 is disposed so as to shape a spot diameter of the laser light 2 and organize a disposition of light amount. For example, any diaphragm having a round shape, oval shape can be employed for compensating a disposition of light amount preferably. It is not necessary to dispose the diaphragm 3 in a case in which a spreading light flux which depends on a spreading angle of the semiconductor laser 1a or a numerical aperture of the light condensing lens 1c are utilized under unchanged condition. Such a laser light source section 1 is fixed in a position for emitting a laser light 2 toward a predetermined position in the light path separating/deviating section 6 when the deviating mirror plane 5a is in a neutral position.

The light path separating/deviating section 6 is a section for separating a light path of the laser light 2 into a reflected light 2a on the separating plane (reflected light flux) and a transmitted light 2b through the separating plane (transmitted light flux) when the laser light 2 is incident which is emitted form the laser light source 1 so as to emit a plurality of light fluxes according to a deviated angle on the deviating mirror plane 5a.

In the present embodiment, a cemented optical element 6A is employed which is provided with a plurality of optical planes having optical functions such as a refraction, reflection, and a separation of light path.

The cemented optical element 6A is an optical element which is provided with a prismatic plane 6a, a light-path-separating plane 6b and a reflecting plane 6c (post-separation reflecting plane) which are disposed so as to have a predetermined plane interval and eccentricity in an order from near the laser light source section 1 toward therefar. For example, it is possible to employ a structure in which a prism 7 which has the same shape of plane as those on the prismatic plane 6a and the light path separating plane 6b and a prism 8 which has the same shape of plane as those on the reflecting plane 6c and the light-path separating plane 6b are cemented together such that the planes which have the same shape as those in the prisms 7 and 8 are cemented together tightly. For members which are used for the prisms 7 and 8, it is possible to employ a glass nitrifier and a synthetic resin which have a preferable refractive index. Here, the same members can be used compatibly, and different members can be used according to necessity.

The prismatic plane 6a serves an emitting plane for emitting a plurality of light fluxes which are emitted from an incident plane of the laser light 2 and the cemented optical element 6A such that a plurality of light fluxes form a preferable spot diameter (light flux diameter) on a light receiving plane on the light measuring section 10 which is explained later.

Therefore, various structures can be employed for a disposition of the light measuring section 10 (hereinafter a spot of the light flux on the light receiving plane is described as a spot. Also, the spot diameter under such a condition is described as a spot diameter).

In the present embodiment, the prismatic plane 6a has a positive power such that the laser light 2 be an approximate parallel light so as to be condensed when the reflected light 2a on the separating plane and the transmitted light 2b through the separating plane are emitted. The prismatic plane 6a is disposed so as to be eccentric to the optical axis of the laser light source section 1 so as to introduce the emitted light on the light receiving section. Consequently, an approximate spot diameter is maintained uniformly even if the cemented optical element 6a inclines and the light flux is incident in a different position. Simultaneously, the prismatic plane 6A is a free-form-surface so as to be rotationally asymmetrical such that the spot moves approximately symmetrical according to the inclination from the neutral position. Also, such a free-form-surface is used for compensating for an extraordinary eccentric aberration which is caused on an eccentric reflecting plane.

The light path separating/deviating section 6b is an optical plane for separating the laser light 2 which is collimated into an approximate parallel light on the prismatic plane 6a in to the reflected light 2a on the separating plane and the transmitted light 2b through the separating plane in two light paths. In the present embodiment, for example, a reflecting coating layer which transmits approximately 50% of the laser light 2 and reflects approximately 50% of the laser light 2 is disposed between the prisms 7 and 8.

Consequently, the incident angle of the laser light 2 is disposed so as to be at a predetermined angle θ in a neutral position of the deviating mirror plane 5a such that the laser light source section 1 and the light measuring section 10 can be disposed close to each other. In the present embodiment, θ is smaller than 45° so as to form a compact device by disposing the laser light source section 1 and the light measuring section 10 close to each other. It is preferable that the light path separating plane 6b be a free-form-surface which includes an aspherical section which has a positive power on an opposite region of the free-form-surface so as to improve uniformity of the symmetry of the spot movement amount and the spot diameter.

The reflecting plane 6c is a back reflecting plane which is disposed on the prism 8 eccentrically so as to reflect the transmitted light 2b through the separating plane and emit the reflected light toward the outside of the light path separating/deviating section 6A via the light path separating/deviating section 6b and the prismatic plane 6a. The reflecting plane 6c has a positive power for condensing the transmitted light 2b through the separating plane. By disposing such a reflecting plane which is disposed eccentrically, there is an advantage in that it is possible to fold the light path compactly.

It is preferable that the inclination of the reflecting plane 6c with reference to the optical axis be equal to the inclination on the light path separating/deviating section 6b, or slightly larger than the inclination on the light path separating/deviating section 6b so as to return the transmitted light 2b through the separating plane to a position which is in line with the reflected light 2a on the separating plane horizontally.

Also, it is preferable that the reflecting plane 6c be a free-form-surface which includes a section of aspherical plane similarly to a case of the light path separating/deviating section 6b. By forming such a free-form-surface, there is an advantage in that it is possible to compensate an extraordinary eccentric aberration which is caused on an eccentric reflecting plane.

The light measuring section 10 comprises light measuring devices 10a and 10b which are four-divided light receiving devices having light receiving planes which are divided in four sections such that the light receiving planes 11a and 11b are disposed so as to neighbor on an approximate plane in an array, and an optical direction is disposed in a middle position between a focal plane of the optical system which is formed by the laser light source section 1 and the cemented optical element 6A and the prismatic plane 6a.

Figure 3:
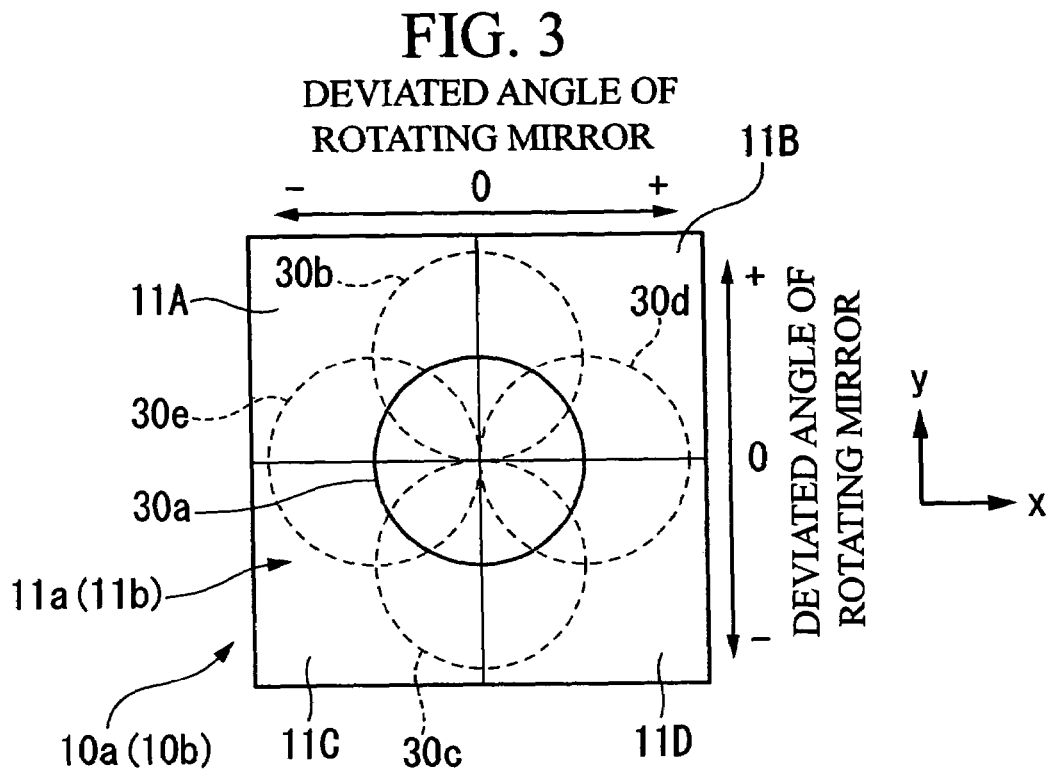
FIG. 3 is a view for explaining a light receiving device (four-division light receiving device) which is viewed in an optical axis which is used in the present invention.

FIG. 3 is a view for explaining the light measuring device 10a (10b) viewed in an optical axis. The light measuring devices 10a (10b) is a light receiving element in which the light receiving plane 11a (11b) are divided into four light receiving sections 11A, 11B, 11C, and 11D so as to be disposed to be neighbored with each other such that a cross border be formed on a same plane. The light receiving sections 11A, 11B, 11C, and 11D are formed by a photodiodes (hereinafter called as PD) which can respectively measure the light amount independently. The light receiving sections 11A, 11B, 11C, and 11D can measure the light amount of the light flux which are emitted to each region respectively and output the measured signal.

The light receiving sections 11A and 11B are disposed so as to be neighbored to each other in the x direction under condition that the directions for detecting the positions are set such that x direction and the y direction are disposed as shown in the drawing. The light receiving sections 11C and 11D are disposed so as to be neighbored therefurther.

Furthermore, the light receiving sections 11A and 11C are disposed so as to be neighbored in the y direction. The light receiving sections 11B and 11D are disposed so as to be neighbored therefurther. In addition, the light receiving sections 11A, 11B, 11C, and 11D are disposed so as to be orthogonal to an optical axis under condition that the cemented optical element 6A is in a neutral position such that the optical axis is disposed so as to cross the crossing point on the border which is formed by the light receiving sections 11A, 11B, 11C, and 11D.

In the signal processing section 60b (see FIG. 1), and electric circuit is disposed which drives the semiconductor laser 1a so as to illuminate a light, supplies an electricity to the light measuring devices 10a and 10b so as to extract the measured signal according to the light amount. In the electric circuit, preferable processes such as an amplification, rectification, and calculation are performed to the measured signals; thus, a measured level signal 203 is outputted.

Next, operations in the angle measuring device 60 according to the present embodiment is explained.

First, a case in which the cemented optical element 6A is rotated by 2° from the neutral position to the positive direction around the X-axis direction with reference to the FIG. 2A. The laser light 2 which is emitted from the semiconductor laser 1a and transmitted through the cover glass 1b is further transmitted through the light condensing lens 1c in the laser light source section 1 such that the laser light 2 is shaped to be a light flux which spreads in a predetermined angle by the light condensing factor therein. Furthermore, the diameter of the light flux in the laser light 2 is shaped preferably by the diaphragm 3 so as to be emitted toward the cemented optical element 6A.

The laser light 2 is condensed on the prismatic plane 6a and shaped to be an approximate parallel light. The laser light 2 progresses in the prism 7 while deviating from an optical axis of the laser light source section 1 according to the eccentricity on the prismatic plane 6a. Furthermore, when the laser light 2 reaches to the light path separating/deviating section 6b, approximately 50% of the laser light 2 is reflected as a reflected light 2a on the separating plane. On the other hand, approximately 50% of the laser light 2 is transmitted as a transmitted light 2b through the separating plane; thus, the laser light 2 is separated into two light paths.

The reflected light 2a on the separating plane is condensed by a positive power of the light path separating/deviating section 6b in a light path (hereinafter called a first light path) in which the reflected light 2a on the separating plane progresses so as to be reflected toward the prismatic plane 6a. The reflected light 2a on the separating plane is further condensed by a positive power on the prismatic plane 6a and refracted in a predetermined direction so as to be emitted to an outside of the cemented optical element 6A. Thus, the reflected light 2a on the separating plane forms a spot in a middle position between a spot 30a and a spot 30c on a light receiving plane 11a shown in FIG. 3.

As far as a light path (hereinafter called a second light path) for the transmitted light 2b through the separating plane, the transmitted light 2b through the separating plane progresses in the prism 8 until the transmitted light 2b through the separating plane is reflected by the reflecting plane 6c into the same direction as that of the reflected light 2a on the separating plane or a slightly far direction. The transmitted light 2b through the separating plane is further condensed by a positive power on the reflecting plane 6c so as to be transmitted through the light path separating plane 6b so as to progress in the prism 7 the transmitted light 2b through the separating plane transmits through the prismatic plane 6a and receives the positive power on the prismatic plane 6a; thus, the transmitted light 2b through the separating plane is condensed further so as to be emitted to an outside of the cemented optical element 6A.

Consequently, the transmitted light 2b through the separating plane forms a spot in a middle position between the spot 30a and the spot 30c on the light receiving plane 11b in FIG. 3.

Here, when the transmitted light 2b through the separating plane transmits through the light path separating plane 6b, the transmitted light 2b through the separating plane progresses if there is not a difference between the refractive index in the prism 7 and the refractive index in the prism 8. More importantly, it may be acceptable if the refractive indice are differentiated so as to receive the power on the light path separating plane 6b according to necessity.

Next, as shown in FIG. 2B, in a case in which the cemented optical element 6A is rotated by 2° in a negative direction of the X axis from the neutral position, the cemented optical element 6A inclines toward the opposite direction to the above case in that the spots on the light receiving planes 11a and 11b are formed on a different positions from the above case because the light path separating/deviating section 6b and the reflecting plane 6c changes inclining direction. That is, in FIG. 3, these spots are formed in middle positions between the spots 30a and 30b.

By doing this, the transmitted light 2b through the separating plane is forded on the reflecting plane 6c so as to be emitted approximately in parallel with the reflected light 2a on the separating plane. Therefore, it is possible to dispose the light measuring devices 10a and 10b on a same plane in an array while maintaining a length of the second light path to be longer than that of the first light path.

In addition, the spot diameter of the transmitted light 2b through the separating plane is maintained so as to be smaller than that of the reflected light 2a on the separating plane on the light receiving planes 11a and 11b respectively. By doing this, the spot diameter of the reflected light 2a on the separating plane with reference to the light measuring device 10a is relatively large; thus, a measuring range in the four-divided light receiving devices can be broadened. Oh the other hand, the spot diameter of the transmitted light 2b through the separating plane with reference to the light measuring device 10b is relative small; thus, it is preferable for a precise measurement because a measuring range in the four-divided light receiving devices can be narrowed.

Next, a theory for measuring a position of the four-divided PDs is explained. It is assumed that outputs from the light receiving sections 11A, 11B, 11C, and 11D are A, B, C, and D under condition that a spot is emitted on the light receiving plane 11a (11b). Under such a condition, an output which corresponds to the position in the x direction can be obtained by calculating a formula such as (A+B−C−D)/(A+B+C+D). Also, an output which corresponds to the position in the y direction can be obtained by calculating a formula (A+B−C−D)/(A+B+C+D). The measured signals according to these outputs are obtained in a preferable linear response as long as the spot shape is uniform. If it is not possible to obtain a preferable linear response, it is possible to correct these outputs preferably by performing a calculating operations or by a signal processing operation in a circuit in the signal processing section 60b according to the spot shape and the light amount distribution.

Consequently, the inclination of the cemented optical element 6A is calculated in the signal processing section 60b according to a shift amount which corresponds to the measured signal which is transmitted from the measuring optical system 60a and a length of a predetermined light path between the cemented optical element 6A and the light receiving plane 11a (11b). The shift amount of the inclination is measured in a two dimensional manner; thus, the inclination of the cemented optical element 6a is also measured as a two-dimensional inclination around the X-axis and the Y-axis.

Here, the shift amount can be measured by the four-divided light receiving device as long as the cross point of the borders on the four-divided light receiving device are included in the spot. Therefore, the measurement of the shift amount is limited in a moving range of the spot diameter. Thus, it is possible to measure a larger range in proportion with the spot diameter in the four-divided light receiving device.

Figure 4:
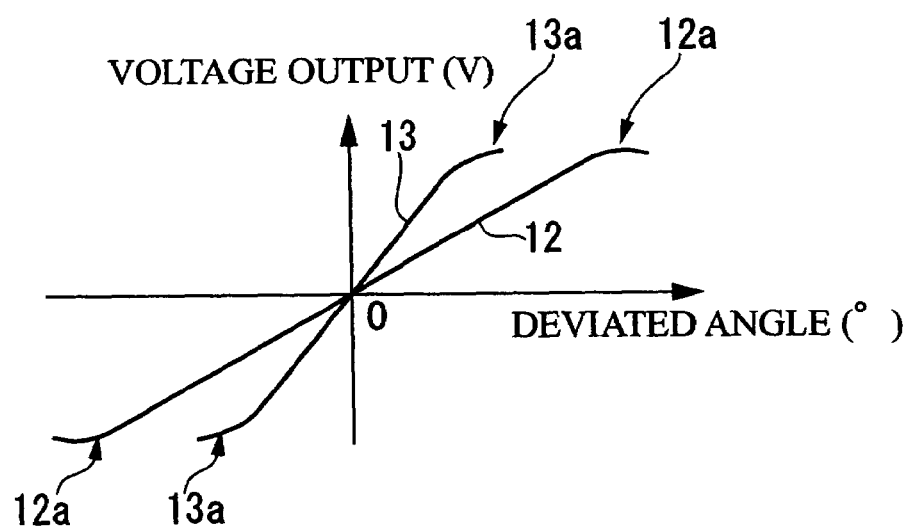
FIG. 4 is a graph for showing an example for a detected signal in the light receiving device which is used in the present invention.

FIG. 4 is a graph for showing an example for a measured signal. In the graph, a horizontal axis indicates a deviated angle of the rotating mirror 5 (inclination of the light path separating/deviating section 6) around the X-axis. Here, the inclination is indicated by "°". A vertical axis indicates a voltage output of the measured signal. Here, the voltage output is indicated by volt (V).

Response curves 12 and 13 indicate the measured signals from the light measuring devices 10a and 10b respectively. Both response curves indicate a monotone increase which passes an origin of the coordinate. It is understood that the response curves indicate a linear increase in an entire part of the response curve. Also, it is understood that non-linear response regions 12a and 12b in which the inclination of the graph become moderate are formed in areas in which an absolute value of the deviated angle is great.

The measured signal of the response curve 12 is always smaller than that in the response curve 13. That is, the sensitiveness of the response curve 12 is low. On the other hand, measurement range for the deviated angle of the response curve 12 is broader than that in the response curve 13. This is because the spot diameters are different on the light receiving planes 11a and 11b. Therefore, it is possible to measure a broad range by the light measuring device 10a. Although the measurement range in the light measuring device 10 is narrow, the sensitiveness in the light measuring device 10 is relatively high; therefore, it is possible to perform the precise measurement.

Figure 5:
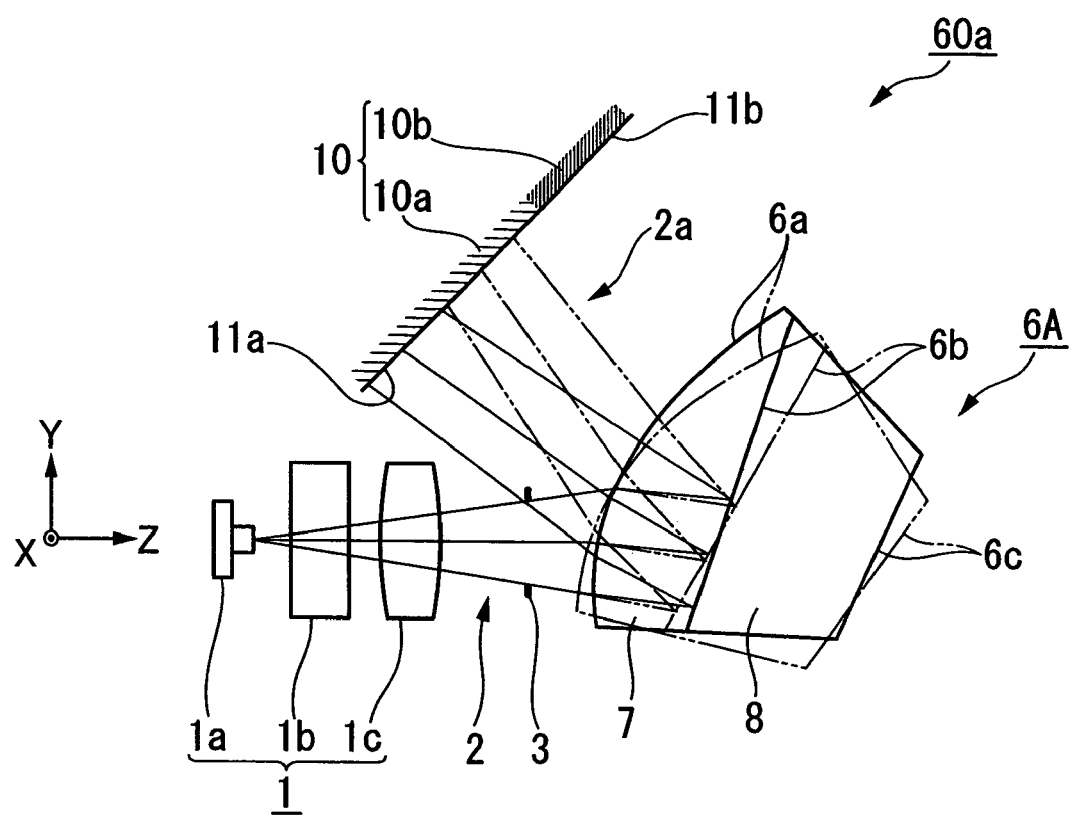
FIG. 5 is a general view for a light path for explaining a light path in the measuring optical system which is used in the angle measuring device according to the first embodiment of the present invention.

FIG. 5 shows a general view for a light path in a case in which the cemented optical element 6A is rotated by ±5° from the neutral position in the present embodiment. In FIG. 5, a continuous line indicates a position and a light path in a case the cemented optical element 6A is rotated by +5°. A two-doted-line indicates a position and a light path in a case the cemented optical element 6A is rotated by −5°. By doing this, it is possible to measure a broad range of angle such as ±5° by the light measuring device 10a. Here, the second light path is omitted in the drawing.

Here, whether or not it is possible to measure a broad range, and whether or not it is possible to perform a precise measurement depend on the spot diameter size with reference to a light receiving area of the four-divided light receiving device. If the spot diameter is large, the measurement range is large as indicated by the response curve 12 shown in FIG. 4. However, in such a case, a voltage output alternation is small with reference to a constant inclination; thus, the measurement sensitiveness is low and the measurement accuracy decreases. In contrast, if the spot diameter is small, the voltage output alternation is large with reference to a constant inclination. Thus, the measurement sensitiveness is high and the measurement accuracy increases. Therefore, it is desirable that the spot diameter size and the size of the light receiving plane be combined preferably.

By doing this, it is possible to vary the spot diameter independently by the angle measuring device 60 according to the present embodiment even in a case in which the light measuring devices 10 and 10b having the same sensitiveness by the same structure as each other are used. As a result, it is possible to vary the sensitiveness for measuring the angle, the measurement range, and the measurement preciseness of the light measuring devices 10a and 10b. That is, as far as the output from the light measuring device 10a is concerned, it is characterized in that a measurement sensitiveness for the angle is low, the measurement range is broad, and the measurement preciseness is low. In contrast, as far as the output from the light measuring device 10b is concerned, it is characterized in that a measurement sensitiveness for the angle is high, the measurement range is narrow, and the measurement preciseness is high. That is, it is possible to measure the alternation of the inclination of a test sample by two light measuring devices having different measurement sensitiveness, different measurement ranges, and measurement preciseness simultaneously.

Therefore, there is an advantage in that the former angle measuring device can be used for a rough adjustment and the latter angle measuring device can be used for a fine adjustment of the angle. For example, in such a case, it is possible to control a deviated angle of the deviating mirror plane 5a by an angle measuring device for the rough adjustment in an initial controlling stage in which the deviated angles are different to a great extent. After the measured angle is in a range for the fine adjustment, the angle is controlled highly precisely by the angle measuring device for the fine adjustment.

Furthermore, there is an advantage in that it is possible to realize a compact device by forming a light path between the laser light source section 1 and the light path separating plane 6b commonly while realizing a measurement for angle in two different conditions simultaneously.

Also, the light measuring devices 10a and 10b are disposed on a same plane in an array; thus, it is possible to dispose, for example, a signal processing section 60b on a back of the light measuring devices 10a and 10b so as to form an entire device compactly. Also, there is an advantage in that it is possible to perform assemblying operations easily. Also, it is possible to reduce members for forming the device if eight-divided light receiving devices are disposed on a same base board so as to unite the two light receiving devices, or to form a chip part.

Also, in the present embodiment, optical planes which are formed by rotationally asymmetric free-form-surfaces are disposed eccentrically so as to form a light path compactly. In general, an eccentric optical plane causes an extraordinary aberration. For example, an astigmatism and a comatic aberration are caused on a principal ray. A distortion can be formed in a trapezoidal shape or an arch shape which can be characterized for such an eccentric aberration. If these aberrations are evident, the preciseness of the measurement for the angle is undesirably affected. The present embodiment employs a free-form-surface; therefore, it is possible to compensate the eccentric aberration preferably by varying the curvature and the inclination with in a range of an effective diameter.

Also, a rotationally-asymmetric free-form-surface is used for the reflecting surface, it is possible to improve an aberration-compensating effect further.

Also, by forming the light path separating/deviating section 6 by a prism member, it is possible to form a positioning plane and a disposition reference plane easily by using an outer peripheral surface of the prism member; thus, there is an advantage in that a production process and an assembling operation are easy.

Next, a first modified example for the angle measuring device 60 according to the present embodiment is explained.

In a measuring optical system 60a of the present modified example, a cemented optical element 6B (light path separating/deviating section) is used in place of the cemented optical element 6A, and a light measuring device 10c is used in place of the light measuring device 10b. Only the different features from the above explanation are explained here briefly. Here, although a diaphragm 9 having a different numerical aperture is used in place of the diaphragm 3 so as to adjust the spot diameter preferably, such a diaphragm 9 is not necessarily needed in the structure of the present modified example.

Figure 6A:
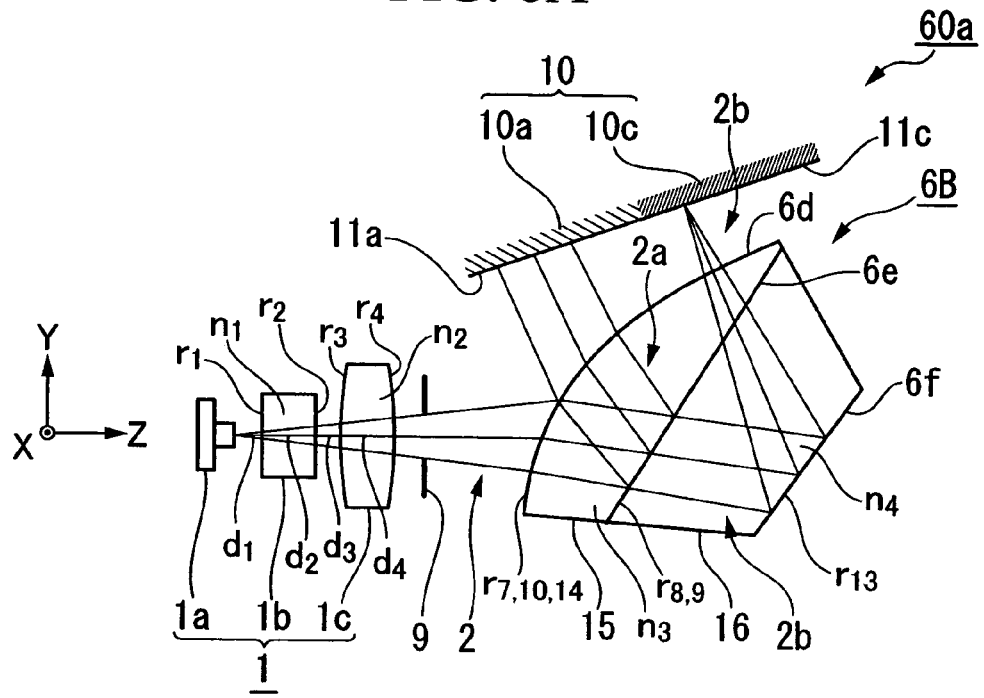
FIGS. 6A and 6B are general views for a light path for explaining the measuring optical system which is according to a first modified example in the first embodiment of the present invention.
Figure 6B:
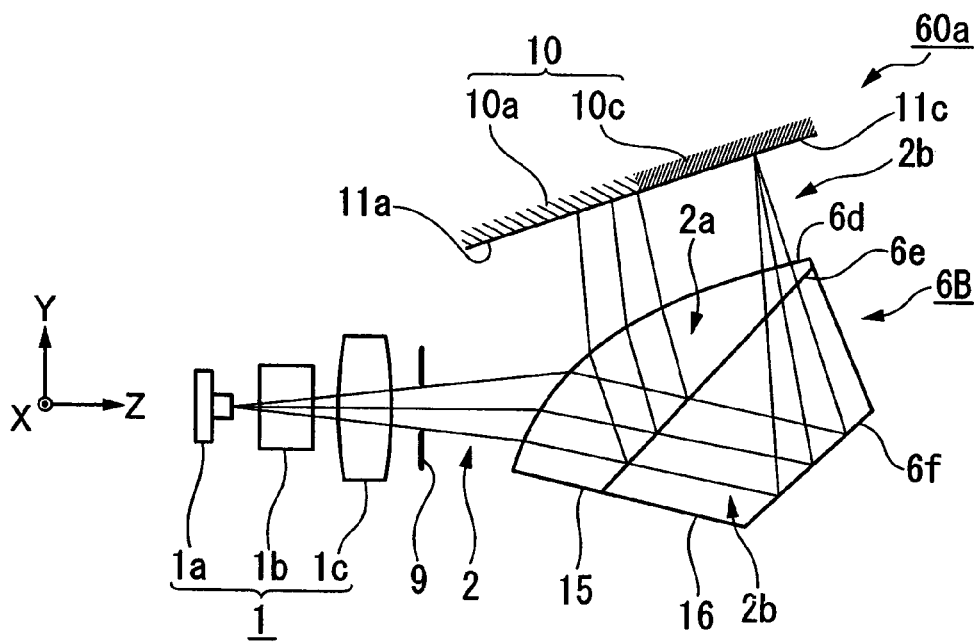

FIGS. 6A and 6B are views for explaining a general structure of the light path in the measuring optical system 60a according to the first modified example according to the present embodiment. In FIGS. 6A and 6B, light paths are shown in a case in which the cemented optical element 6B is rotated by +5° and −5° around the X-axis from the neutral position respectively.

In the cemented optical element 6B according to the first modified example of the present embodiment, the prisms 7 and 8 in the cemented optical element 6A are replaced by prisms 15 and 16. The prismatic plane 6a, the light path separating plane 6b, and the reflecting plane 6c are replaced by a prismatic plane 6d, a light path separating plane 6e, and a reflecting plane 6e (post-separation reflecting plane). The function, variety of the curved planes, and the disposition of these of these optical planes are approximately the same as the above structures.

Therefore, the laser light 2 which is emitted from the laser light source section 1 is collimated into an approximate parallel light by the prismatic plane 6d such that a light flux of the laser light 2 be separated into the reflected light 2a on the separating plane and the transmitted light 2b through the separating plane.

In the first light path, the laser light 2 is emitted and transmitted through the prismatic plane 6d toward the light receiving plane 11a while varying the light condensation condition by the power of the light path separating plane 6e. The light is condensed by a positive power of the prismatic plane 6d. A relatively large spot is formed on the light receiving plane 11a similarly to a case of the prismatic plane 6a.

In the second light path, the transmitted light 2b through the separating plane which is transmitted through the light path separating plane 6e is reflected by the reflecting plane 6f which has a positive power so as to be transmitted through the prismatic plane 6d while being condensed. The transmitted light 2b through the separating plane is further condensed so as to be emitted toward the light receiving plane 11b.

Here, in such a structure, an approximate focal plane is on the light receiving plane 11c by combining the prismatic plane 6d which has the positive power and the reflecting plane 6f. Therefore, the spot which is formed on the light receiving plane 11c is a point spot.

For a light measuring device 10c, for example, a two-dimensional position measuring light receiving device (Positive Sensitive Detector which is commonly called as a PSD) is used which can measure the position on the light receiving plane even if the spot diameter is small.

Figure 7:
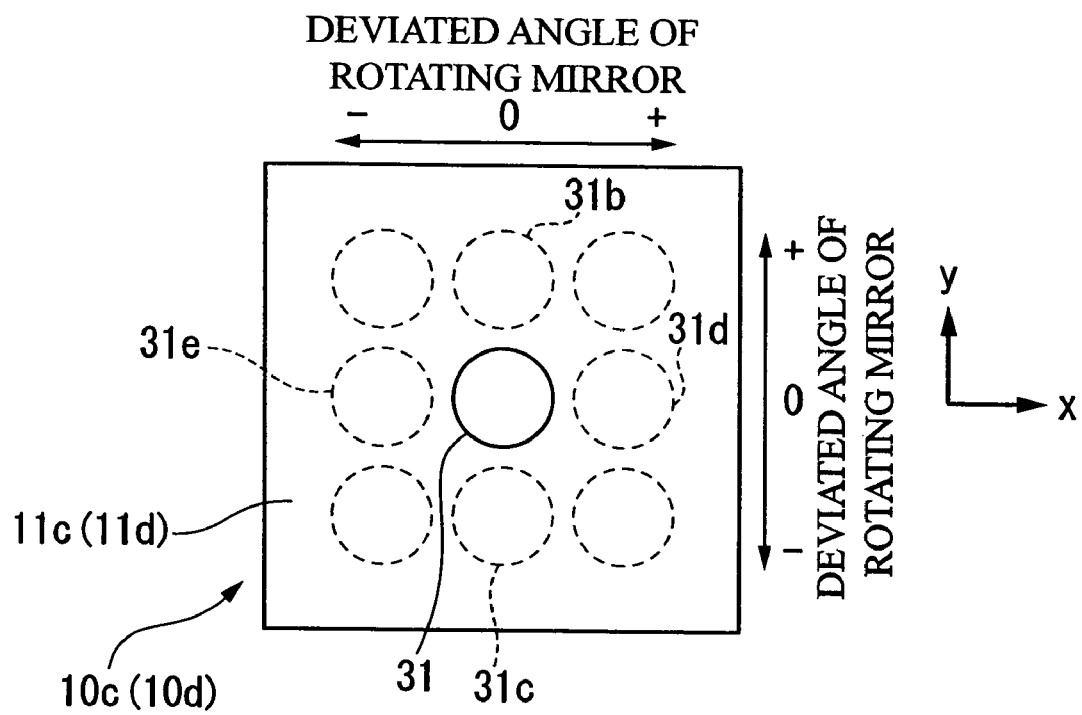
FIG. 7 is a view for explaining other light receiving device (four-division light receiving device) which is viewed in an optical axis which is used in the present invention.

FIG. 7 is a plan view for explaining a position measurement for the spot of the light flux by using the two-dimensional PSD viewed in the optical axis direction.

When a spot 31a which is in the neutral position moves as indicated by a broken line due to an inclining movement of the cemented optical element 6B in two-axes directions, an voltage output which corresponds to a central position of the optical intensity is generated; thus, such a position is measured. For example, as shown in FIG. 6A, if the rotating mirror is rotated by −5° around the X-axis, the spot is emitted on a position of the spot 31c. Similarly, as shown in FIG. 6B, if the rotating mirror is rotated by +5° around the X-axis, the spot is emitted on a position of the spot 31b. According to the position of the spots, the voltage output is generated.

In the light measuring device 10c, the two-dimensional PSD is used; therefore, it is possible to measure a broad range of the angle even if the spot is a point spot.

Therefore, by measuring the positions for x and y respectively, a component for the inclination (deviated angle) of the cemented optical element 6B around the two axes can be measured.

By such a two-dimensional PSD, it is possible to measure the position of the spot even if the spot of the light flux is spotted on any position of the light receiving plane. Therefore, there is an advantage in that it is possible to use an entire plane of the light receiving plane for a measurement by reducing the spot diameter differently from a case of the four-divided light receiving device.

For an effect which is obtained in the first modified example, it is understood that it is possible to improve a range for measuring the angle by a compact structure.

Figure 8:
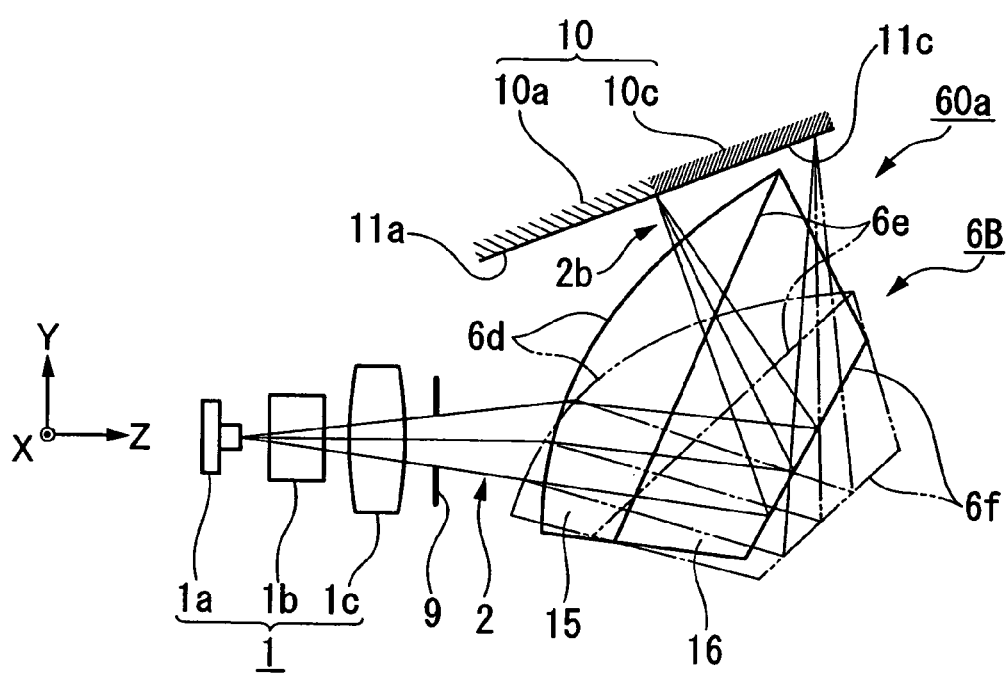
FIG. 8 is a general view for explaining a light path in the measuring optical system according to the first modified example of the first embodiment of the present invention.

FIG. 8 is a general view for explaining a light path according to the present modified example in a case in which the cemented optical element 6B is rotated ±12° from the neutral position. In FIG. 8, a continuous line indicates a position and a light path in on the optical planes in a case of the rotation by +12°. A two-dot broken line indicates a position and a light path in on the optical planes in the case of a rotation by −12°. Here, the first light path is omitted in the drawing.

In the embodiment for a case in which the cemented optical element 6A is used, the four-divided light receiving devices are used for both the light measuring devices 10a and 10b; therefore, the range for measuring the angle is limited in a range of ±2° in the light measuring device 10 in which the movement amount of the spot is large. In the present modified example, although the range for measuring the angle is ±5° by the light measuring device 10a, it is possible to widen the range for measuring the angle by decreasing the movement amount of the spot according to the inclination of the cemented optical element 6B to be smaller than that on the light receiving plane 11a while reducing the spot diameter with regardless to the same area as the light receiving plane 11b.

In the present modified example, the two-dimensional PSD for widen the range for measuring the angle and the four-divided light receiving device for improving the accuracy for measuring the angle are combined to be used.

Next, a second modified example for the angle measuring device 60 according to the present embodiment is explained.

In the measuring optical system 60a in the present modified example, a light condensing lens 1d is used in place of the light condensing lens 1c, a prismatic optical element 17 (light path separating/deviating section) is used in place of the cemented optical element 6A, and a light measuring device 10c is used in place of the light measuring device 10b. Hereinafter, only the different features from the above explanation are explained here briefly. Here, although a diaphragm 18 having a different numerical aperture is used in place of the diaphragm 3, such a diaphragm 18 is not necessarily needed in the structure of the present modified example.

Figure 9A:
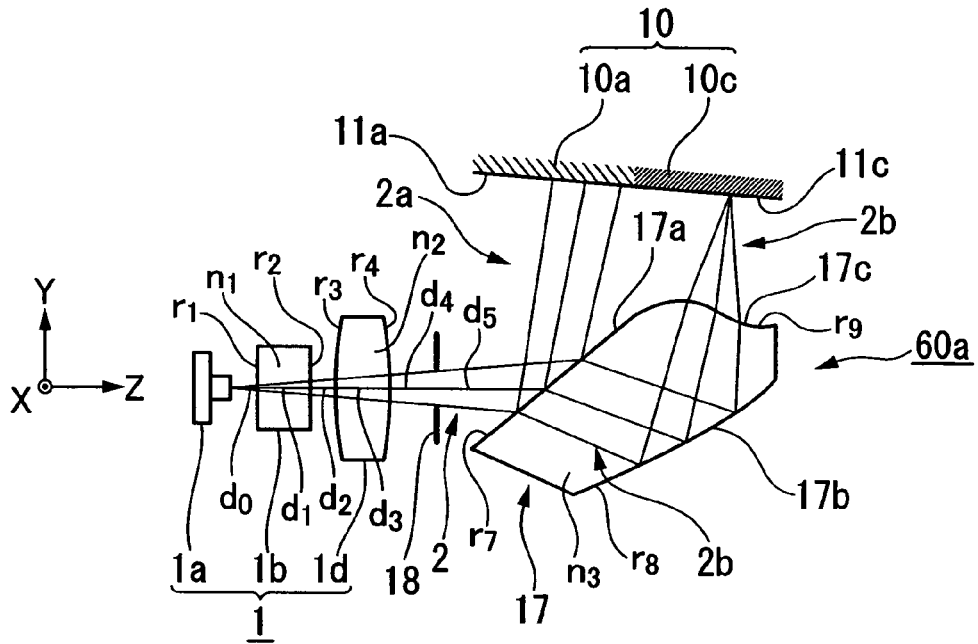
FIGS. 9A and 9B are general views for explaining a light path in the measuring optical system in the angle measuring device according to a second modified example for the first embodiment of the present invention.
Figure 9B:
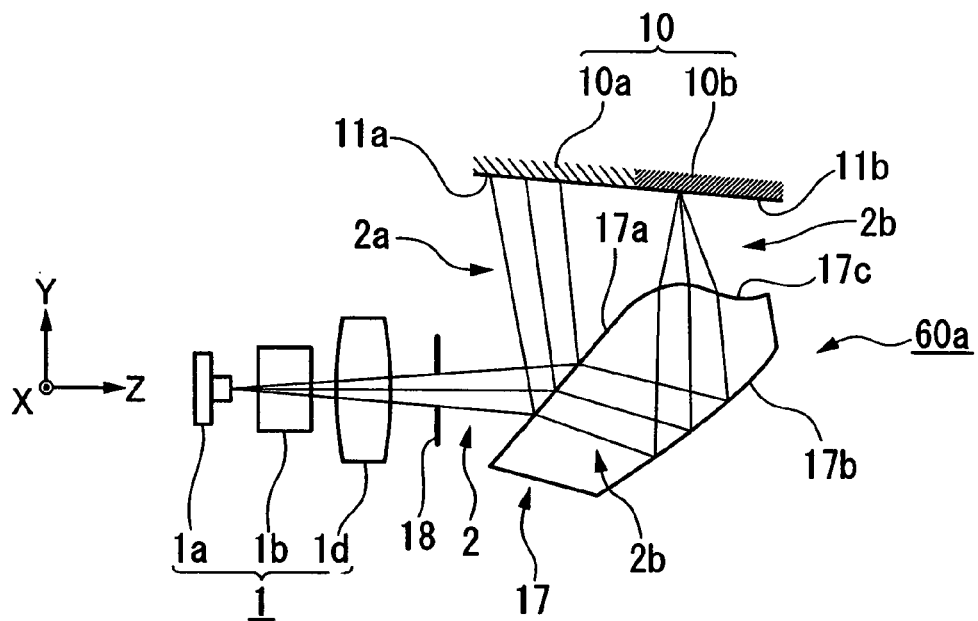
Figure 10:
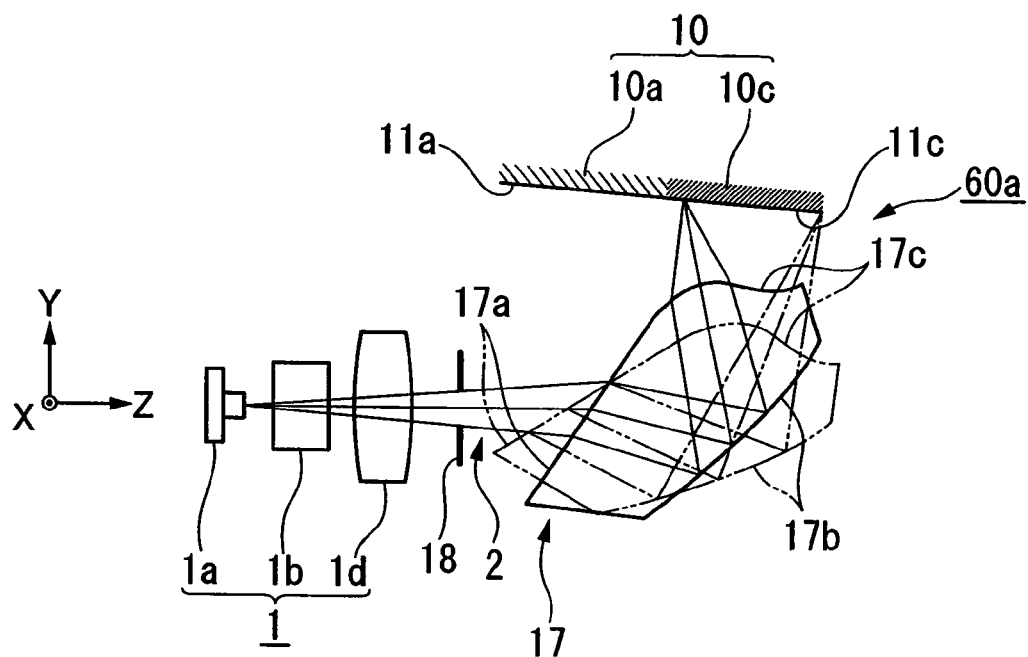
FIG. 10 is a general view for explaining a light path in the measuring optical system according to the second modified example of the first embodiment of the present invention.

FIGS. 9A and 9B are views for explaining a general structure of a light path in the measuring optical system 60a according to the second modified example of the present embodiment. In FIGS. 9A and 9B, light paths are shown in a case in which the prismatic optical element 17 is rotated by +5° and −5° around the X-axis from the neutral position respectively. FIG. 10 is a view for explaining a general structure of a light path in a case in which the prismatic optical element 17 is rotated by ±12°. In FIG. 10, a continuous line indicates a position and a light path in on the optical planes in a case of the rotation by +12°. A two-dot broken line indicates a position and a light path in on the optical planes in the case of a rotation by −12°. Here, the first light path is omitted in the drawing.

A light condensing lens 1d is a lens which has a positive power so as to converge the dispersing angle of the laser light 2 which is transmitted through the semiconductor laser 1a and the cover glass 1b.

The prismatic optical element 17 is an optical element such that a light separating plane 17a, a reflecting plane 17b (post-separation reflecting plane), and a prismatic plane 17c are formed around an outer periphery of preferable glass member having a refractive index which is greater than 1 (one). With regard to the cemented optical element 6A, an optical plane which corresponds to the prismatic plane 6a is omitted in the first light path. Instead, a light path separating plane 17a is disposed so as to correspond to the light path separating plane 6b. The reflecting plane 17b is disposed so as to correspond to the reflecting plane 6c in the second light path. Also, the prismatic plane 17c is disposed so as to correspond to the prismatic plane 6a. Each of the optical plane is disposed eccentrically and formed by a rotationally asymmetric free-form-surface which has a power.

In the first light path, the reflected light 2a on the separating plane which is reflected on the light path separating plane 17a is directed toward the light receiving plane 11a while varying the light condensing condition according to the power on the light path separating plane 17a. The power on the light path separating plane 17 may be acceptable whether it is positive or negative as long as it is possible to obtain a spot diameter which is sufficient to realize a preferable measurement accuracy on the light receiving plane 11a. The light path separating plane 17a is inclined such that the laser light 2 is incident by approximately 45°. Therefore, it is possible to dispose the light receiving plane of the light measuring section 10 and the optical axis of the laser light source section 1 approximately in parallel.

Similarly to a case of the reflecting plane 6f in the first modified example, the reflecting plane 17b which has relatively strong power is disposed in the second light path so as to have a similar inclination with the inclination on the light path separating plane 17a such that the transmitted light 2b through the separating plane is condensed so as to be reflected toward the prismatic plane 17c. Furthermore, the transmitted light 2b through the separating plane is condensed by the prismatic plane 17c which has the positive power so as to be emitted toward the light receiving plane 11c. The light receiving plane 11c is disposed on an approximate focal plane such that a point spot is formed on the light receiving plane 11c similarly to a case of the first modified example; thus, it is possible to measure a broad range of angle.

Here, the reflecting plane 17b is formed so as to reflect entire light which is directed toward the reflecting plane 17b.

According to the second modified example, there is the same function and effect as those obtained in the first modified example in that it is possible to measure angles under two different measuring conditions in which the measuring sensitiveness and the measurement range are different by using the light measuring devices 10a and 10c.

Furthermore, according to the present modified example, the first light path which has a larger spot diameter is formed only by the light path separating plane 17a; therefore, it is possible to dispose three optical planes on the prismatic optical element 17. By doing this, it is possible to form the optical planes around an outer periphery of a glass member without cementing a plurality of optical elements. Therefore, there is an advantage in that it is possible to manufacture the prismatic optical element 17 easily. Also, as a result of such an advantage, there is an advantage in that it is possible to reduce a manufacturing cost.

Next, a third modified example of the angle measuring device 60 according to the present embodiment is explained.

In the measuring optical system 60a in the present modified example, a light condensing lens 1e is used in place of the light condensing lens 1c, a prismatic optical element 19 (light path separating/deviating section) is used in place of the cemented optical element 6A, and a light measuring device 10c is used in place of the light measuring device 10b. Hereinafter, only the different features from the above explanation are explained here briefly. Here, although a diaphragm 20 having a different numerical aperture is used in place of the diaphragm 3, such a diaphragm 20 is not necessarily needed in the structure of the present modified example.

Figure 11A:
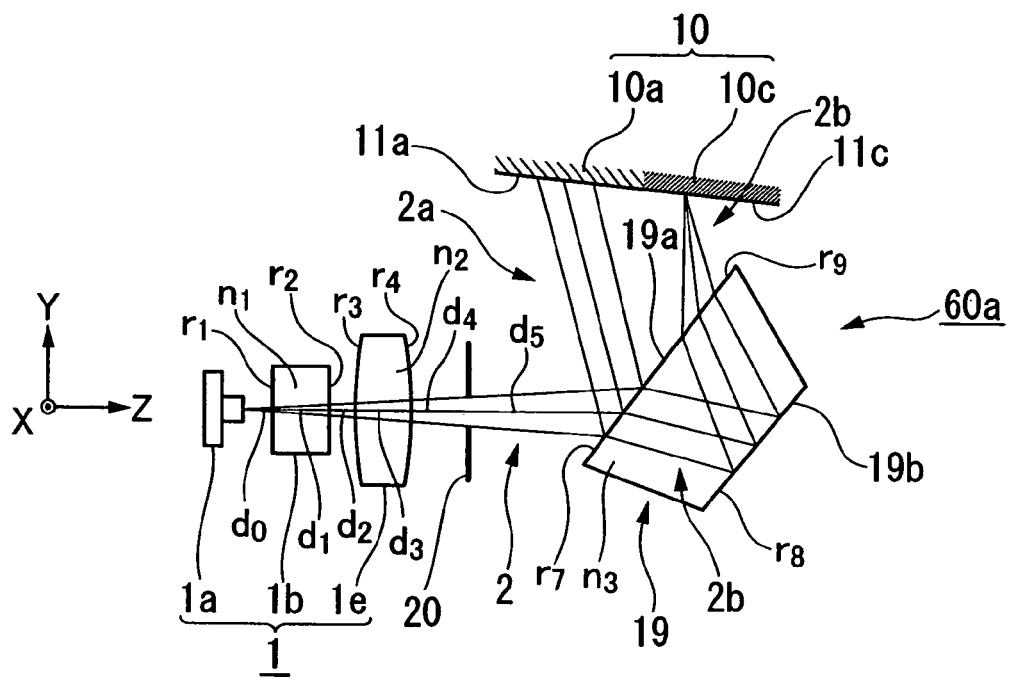
FIGS. 11A and 11B are general views for explaining a light path in the measuring optical system in the angle measuring device according to a third modified example for the first embodiment of the present invention.
Figure 11B:
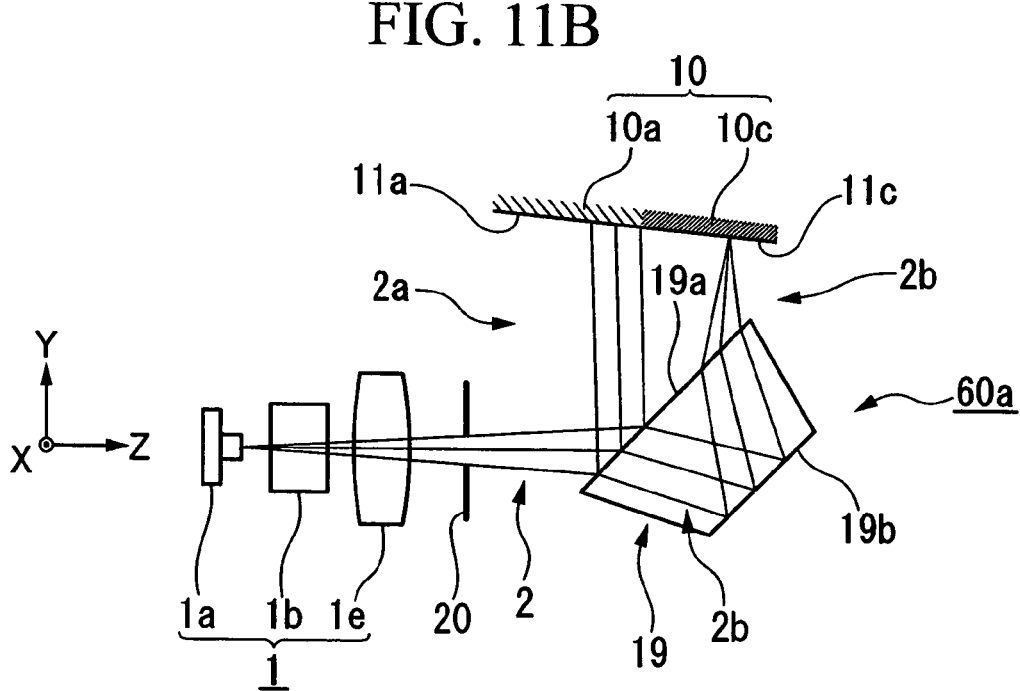

FIGS. 11A and 11B are views for explaining a general structure of a light path in the measuring optical system 60a according to the third modified example of the present embodiment. In FIGS. 11A and 11B, light paths are shown in a case in which the prismatic optical element 19 is rotated by +3° and −3° around the X-axis from the neutral position respectively. FIG. 10 is a view for explaining a general structure of a light path in a case in which the prismatic optical element 19 is rotated by ±8°. In FIG. 10, a continuous line indicates a light path in a case of the rotation by +8°. A two-dot broken line indicates a light path in the case of a rotation by −8°. Here, the first light path is omitted in the drawing.

A light condensing lens 1e is a lens which has a positive power so as to converge the dispersing angle of the laser light 2 which is transmitted through the semiconductor laser 1a and the cover glass 1b.

The prismatic optical element 19 is an optical element such that a light separating plane 19a, and a reflecting plane 19b (post-separation reflecting plane) are formed around an outer periphery of preferable glass member having a refractive index which is greater than 1 (one). With regard to the cemented optical element 6A, an optical plane which corresponds to the prismatic plane 6a is omitted in the first light path. Instead, a light path separating plane 19a is disposed so as to correspond to the light path separating plane 6b. The reflecting plane 19b is disposed so as to correspond to the reflecting plane 6c in the second light path. Also, the light path separating plane 19a is disposed so as to correspond to the prismatic plane 6a. The light path separating plane 19a and the reflecting plane 19b are disposed so as to have an approximate parallel positioning relationship. Also, each of the optical plane is disposed eccentrically and formed by a rotationally asymmetric free-form-surface which has a power. In addition, the light path separating plane 19a has a power for condensing the transmitted light 2b through the separating plane in the second light path when the transmitted light 2b through the separating plane is emitted.

In the first light path, the reflected light 2a on the separating plane which is reflected on the light path separating plane 19a is directed toward the light receiving plane 11a while varying the light condensing condition according to the power on the light path separating plane 19a. The light path separating plane 19a is inclined such that the laser light 2 be incident by approximately 45° of incident angle. Therefore, it is possible to dispose the light receiving plane of the light measuring section 10 and the optical axis of the laser light source section 1 approximately in parallel.

Similarly to a case of the reflecting plane 17b in the second modified example, the reflecting plane 19b which has relatively strong power is disposed in the second light path so as to have a similar inclination with the inclination on the light path separating plane 19a such that the transmitted light 2b through the separating plane is condensed so as to be reflected toward the prismatic plane 19a which is disposed in an array on the incident position of the laser light 2. Furthermore, the transmitted light 2b through the separating plane is condensed by a function of the light path separating plane 19a which has the positive power so as to be emitted toward the light receiving plane 11c. The light receiving plane 11c is disposed on an approximate focal plane such that a point spot is formed on the light receiving plane 11c similarly to a case of the first modified example and the second modified example; thus, it is possible to measure a broad range of angle.

Here, the reflecting plane 19b is formed so as to reflect entire light which is directed toward the reflecting plane 19b.

According to the third modified example, there is the same function and effect as those obtained in the first modified example and the second modified example in that it is possible to measure angles under two different measuring conditions in which the measuring sensitiveness and the measurement range are different by using the light measuring devices 10a and 10c.

Furthermore, according to the present modified example, the transmitted light 2b through the separating plane is condensed on the light receiving plane 11c by forming the light path separating plane 19a by a free-form-surface which has a positive power when the transmitted light 2b through the separating plane is transmitted therethrough; therefore, it is possible to reduce the optical planes of the prismatic optical element 19 such as two optical planes. In addition, the light path separating plane 19a and the reflecting plane 19b are disposed approximately in parallel; therefore, there is an advantage in that it is possible to manufacture the prismatic optical element 19 more easily than in a case of the prismatic optical element 17 in the second modified example.

Next, a fourth modified example of the angle measuring device 60 according to the present embodiment is explained.

The present modified example is different from the above examples in that the reflected light 2a on the separating plane and the transmitted light 2b through the separating plane are condensed such that the spot diameters on the light receiving planes be as small as possible. That is, in the measuring optical system 60a in the present modified example, a light condensing lens 1d is used in place of the light condensing lens 1c, a prismatic optical element 21

(light path separating/deviating section) is used in place of the cemented optical element 6A, and a light measuring devices 10c and 10d are used in place of the light measuring devices 10a and 10b. For the light measuring device 10d, it is possible to use a sensor which is provided with the same light receiving plane 11d as that on the light receiving plane 11c in the light measuring device 10c.

Hereinafter, only the different features from the above explanation are explained here briefly. Here, although a diaphragm 22 having a different numerical aperture is used in place of the diaphragm 3, such a diaphragm 22 is not necessarily needed in the structure of the present modified example.

Figure 13A:
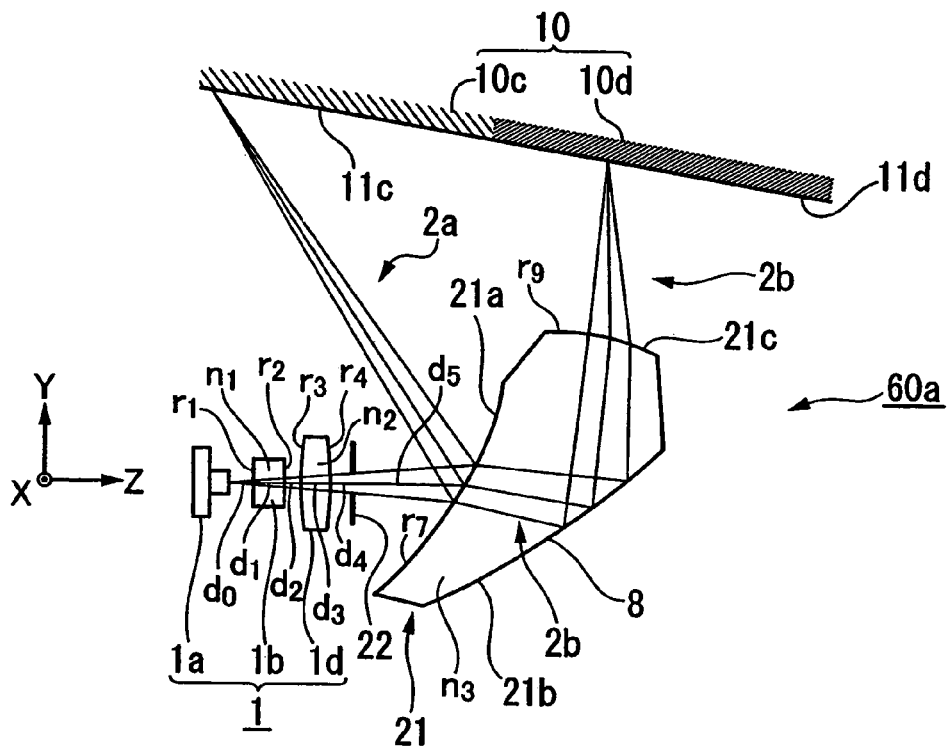
FIGS. 13A and 13B are general views for explaining a light path in the measuring optical system in the angle measuring device according to a fourth modified example for the first embodiment of the present invention.
Figure 13B:
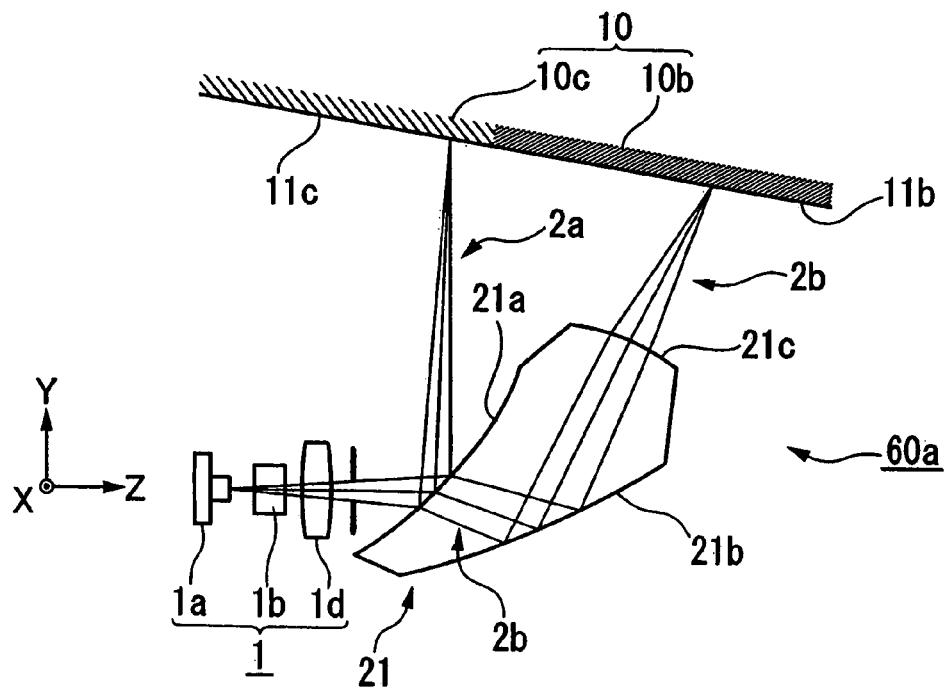
Figure 14:
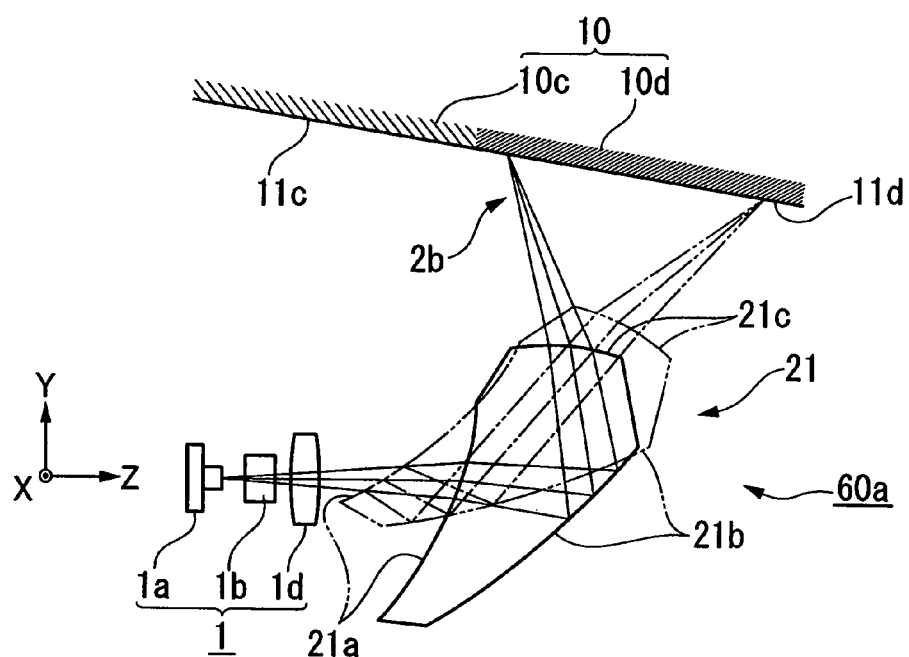
FIG. 14 is a general view for explaining a light path in the measuring optical system according to the fourth modified example of the first embodiment of the present invention.

FIGS. 13A and 13B are views for explaining a general structure of a light path in the measuring optical system 60a according to the fourth modified example of the present embodiment. In FIGS. 13A and 13B, light paths are shown in a case in which the prismatic optical element 21 is rotated by +5° and −5° around the X-axis from the neutral position respectively. FIG. 14 is a view for explaining a general structure of a light path in a case in which the prismatic optical element 21 is rotated by ±11°. In FIG. 14, a continuous line indicates a light path in a case of the rotation by +11°. A two-dot broken line indicates a light path in the case of a rotation by −11°. Here, the first light path is omitted in the drawing.

The prismatic optical element 21 is an optical element such that a light separating plane 21a, a reflecting plane 21b (post-separation reflecting plane), and a prismatic plane 21c are formed around an outer periphery of preferable glass member having a refractive index which is greater than 1 (one). With regard to the cemented optical element 6A, an optical plane which corresponds to the prismatic plane 6a is omitted in the first light path. Instead, a light path separating plane 21a is disposed so as to correspond to the light path separating plane 6b. The reflecting plane 21b is disposed so as to correspond to the reflecting plane 6c in the second light path. Also, the prismatic plane 21c is disposed so as to correspond to the prismatic plane 6a. Also, each of the optical plane is disposed eccentrically and formed by a rotationally asymmetric free-form-surface which has a power.

The reflected light 2a on the separating plane which is reflected on the light path separating plane 21a which has a positive power is condensed in the first light path so as to be directed toward the light receiving plane 11 while being condensed. The power on the light path separating plane 21a is set such that the light receiving plane 11c be an approximate focal plane; thus, the reflected light 2a on the separating plane is emitted on the light receiving plane 11c in a small point spot diameter.

Similarly to a case of the reflecting plane 17b in the second modified example, the reflecting plane 21b which has relatively strong power is disposed in the second light path so as to emit the transmitted light 2b through the separating plane toward the prismatic plane 21c while condensing the transmitted light 2b through the separating plane. Furthermore, the transmitted light 2b through the separating plane is condensed by a function of the prismatic plane 21c which has the positive power so as to be emitted toward the light receiving plane 11c. The light receiving plane 11d is disposed on an approximate focal plane such that a point spot is formed on the light receiving plane 11d similarly to a case of the first to third modified examples; thus, it is possible to measure a broad range of angle.

Here, the reflecting plane 21b is formed so as to reflect entire light which is directed toward the reflecting plane 21b.

Here, the power in the length of the light path and the optical plane are set such that the spot movement amount on the light receiving plane 11c and the spot movement amount on the light receiving plane 11d be differentiated according to a constant inclination; thus, it is possible to realize a broad range of measurement and precise measurement. The light receiving plane 11c on which the movement amount which corresponds to the constant inclination is large has a superior resolution; thus, it is possible to perform a precise measurement. In contrast, it is possible to perform a broad range such as ±11° of measurement on the light receiving plane 11d on which the movement amount is small.

In the fourth modified example having above structure, similar sensors are used for the light measuring devices 10c and 1d. Here, the movement amount on the light receiving plane according to the inclination of the prismatic optical element 21 differs because of a difference of the length of the light path from the light path separating plane 21a and the reflecting plane 21b; therefore, it is possible to realize a structure in which various measuring sensitiveness and various measuring range can be performed compatibly. Therefore, it is possible to realize the same advantage as those in the first to the third modified examples in that it is possible to perform a measurement under different condition for the measuring sensitiveness and the measurement range compatibly.

Also, similarly to a case of the prismatic optical element 17 in the second modified example, three optical planes are disposed on an outer periphery of the glass member; thus, there is an advantage in that it is possible to manufacture the device easily.

Next, a fifth modified example of the angle measuring device 60 according to the present embodiment is explained.

In the measuring optical system 60a in the present modified example, a light condensing lens 1f is used in place of the light condensing lens 1c, a prismatic optical element 23 (light path separating/deviating section) is used in place of the cemented optical element 6A, and a light measuring devices 10c and 10d are used in place of the light measuring devices 10a and 10b. In addition, a polarizing board 24 is disposed on the light receiving plate 11d so as to eliminate a flare.

The prismatic optical element 23 is formed by further modifying the prismatic optical element 21 in the fourth modified example.

Hereinafter, only the different features from the above explanation are explained here briefly. Here, although a diaphragm 28 having a different numerical aperture is used in place of the diaphragm 3, such a diaphragm 28 is not necessarily needed in the structure of the present modified example.

Figure 15A:
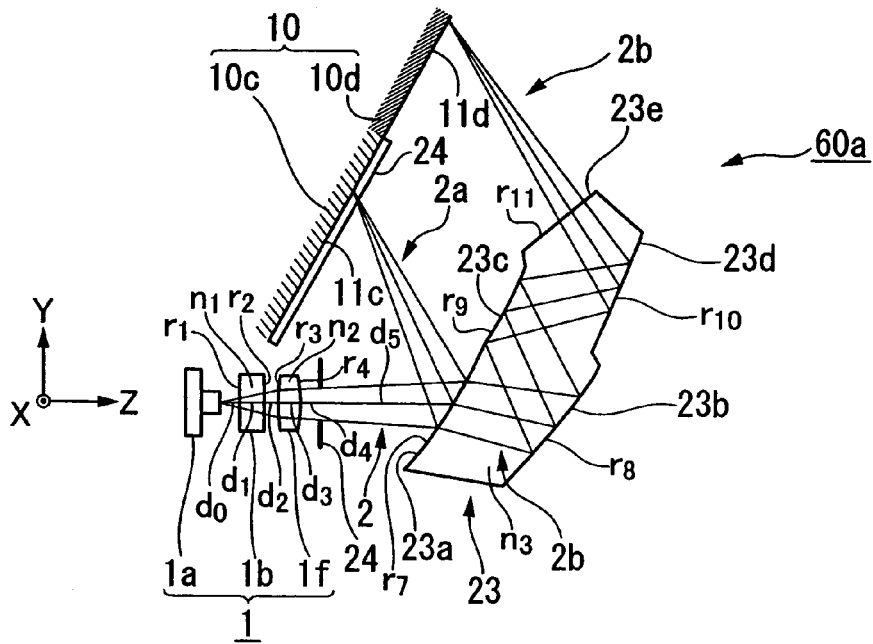
FIGS. 15A and 15B are general views for explaining a light path in the measuring optical system in the angle measuring device according to a fifth modified example for the first embodiment of the present invention.
Figure 15B:
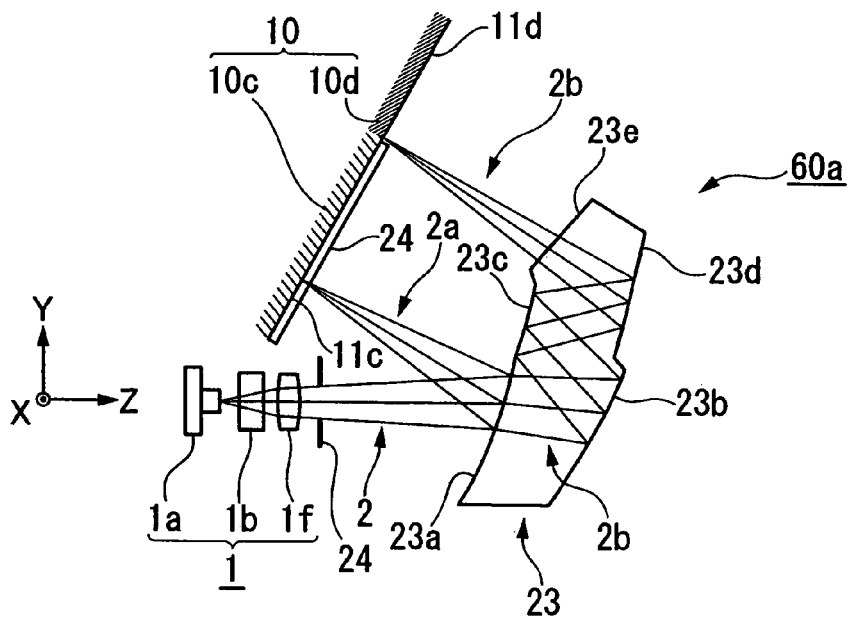
Figure 16:
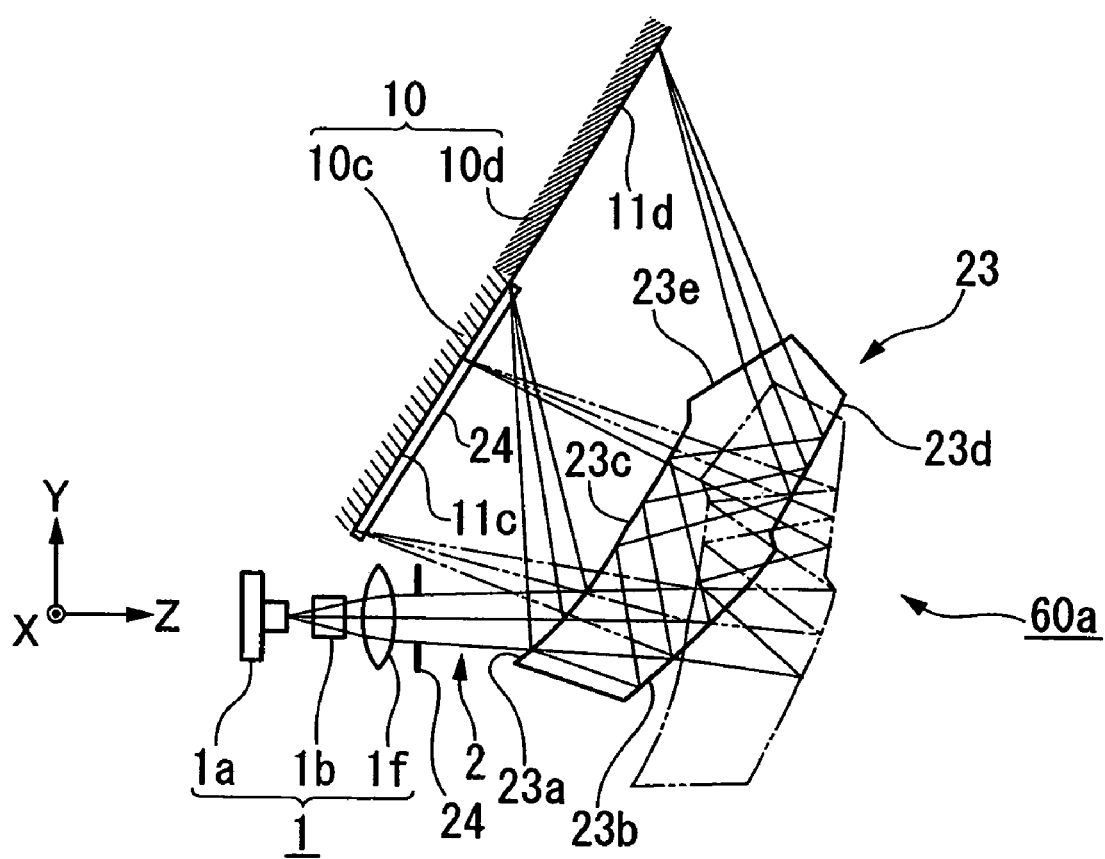
FIG. 16 is a general view for explaining a light path in the measuring optical system according to the fifth modified example of the first embodiment of the present invention.

FIGS. 15A and 15B are views for explaining a general structure of a light path in the measuring optical system 60a according to the fifth modified example of the present embodiment. In FIGS. 15A and 15B, light paths are shown in a case in which the prismatic optical element 21 is rotated by +5° and −5° around the X-axis from the neutral position respectively. FIG. 16 is a view for explaining a general structure of a light path in a case in which the prismatic optical element 21 is rotated by ±10°. In FIG. 16, a continuous line indicates a position of each optical planes and a light path in a case of the rotation by +10°. A two-dot broken line indicates a position of each optical planes and a light path in the case of a rotation by −10°.

The prismatic optical element 23 is an optical element by forming the light path separating plane 23a, the reflecting planes 23b, 23c, and 23d, and the transmitting plane 23e on an outer periphery of a glass member which has a refractive index which is greater than 1 (one). The light path separating plane 23a is disposed so as to correspond to the light path separating plane 21a in the first light path with regard to the prismatic optical element 21. Also, the reflecting plane 23b (post-separation reflecting plane) is disposed so as to correspond to the reflecting plane 21b in the second light path. The reflecting planes 23c and 23d which have a positive power for an entire reflecting plane, and the transmitting plane 23e are disposed so as to correspond to the prismatic plane 21c.

The light condensing lens 1f is a lens which has a positive power so as to converge the dispersing angle of the laser light 2 which is transmitted through the semiconductor laser 1a and the cover glass 1b.

The reflecting plane 23c is a rotationally asymmetric free-form-surface which has a positive power.

The reflecting plane 23d is a flat plane.

The refracting plane 23e is an optical flat plane for refracting the transmitted light 2b through the separating plane which is reflected on the reflecting plane 23d toward a preferable direction so as to be transmitted therethrough.

The reflected light 2a on the separating plane which is reflected on the light path separating plane 23a which has a positive power is condensed in the first light path so as to be directed toward the light receiving plane 11 while being condensed. The power on the light path separating plane 23a is set such that the light receiving plane 11c be an approximate focal plane; thus, the reflected light 2a on the separating plane is emitted on the light receiving plane 11c in a small point spot diameter.

The reflecting plane 23b which has a power is disposed in the second light path so as to emit the transmitted light 2b through the separating plane toward the prismatic plane 23c while condensing the transmitted light 2b through the separating plane. Furthermore, the transmitted light 2b through the separating plane is condensed by a function of the prismatic plane 23c so as to be emitted toward the light reflecting 23d. In addition, the transmitted light 2b through the separating plane is reflected on the reflecting plane 23d toward the refracting plane 23e so as to be emitted from the refracting plane 23e toward the light receiving plane 11d.

The spots of the reflected light 2a on the separating plane and the spots of the transmitted light 2b through the separating plane which are formed on the light receiving planes 11c and 11d are point spots.

In the present modified example, as shown in FIG. 16, the transmitted light 2b through the separating plane is incident onto the light receiving plane 11c when the prismatic optical element 23 is rotated by −10°.

Therefore, there is a case in which the transmitted light 2b through the separating plane may overlap on the light receiving plane 11c for a broad range of measurement. However, it is possible to receive only the reflected light 2a on the separating plane on the light receiving plane 11c by disposing the polarizing board 24 and using the light path separating plane 23a for a polarizing beam splitter.

In addition, it is possible to eliminate an undesirable effect caused when the transmitted light 2b through the separating plane is incident by disposing a mechanical light-sealing member and a louver member, or by performing preferable signal-processing operation or an image-processing operation according to the light measuring device 10c. Such a method can be employed in all of the above modified examples.

According to the fifth modified example, the second light path is folded in a zigzag manner such as "Z" letter by the reflecting planes 23b, 23c, and 23d; thus, it is possible to form a second light path between the reflecting plane 23b and the light receiving plane 11d longer than the first light path between the light path separating plane 23a and the light receiving plane 11c in a compact structure. That is, it is possible to differentiate the movement amount of the spot according to the inclination of the prismatic optical element 23 even if the spot diameter is small to a similar extent. As a result, there is an advantage in that it is possible to form a compact device which can measure angles under different measuring conditions for the sensitiveness and the measurement range.

Here, in the present modified example, explanations are made for a case in which the reflecting plane 23c has a power. However, more importantly, it may be acceptable if the reflecting plane 23d and the refracting plane 23e have power. There is an advantage in that it is possible to adjust the spot diameter on the light receiving plane 11d and the disposition of the light receiving plane 11d easily by distributing the power to these planes preferably.

Also, in the present modified example, explanations are made for a case in which the light path is folded in a zigzag manner such as "Z" letter. However, more importantly, it may be acceptable if the zigzag manner be in "W" letter, or in a plurality of continuous "W" letters.

Second Embodiment

Figure 17:
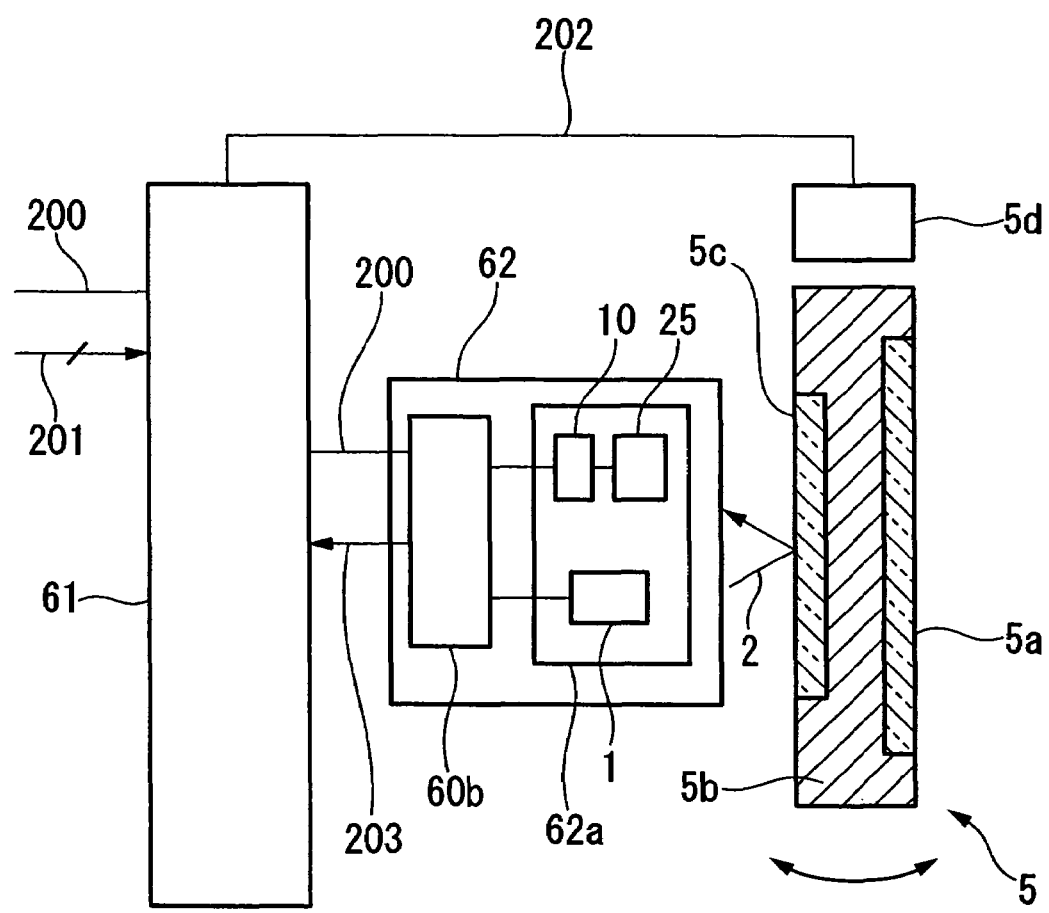
FIG. 17 is a general view for explaining an angle measuring device according to a second embodiment of the present invention.

An angle measuring device according to a second embodiment of the present invention is explained. FIG. 17 is a view for explaining a general structure of an angle measuring device 62 according to the second embodiment of the present invention. FIG. 18 is a view for explaining a general structure of a light path in a measuring optical system 62a which is used in the angle measuring device 62.

The angle measuring device 62 according to the second embodiment of the present invention comprises a measuring optical system 62a and a signal processing section 62b. For a general structure, the measuring optical system 62a comprises a laser light source section 1, a cemented optical element 25 (light path separating section), and a light measuring section 10. In the measuring optical system 62a, a laser light 2 which is emitted from the laser light source section 1 is emitted on the reflecting plane 5 for measurement which is disposed on an object (test sample) of which angle is measured. A reflected light is received on a light measuring section 10; thus, a plurality of independent angle-measuring operations are performed. The received signals are processed in the signal processing section 60b; thus, a measured level signal 203 which depends on an inclination of the reflecting plane 5 for measurement is outputted.

FIG. 17 is an example for an angle measuring device 62. In this example, the test sample is united with a rotating mirror 5 is not shown in the drawing.

The rotating mirror 5 is attached with a reflecting plane 53 for measurement in place of a light path separating/deviating section 6 shown in the first embodiment in the FIG. 1. The reflecting plane 5c is fixed on a back plane of a supporting member 5b.

Next, an angle measurement device 62 according to the present embodiment is explained in detail.

First, a measuring optical system 62a is explained with reference to an approximate light path shown in FIGS. 18A and 18B.

Here, XYZ coordinate system is used according to a necessity for describing a direction. Here, the same XYZ coordinate system is used as the orthogonal coordinate system which is used in the first embodiment. FIGS. 18A and 18B show light paths under condition that the reflecting plane 5c for measurement are rotated by +5° and −5° around the X-axis from a neutral position.

A laser light source section 1 is provided with a semiconductor laser 1a, a cover glass 1b, and a light condensing lens 1g.

The semiconductor laser 1a is a light source for emitting a predetermined intensity of laser light 2 to the reflecting plane 5c for measurement. For a wavelength of the semiconductor laser 1a, any preferable wavelength can be employed according to an optical characteristics in the reflecting plane 5c for measurement and a sensitiveness of the light measuring section 10 which are explained later.

The light condensing lens 1g is an optical element which is disposed for forming a dispersing light from the semiconductor laser 1a into a light flux which spreads in a predetermined angle. In the present embodiment, for example, a biconvex lens having a positive power is used so as to realized a more converged transmitted laser light 2. A diaphragm 29 is disposed on an optical axis in a rear stage of the light condensing lens 1g. The diaphragm 29 is formed by modifying an aperture diameter and a shape of aperture of the diaphragm 3 in the first embodiment. It is not necessary to dispose the diaphragm 3 similarly to a case of the aperture 3.

Such a laser light source section 1 is fixed in a position for emitting a laser light 2 toward a predetermined position in the reflecting plane 5c for measurement when the deviating mirror plane 5a is in a neutral position.

The cemented optical element 25 is a section for separating the light flux of the laser light 2 into the reflected light 2a on the separating plane and the transmitted light 2b through the separating plane when the laser light 2 which is reflected on the reflecting plane 5c for measurement is incident thereto and emitting a plurality of the separated light fluxes according to the deviated angle of the deviating mirror 5c.

An incident plane 25a, a light path separating plane 25b, and an emitting plane 25c near transmitting section are disposed in such a disposing order from the reflecting plane 5c for measurement in the cemented optical element 25 so as to have a preferable plane intervals. Also, in the cemented optical element 25, an emitting plane 25d near reflecting section is disposed in a position between the incident plane 25a and the light path separating plane 25b. For example, for a prismatic plane in a triangle prism, it is possible to employ a structure in which a prism 26 which has a plane having a similar shape with the light path separating plane 25b such as the incident plane 25a and the emitting plane 25d near reflecting section and a prism 27 which has a plane which has a similar shape with the light path separating plane 25b and the emitting plane 25c near transmitting section are cemented together closely such that planes having the same shape as that of the light path separating plane 6b be attached together.

For the prisms 26 and 27, it is possible to use a glass member and a synthetic resin member which have a preferable refractive index. It is possible to use different material. Alternatively, and more importantly, it is possible to use the same materials according to necessity. In the present embodiment, the same material is used.

The incident plane 25a is an optical plane which is formed by a plane for transmitting the laser light 2 therethrough and folding the second light path by reflecting the transmitted light 2b through the separating plane.

The light path separating plane 25a is an optical plane for separating the laser light 2 which is incident from the incident plane 25a into two light fluxes (which are called as the first light path and the second light path as explained in the first embodiment) such as the reflected light 2a on the separating plane and the transmitted light 2b through the separating plane. In the present embodiment, for example, the light path separating plane 25a is formed by disposing a coating layer for transmitting approximately 50% of the laser light 2 and reflecting approximately 50% of the laser light 2 between the prisms 26 and 27.

The light path separating plane 25b is formed so as to have a rotationally asymmetric free-form-surface which has a positive power for condensing the reflected light 2a on the separating plane for improving a symmetry of the movement amount of the spot and a uniformity of the spot diameter.

The light path separating plane 25b is disposed eccentrically with regard to an optical axis of the laser light 2 such that the entire reflected light 2a on the separating plane which is reflected on the light path separating plane 25b be incident onto the incident plane 25a by an incident angle which is greater than a critical angle so as to be reflected on the incident plane 25a.

The emitting plane 25c near transmitting section has a positive power for condensing the transmitted light 2b through the separating plane on the light receiving plane 11a which is explained later by a preferable spot diameter such that the movement amount of the condensed transmitted light 2b through the separating plane be preferable according to the inclination of the reflecting plane 5c for measurement. Here, the refractive indice in the prisms 26 and 27 are the same as each other; therefore, the eccentric light path separating plane 25b does not have a condensing function to the transmitted light 2b through the separating plane. In such a case, it is possible to use an axially-symmetric optical plane for the emitting plane 25c near transmitting section. In the present embodiment, a convex spherical plane is employed.

The emitting plane 25d near reflecting section is a flat transmitting plane which is disposed eccentrically so as to emit the reflected light 2a on the separating plane entire of which is reflected on the incident plane 25a so as to be refracted into a predetermined direction.

The light measuring section 10 comprises the light measuring devices 10c and 10a. The light measuring section 10 is disposed such that the reflected light 2a on the separating plane which is emitted from the emitting plane 25d near reflecting section and the transmitted light 2b through the separating plane which is emitted from the emitting plane 25c near transmitting section can be received respectively. Here, the light measuring devices 10c and 10a are two-dimensional PSDs and four-divided light receiving devices which are explained in the first embodiment.

The light measuring device 10a is disposed in a position nearer to a test sample than a focal plane in a rear stage of the emitting plane 25c near transmitting section on an optical axis of the first light path which is formed by the light condensing lens 1g and the emitting plane 25c near transmitting section such that relatively larger spot diameter can be obtained on the light receiving plane 11a.

The light measuring device 10c is disposed on an approximate position of the focal plane of the second light path.

Figure 18A:
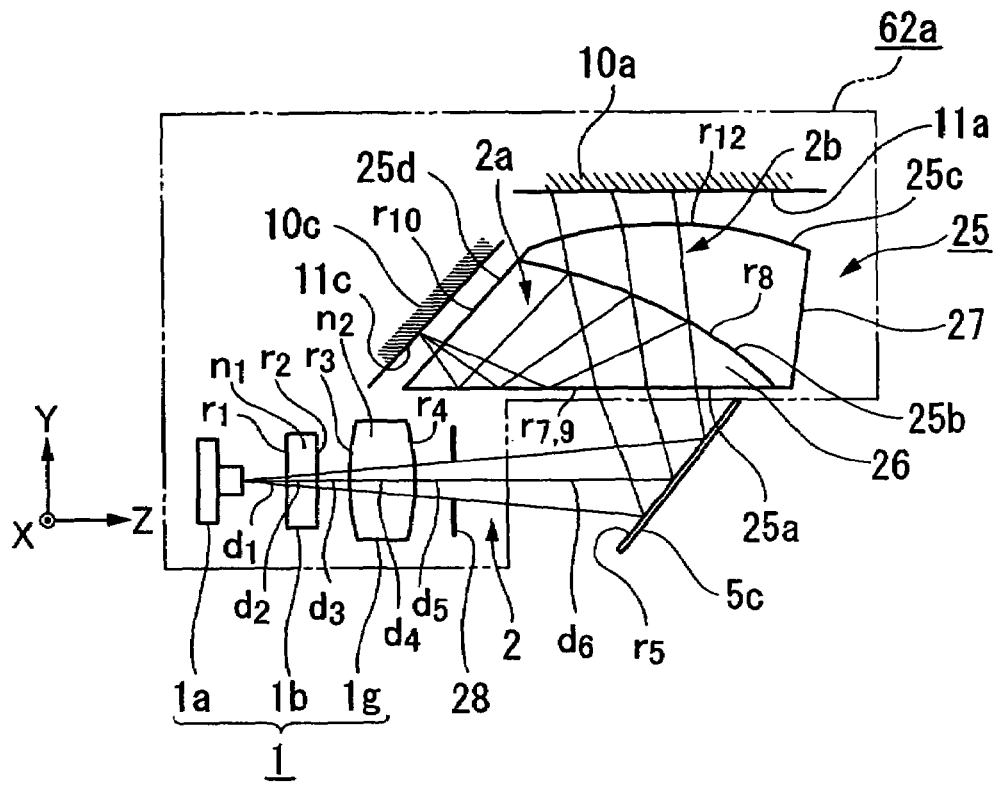
FIGS. 18A and 18B are general views for a light path for explaining a general structure for a measuring optical system which is used for an angle measuring device according to the second embodiment of the present invention.
Figure 18B:
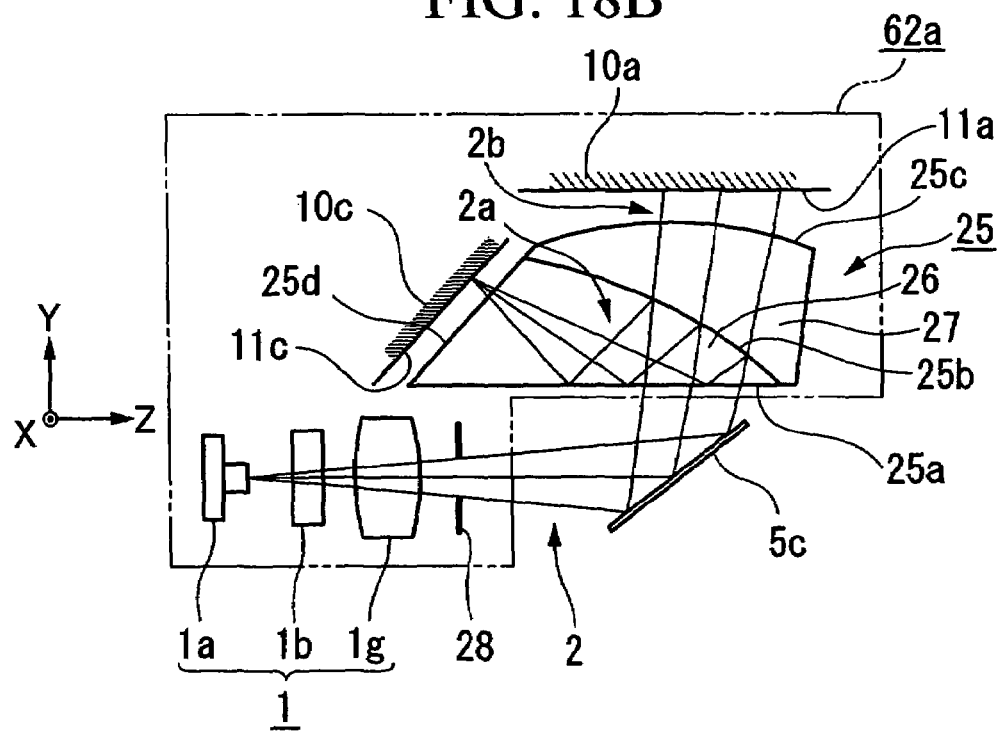

Therefore, in the present embodiment, as shown in FIGS. 18A and 18B, the light receiving planes 11c and 11a are disposed so as to neighbor each other in a position so as to neighbor and face the emitting plane 25d near reflecting section and the emitting plane 25c near transmitting section respectively.

Next, operations in the angle measuring device 60 according to the present embodiment is explained.

First, a case in which reflecting plane 5c for measurement is rotated by 7° from the neutral position to the positive direction around the X-axis direction with reference to the FIG. 18A.

The laser light 2 which is emitted from the laser light source section 1 is shaped into a preferable light flux by a diaphragm 28. The shaped light flux of the laser light source section 1 is incident onto the reflecting plane 5c for measurement while dispersing so as to be reflected toward the incident plane 25a.

The laser light 2 progresses from the incident plane 25a into the prism 26. When the laser light 2 reaches at the light path separating plane 25b, approximately 50% of the laser light 2 is reflected as a reflected light 2a on the separating plane. Also, approximately 50% of the laser light 2 is transmitted as a transmitted light 2b through the separating plane; thus, the light path is separated into two paths.

In the first light path, the reflected light 2a on the separating plane is reflected toward the incident plane 25a while being condensed by the positive power of the light path separating plane 25b. Consequently, entire reflected light 2a on the separating plane is reflected on the incident plane 25a; thus the light path of the reflected reflected light 2a on the separating plane is switched toward the emitting plane 25d near reflecting section. Thus, the light path is folded. The reflected light 2a on the separating plane is further emitted from the emitting plane 25d near reflecting section toward the light receiving plane 11c; thus, a small spot diameter is formed on the light receiving plane 11c. In addition, the position of the spot is measured by the light measuring device 10c; thus, the inclination of the reflecting plane 5c for measurement is measured.

In the second light path, the transmitted light 2b through the separating plane progresses linearly until reaching the emitting plane 25c near transmitting section. The transmitted light 2b on the separating plane is emitted while being condensed by the positive power of the emitting plane 25c near transmitting section; thus, a relatively larger spot than that on the light receiving plane 11c is formed on the light receiving plane 11a. Also, the length of the light path to the reflecting plane 5c for measurement is short; therefore, the movement amount of the spot is smaller than that on the light receiving plane 11c.

Here, above explanations are made with reference to FIG. 18A. FIG. 18B is a different case from FIG. 18A in that the movement direction of the spot on each light receiving plane is different.

Figure 12:
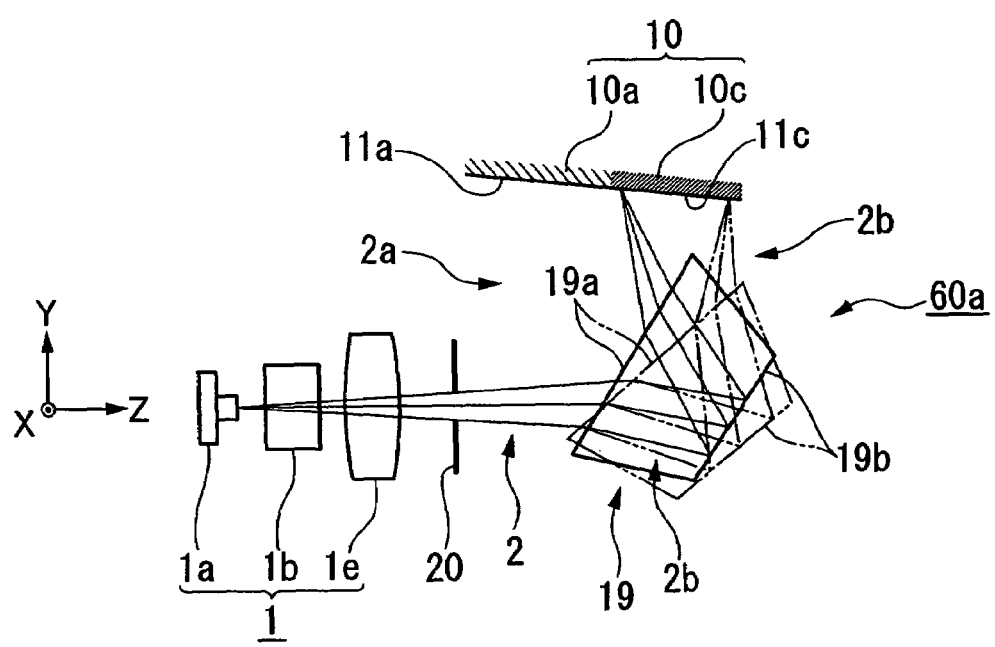
FIG. 12 is a general view for explaining a light path in the measuring optical system according to the third modified example of the first embodiment of the present invention.
Figure 19:
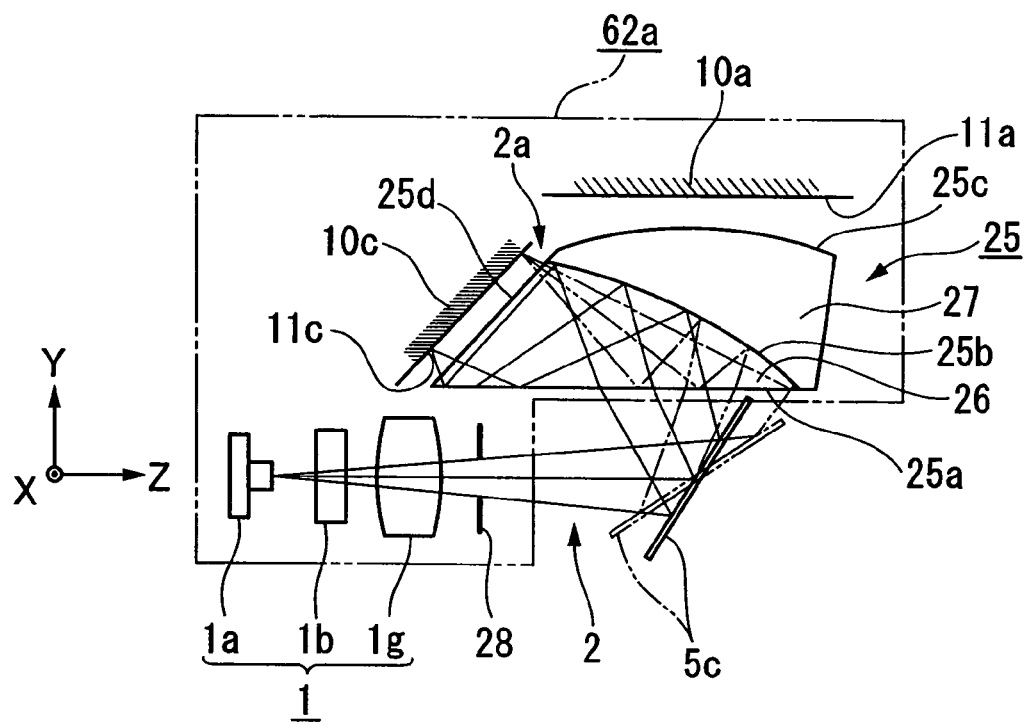
FIG. 19 is a general view for explaining a light path in the measuring optical system according to the second embodiment of the present invention.

FIG. 19 shows a general view for a light path in a case in which reflecting plane 5c for measurement is rotated by ±12 from the neutral position in the present embodiment. In FIG. 12, a continuous line indicates a position and a light path in a case reflecting plane 5c for measurement is rotated by +12°. A two-doted-line indicates a position and a light path in a case the reflecting plane 5c for measurement is rotated by −12. The second light path is not shown in the drawing because the spot is emitted outside of the range of the light receiving plane 11a.

As shown in FIG. 19, the reflected light 2a on the separating plane has a larger measuring range than that of the transmitted light 2b on the separating plane. In the reflected light 2a on the separating plane, a PSD is used for a light measuring device; thus, it is not necessary to cover a border line on the light receiving plane such as the four-divided light receiving device; therefore, it is possible to measure a broad range of angle.

According to the present embodiment having such a structure, a spot is formed having different sensitiveness and different measurement range such that it is possible to use the four-divided light receiving devices on the light receiving plane 11a preferably and it is possible to use the two-dimensional PSD on the light receiving plane 11c preferably.

Also, there is an advantage that it is possible to dispose the cemented optical element 25 and the light measuring section 10 in an array with an optical axis of the laser light source section 1 compactly.

Also, it is not necessary to fix the light path separating section on the test sample; therefore, there is an advantage in that it is possible to use the device for measuring a broad range of angle.

According to the measuring optical system 62a of the present embodiment, the cemented optical element 25 can be a the incident plane 25a as a flat plane which is disposed in parallel with the optical axis of the laser light source section 1. Therefore, it is possible to form members such as a mirror frame in a simple structure for supporting the measuring optical system 62a including an assembly operation of the cemented optical element 25. As a result, there is an advantage in that it is possible to perform a manufacturing operation and an assembly operation easily.

Also, in the cemented optical element 25, only two planes such as the light path separating plane 25b and the incident plane 25a which is made of a spherical prismatic plane have the power. Therefore, there is an advantage in that it is possible to form the cemented optical element 25 in a simple structure. In addition, the light path separating plane 25b has a power as a reflecting plane; therefore, there is an advantage in that it is possible to improve the optical characteristics of the spot, and furthermore, it is possible to improve the accuracy for measuring the angle.

The cemented optical element 25 folds the light path by using an entire reflection; thus, it is possible to reduce a loss in the light amount and reduce a stray light such as a flare. Therefore, there is an advantage in that it is possible to improve an accuracy for measuring angles.

Here, the explanations are made for the first embodiment and the second embodiment under condition that the two-dimensional PSDs are used for the light measuring devices 10c and 10d. However, more importantly, the present invention is not limited to such a structure; that is, any structure can be employed as long as it is possible to measure the position on the light measuring plane.

For example, it is possible to employ a two-dimensional CCD (Charge-Coupled Device). In such a case, it is possible to measure an optical intensity distribution of the spot per each pixel on the sensor; therefore, it is possible to perform an image-processing operation for a pixel signal preferably even if there is a partiality in the intensity distribution. Therefore, there is an advantage in that it is possible to calculate the optical intensity center accurately; thus, it is possible to improve an accuracy for measuring the angles. Also, even if a stray light is incident onto the light receive plane, it is possible to remove such a stray light from the signal component by performing the signal processing operation. Therefore, there is an advantage in that it is possible to measure the angles with high S/N ratio without a noise-reducing member such as a filter like a polarizing plate or a light-sealing plate.

Also, explanations are made for the first embodiment and the second embodiment under condition that the light receiving devices are disposed on a same flat plane, or in an array so as to neighbor each other. However, more importantly, it is acceptable if the positions of the light receiving devices may be shifted from each other. For example, a case can be acceptable in which the positions of the light receiving devices are movable such that the light receiving devices move in an optical axis direction or in an orthogonal direction of the optical axis direction according to a range in which the inclination of the test sample is variable; thus, it is possible to vary the sensitiveness and the measurement range.

Also, explanations are made for the first embodiment and the second embodiment under condition that the light separating plane reflects approximately 50% of the light flux and transmits approximately 50% of the light flux therethrough. Such a ration can be changed preferably. For example, it is acceptable to employ a ratio which may be compensate according to a difference between the reflection ratio in the first light path and the reflection ratio in the second light path. By doing this, it is possible to equalize the light amount of the spots on the light receiving plane; thus, there is an advantage in that it is possible to eliminate differences in the measurement accuracy.

Also, explanations are made for the first embodiment and the second embodiment under condition that the light path separating plane is formed on an cemented plane of the prismatic members and an outer periphery of the prismatic member. However, more importantly, any beam splitter can be used for the light path separating plane.

Also, the light path separating plane is not limited to a beam splitter. For example, it is possible to realize an light path separating plane by separating the light flux by using a wavelength-selective mirror such as a dichroic mirror while using a light source having a plurality of wavelengths. Also, it is possible to use a holographic element which has a wavelength-selectiveness preferably.

Also, for example, if a light flux is incident again in other position on the light path separating plane than that in the previous time as explained in the first modified example and the second modified example in the first embodiment, it may be acceptable if an operation for separating the light path is not performed on the position such that the entire light flux may be transmitted or reflected; thus, the light flux not be separated any more. By doing this, it is possible to prevent occurrence of the light amount loss and a noise such as a stray light.

Also, explanations are made for the first embodiment and the second embodiment under condition that the light separating plane reflects approximately 50% of the light flux and transmits approximately 50% of the light flux therethrough. However, more importantly, it may be accepted if a deviating/separating plane be used in which the light flux is separated according to the deviated light component. For example, if the light flux is separated into an S deviating component and a P deviating component, it is possible to realize an optimal reflection ration and an optimal transmission ratio for the deviated component by performing a thin film coating processing operation on a post-separation optical planes according to the deviated component. Therefore, it is possible to reduce or prevent the light amount loss; thus, there is an advantage in that it is possible to obtain a sufficient light amount so as to improve an accuracy for the measurement.

For such a deviated light separating plane, it is possible to use a deviating beam splitter.

Also, explanations are made for the first embodiment and the second embodiment under condition that a plurality of light fluxes are two light fluxes which are emitted from the light separating/deviating section or the light separating section. In the present invention, it is acceptable if the light flux is separated into three or more light fluxes.

Also, the disposition of the optical planes shown in the first embodiment and the second embodiment is an example which can be realized in the present invention. That is, more importantly, it is acceptable if other optical planes be added so as to form a device.

Also, explanations are made for the first embodiment and the second embodiment under condition that a plurality of optical planes in the light path separating/deviating section or the light path separating section is formed unitarily with the prismatic member and the likes. However, more importantly, it may be acceptable if optical planes such as a light path separating plane, other prismatic plane, and a reflecting plane be manufactured as different optical elements so as to be disposed in predetermined positions or contained in a mirror frame.

Also, for a plurality of optical planes, it is possible to employ various optical planes such as a diffraction grating, a Fresnel lens plane, a hologram plane, and a filter plane according to necessity in addition to the above structures.

Also, explanations are made for the first embodiment and the second embodiment under condition that the test sample in the angle measuring device is a light deviating element. However, more importantly, any member can be used for the test sample as long as it is possible to attach a reflecting plane for measurement or a light path separating/deviating section. Also any angle which is realized in a dynamic rotation is acceptable. Also, a static inclination is acceptable for an angle to be measured.

Also, explanations are made for the first embodiment and the second embodiment under condition that the light source is a semiconductor laser. However, more importantly, other laser light source such as a gas laser may be acceptable. Furthermore, not only the laser light source but also any light source can be used in the present invention. For example, it is preferably possible to use a light source having other wavelength such as an LED light source, and a light source in which the light is deviated variously.

Also, explanations are made for the first embodiment and the second embodiment under condition that a multiple measurement for angles is performed in which the sensitiveness for measuring the angle and the range for measuring the angle are different. However, more importantly, it may be acceptable if such various conditions are unified so as to measure the inclination of the test sample under the common condition for the measurement sensitiveness and the measurement. By doing this, it is possible to measure angles which are backed up multiply; thus, there is an advantage in that it is possible to improve reliability of the angle measuring device.

Also, explanations are made for the first embodiment and the second embodiment under condition that the light path separating section is a cemented optical element 25. However, more importantly, it is possible to employ all structures for a plurality of optical planes in the light path separating/deviating section which is explained in the first embodiment.

Third Embodiment

Next, an optical signal switching system according to a third embodiment of the present invention is explained.

Figure 20:
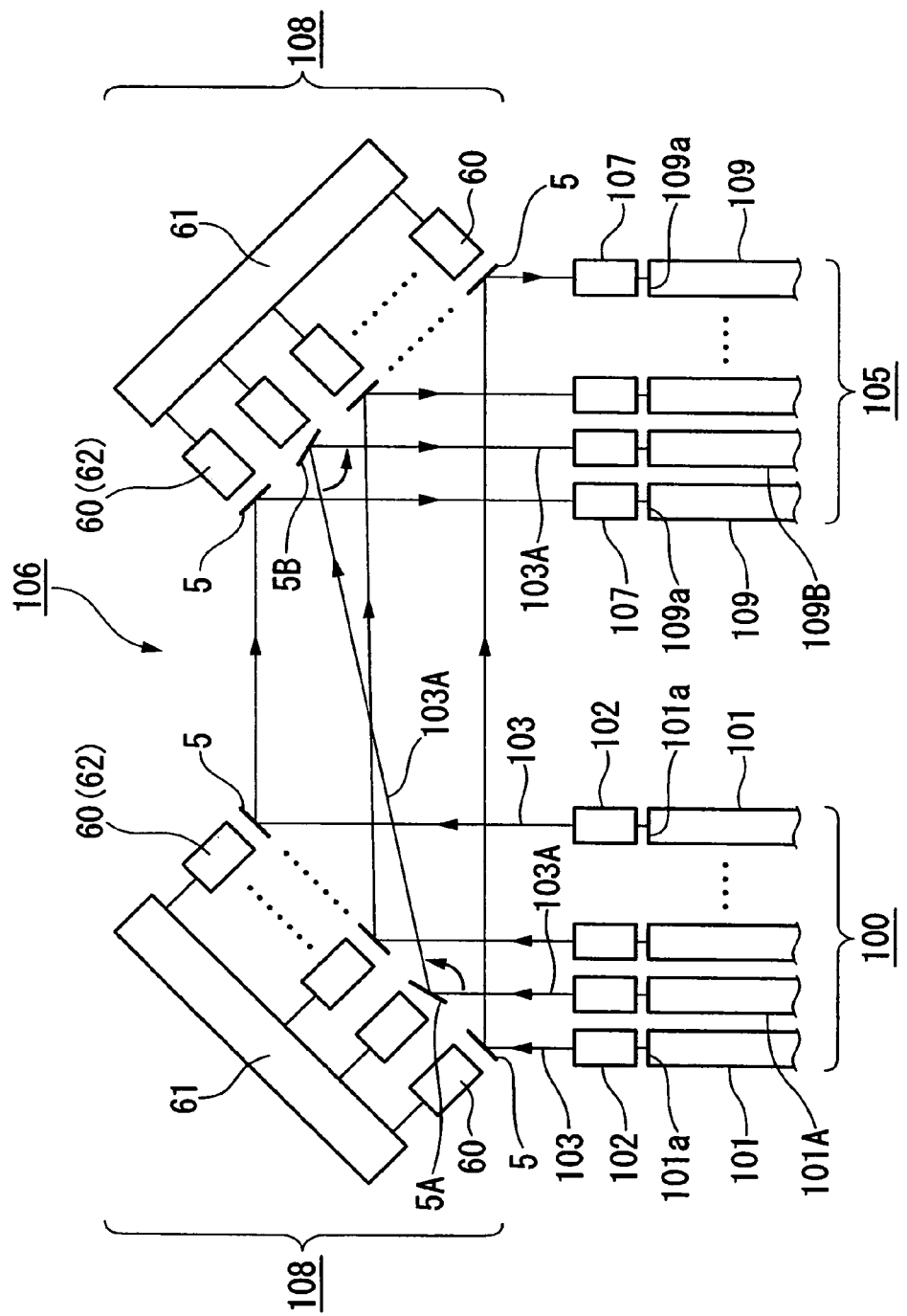
FIG. 20 is a general view for an optical signal switcing system according to a third embodiment of the present invention.
Figure 21:
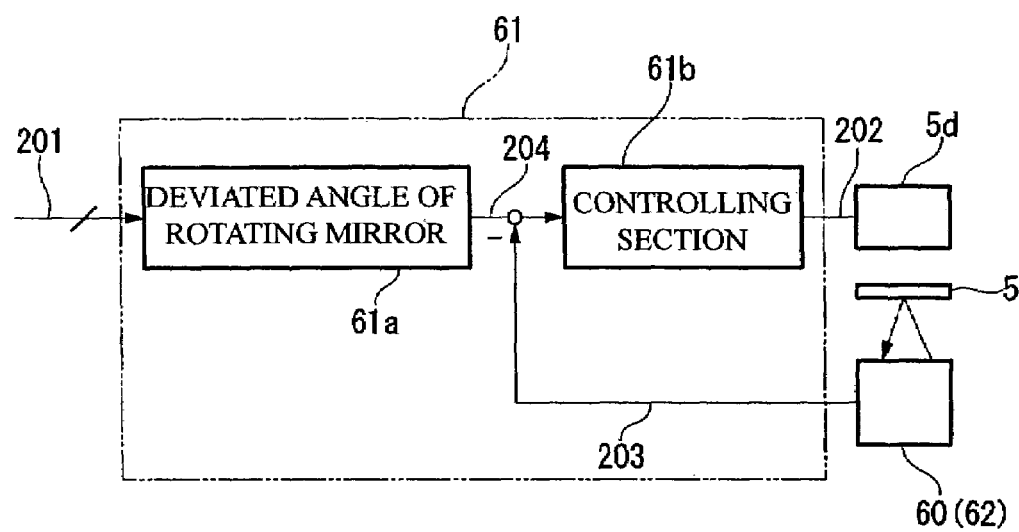
FIG. 21 is a block diagram for an angle controlling operation which is used in the optical signal switching system according to the third embodiment of the present invention.

FIG. 20 is a view for explaining a general structure of an optical signal switching system 106 according to the third embodiment of the present invention. FIG. 21 is a controlling block diagram for explaining a controlling operation for measuring angles which is operated in the optical signal switching system 106.

The present system comprises an inputting cable unit 100 which is made by bundling optical transmitting cables such as an optical fiber cable into which a laser light flux 103 . . . (optical signal) of which intensity·pulse width·frequency are modulated is transmitted according to an information signal, an outputting cable unit 105 which is formed by bundling optical transmitting cables such as an optical fiber cable for transmitting the laser light flux 103 . . . therethrough, and optical switching devices 108, 108 which is disposed between these units for deviating the laser light flux 103 . . . selectively.

An inputting cable unit 100 is formed by bundling a plurality of inputting cables 101 which are provided with emitting ports 101a for emitting the laser light flux 103 thereoutside which is transmitted through thereinside toward onto end sections of the optical transmitting cables which are formed by optical fiber cables which is formed by coating a spun glass fiber by a plastic member for protection. Collimator units 102 which serve to collimate the laser light flux 103 into a parallel light flux are disposed on optical axes of the emitting ports 101a respectively. In the inputting cables 101, the emitting ports 101a are disposed toward a common direction so as to be disposed regularly with a predetermined interval. The emitting ports are disposed in a lattice matrix manner such as 2×2 lattice matrix and 64×64 lattice matrix according to the quantity of the emitting ports.

Similarly, the outputting cable unit 105 is formed by bundling a plurality of outputting cables 109 which is formed by providing incident ports 109a for receiving an incident laser light flux 103 onto an end section of the optical transmitting cable. Focusing units 107 which serve for making an image of the laser light flux 103 are provided on the optical axis of the incident ports 109a respectively. In the outputting cables 109 . . . , incident direction for each incident port 109 . . . is directed to a common direction such that each of outputting cables 109 . . . are disposed in arrays in an organized order with a predetermined interval. The incident ports are disposed in a lattice matrix manner such as 2×2 lattice matrix and 64×64 lattice matrix according to the quantity of the incident ports.

Optical switching devices 108 are disposed in an outputting/incident direction of the laser light flux 103 in the inputting cable unit 100 and the outputting cable unit 105 respectively. An optical switching device 108 comprises a rotating mirror 5 (light deviating element) which can be incline in one-dimensional manner or two-dimensional manner, an angle measuring device 60 . . . for measuring the inclination (deviated angle) from a neutral position of the rotating mirror 5 respectively, and a deviated angle controlling section 61 for controlling the deviated angle of the rotating mirror 5 . . . with an output from the angle measuring device 60.

The angle measuring device 60 is explained for the first embodiment of the present invention.

For a rotating mirror 5 . . . , for example, it is possible to employ a rotating mirror which has a structure shown FIGS. 1 and 17 according to the first embodiment and the second embodiment of the present invention.

The optical switching devices 108, 108 are disposed so as to have a position relationship such that the rotating mirror 5 . . . are disposed so as to correspond to the emitting ports 101a. . . , and incident ports 109a. . . respectively, and the laser light flux 103 which is emitted from a predetermined emitting port 101a is reflected on the rotating mirrors 5, 5 respectively so as to be incident to a predetermined incident port 109a under condition that the inclination of the rotating mirror 5 . . . indicates the neutral position.

The rotating mirror 5 is disposed such that a deviating mirror plane 5a. . . is disposed in a direction into which the laser light flux 103 . . . is incident, and angle measuring devices 60 . . . for measuring the deviated angle and angle measuring devices 62 . . . are disposed on the light path separating/deviating sections 6 . . . or the reflecting planes 5c. . . for measurement on the back planes of the rotating mirror 5 so as to face each other.

A deviated angle controlling section 61 comprises a decoding section 61a which decodes a deviated angle controlling signal 201 for specifying the deviated angle so as to generate a target level signal 204 which corresponds to a target deviated angle of the rotating mirror 5 and a controlling section 61b which receives a deviation for the measured level signal 203 and the target level signal 204 from the angle measuring device 60 so as to generate a driving signal 202 for driving an actuator 5d.

In addition, the deviated angle controlling section 61 receives a deviated angle controlling signal 201 for specifying the rotating mirror 5 and the deviated angle of the rotating mirror 5 and a power supply voltage 200 from thereoutside so as to be connected to the actuator 5d and the angle measuring device 60 respectively electrically. The deviated angle controlling section 61 outputs the driving signal 202 for driving the actuator 5d; thus, the measured level signal 203 is inputted from the angle measuring device 60 which measures the deviated angle of the rotating mirror 5.

Next, operations of the optical signal switching system 106 are explained.

Under an ordinary relay condition in a transmitting path, the laser light flux 103 which is transmitted in an inputting cable 101 reaches to one of the emitting ports 101a. . . which are disposed in arrays regularly in a lattice matrix manner so as to be further emitted to thereoutside of the inputting cable 101. The emitted light flux is condensed by a collimator unit 102 so as to be shaped into a parallel beam having a preferable cross section area so as to prevent that a dust may disturb a light path; thus, the light flux is emitted in a direction toward the optical switching device 108.

Here, the rotating mirror 5 . . . in the neutral positions which are disposed in rear stages of the collimator unit 102 reflect certain laser light fluxes 103 toward a certain rotating mirror 5 which is in a neutral position of another optical switching device 108 so as to be incident onto one of the focusing units 107 . . . which correspond to the certain incident ports 109a. . . on the outputting cable units 105 which are disposed in arrays regularly. Consequently, the laser light flux 103 is transmitted through the focusing unit 107 into which the light flux 103 is incident so as to be focused in the incident port 109a of a predetermined optical cable 101 in the outputting cable unit 105; thus, the laser light flux 103 is incident into the incident port 109a so as to be transmitted further therethrough.

In the optical signal switching system 106 according to the present embodiment, the rotating mirror 5, 5 are inclined by a predetermined deviated angle from the neutral position so as to change a position to which the laser light flux 103 reaches. For example, in FIG. 20, in a case in which the laser light flux 103A which is emitted from a certain inputting cable 101A is switched from an ordinary relay condition to an outputting cable 109B, first, the deviated angle of the rotating mirror 5A is changed so as to deviated the laser light flux 103A toward the rotating mirror 5B. Other laser light flux 103 is incident into the outputting cable 109B in the neutral position by the rotating mirror 5B under an ordinary relay condition. In such a case, the deviated angle of the rotating mirror 5B is changed so as to correspond to an incident angle of the laser light flux 103A such that the laser light flux 103A be incident into the outputting cable 109B.

The emitting ports 101a. . . and the incident ports 109a. . . are disposed in arrays regularly respectively; therefore, the deviated angles of the rotating mirrors 5, 5 which make the emitting ports 101a to the incident ports 109a respectively are determined in advance according to a positioning relationship of the optical switching devices 108, 108. Therefore, it is possible to perform an optical signal switching operation by inclining certain rotating mirrors 5, 5 at a predetermined deviated angle.

That is, the inputting cable 101A for the laser light flux 103A which is supposed to be switched and the outputting cable 109B are specified. Consequently, each information is inputted into the deviated angle controlling section 61 in each optical switching device 108 from thereoutside by the deviated angle control signal so as to be further inputted into a decoding section 61a.

The target level signal 204 which corresponds to the target deviated angle of the rotating mirror 5 is generated by the decoding section 61a. The deviation between the target level signal 204 and the measured level signal 203 based on the deviated angle which is measured; thus, the target level signal 204 is inputted into the controlling section 61b. In the controlling section 61b, for example, an amplifying operation, a differentiating operation, or an integrating operation is performed to the deviation such that the driving signal 202 be adjusted and the deviated angle of the rotating mirror 5 converge to a target deviated angle; thus, the adjusted driving signal 202 is fed back to the actuator 5d.

By doing this, a feed-back controlling operation is performed by using the angle measuring device 60 as a measuring section; thus, the deviated angle of the rotating mirror 5 is adjusted so as to be the target deviated angle. Therefore, if, for example, a disturbance occurs and the deviated angle is shifted from the target deviated angle, the deviated angle is adjusted quickly according to the shift amount. That is, a real-time feed-back controlling operation is realized by the optical switching device 108 which is provided with the deviated angle controlling section 61 and the angle measuring device 60.

In the optical signal switching system 106 according to the present embodiment, the angle measuring device 60 according to the first embodiment of the present invention or the angle measuring device 62 according to the second embodiment of the present invention is used; therefore, it is possible to perform angle-measuring operation under multiple conditions. Therefore, for example, it is possible to perform an angle-measuring operation under multiple backed-up condition in which a plurality of sensitiveness for measuring the angles are common. Also, it is possible to form an optical switching system having a superior reliability in a compact size.

Also, it is possible to perform an deviated angle controlling operation under two conditions such as a rough-adjusting controlling operation and a fine-adjusting controlling operation such that the sensitiveness for measuring a plurality of angles are differentiated. As a result, there is an advantage in that it is possible to improve a range for measuring the angle and an accuracy for measuring the angles by a compact structure.

Fourth Embodiment

Next, an information recording/replaying system according to a fourth embodiment of the present invention is explained.

FIG. 22 is a plan view for explaining a general structure of the information recording/replaying system 110 according to the fourth embodiment of the present invention.

The present system comprises a recording disk 112 (recording medium) such as an optical disk and an optical magnetic disk for recording and replaying the information signal, a semiconductor laser 1 (light source) which emits a laser light flux 115 (light flux) of which intensity and pulse width are modulated according to the information signal, a focusing lens 116 for focusing the laser light flux 115 and a focusing lens unit 114, a rotating mirror 5 which is driven so as to deviate by an actuator (not shown in the drawing) for performing a fine-movement-tracking controlling operation by varying the incident position of the deviated laser light flux 115 into the focusing lens unit 114, an optical system which comprises an angle measuring device 60 according to the first embodiment of the present invention or an angle measuring device 62 according to the second embodiment of the present invention, and an arm 113 in which the above optical system is installed so as to move the optical system in parallel direction and a vertical direction to a recording plane of the recording disk 112.

The semiconductor laser 1 is connected to a laser driving section 1b for modulating the laser light source section 1 according to the information signal.

It is possible to employ a structure which is shown in FIGS. 1 and 17 for the rotating mirror 5.

Reference numeral 111 indicates a frame body in which a recording disk 112 is disposed to a driving shaft 112a which is driven by, for example, a DC-controlled motor. The recording disk 112 is supported so as to freely rotate around the driving shaft 112a.

The recording disk 112 is provided with a recording plane on either surface of the recording disk 112. It is possible to record and replay the optical signal by such a recording plane. Also, it is possible to perform either the recording operation or the replaying operation by the recording plane. A track signal is formed in a circumference direction of the formatted recording plane of the recording disk 112 so as to divide the recording position of the information signal in a radial direction logically.

The arm 113 is disposed above the recording plane so as to be supported flexibly and vertically against the recording disk 112. The arm 113 is supported by the rotating shaft 113a so as to rotate freely in parallel with the recording plane of the recording disk 112. A driving coil 117 which is formed by an electromagnetic coil or the like can drive and rotate the arm 113 around the rotating shaft 113.

The focusing lens 116 is formed so as to shape the laser light flux 115 which is emitted from the laser light source section 1 into, for example, a parallel beam preferably. The focusing lens unit 114 receives the laser light flux 115 so as to be focused on the recording plane. Also, the focusing lens unit 114 receives a reflected light from the recording plane such that each light receiving element receive the signal light which corresponds to the information signal, a focus detecting light for performing a focusing controlling operation, and a tracking detecting light for performing a tracking controlling operation.

The rotating mirror 5 is disposed between the focusing lens 116 and the focusing lens unit 114 together with the angle measuring device 60 so as to vary the incident position of the laser light flux 115 into the focusing lens unit 114 so as to perform the fine-movement tracking controlling operation.

Next, operations in the present system are explained mainly with reference to a tracking controlling operation according to the present invention.

First, the laser light flux 115 is emitted onto the recording plane of the recording disk 112. Next, the reflected laser light flux 115 is received in the focusing lens unit 114 so as to pick up the tracking signal; thus, information such as a position of the track and a shift amount from the track is collected. The rotation position of the arm 113 is roughly controlled by the driving coil 117 according to the collected information; thus, the arm 113 moves between the tracks and follows the track.

Furthermore, the rotating mirror 5 is inclined so as to perform more restrict tracking operation in which the laser light flux 115 is deviated so as to shift the incident position of the laser light flux 115 into the focusing lens unit 114; thus, the focusing position on the recording plane in the radial direction is finely moved. In such a case, the deviated angle of the rotating mirror 5 is measured by the angle measuring device 60 so as to perform the feed-back controlling operation. For such a feed-back controlling operation, it is possible to employ a deviated angle controlling method which is similar to the optical signal switching system according to the third embodiment of the present invention which is explained with reference to FIG. 21.

By doing this, it is possible to form the angle measuring devices 60, 62 compactly by forming the information recording/replaying system by using the angle measuring device 60 according to the first embodiment of the present invention or the angle measuring device 62 according to the second embodiment. Therefore, it is possible to form a light, small arm 113. Therefore, there is an advantage in that it is possible to improve a mechanical response.

Also, it is possible to perform an deviated angle controlling operation under two conditions such as a rough-adjusting controlling operation and a fine-adjusting controlling operation such that the sensitiveness for measuring a plurality of angles are differentiated. As a result, there is an advantage in that it is possible to improve a range for measuring the angle and an accuracy for measuring the angles by a compact structure.

EXAMPLE 1

First numerical data for the angle measuring device 60 according to the first embodiment which is explained above are explained with reference to FIG. 2A.

Parameters for forming the optical system for the first numerical data are shown as follows. Here, $r_i$, $d_i$, $n_i$ (n is an integer) correspond to $r_i$, $d_i$, $n_i$ for forming the optical system shown below. A laser ignition point (not shown in the drawing) is an physical plane. The light receiving planes 11a and 11b are image planes. The refractive index which is explained here is indicated for a d ray (wavelength: 587.56 nm). The wavelength of the light source is 785 nm.

The light path 101 is a light path in which the laser light 2 progresses as a reflected light 2a on the separating plane. The light path 102 is a light path in which the laser light 2 progresses as a transmitted light 2b on the separating plane. Here, same reference numerals are add to the common data in parenthesis "[ ]" as used in the light paths 1 and 2 for the free-form-surface and the eccentric disposition so as to avoid the duplication of the explanation.

Explanations for the coordinate system is omitted because it is already explained above. Letters $a$, $\beta$, $\gamma$ which are used for the eccentric disposition indicate angles around axes X, Y, Z in a counter-clockwise direction viewed in positive direction. Unit for the length is indicated by (mm). Unit for angles is indicated by (°).

Also, the reference point of the eccentric disposition and the center of the rotation are noted in the data preferably.

Also, a free-form-surface (FFS) is indicated by a following formula. In this definition formula, a Z-axis indicates an axis for the free-form-surface.

Formula 1

$$Z = cr^2 / \left[1 + \sqrt{\{1 - (1+k)c^2 r^2\}}\right] + \sum_{j=2}^{66} c_j X^m Y^n$$

Here, a first item in the above formula indicates a spherical plane item. A second item in the above formula indicates a free-form-surface item. Also, among the spherical plane items, c indicates a curvature of the top. A k indicates a conical constant.

Also, there is a relationship such as $r = \sqrt{(X^2 + Y^2)}$. It is possible to spread the FFS item as follows. Here, $C_j$ indicates an integer which is not smaller than 2).

Formula 2

$$\sum_{j=2}^{66} c_j X^m Y^n = C_2 X + C_3 Y + C_4 X^2 + C_5 XY + C_6 Y^2 + C_7 X^3 +$$
$$C_8 X^2 Y + C_9 XY^2 + C_{10} Y^3 + C_{11} X^4 + C_{12} X^3 Y + C_{13} X^2 Y^2 +$$
$$C_{14} XY^3 + C_{15} Y^4 + C_{16} X^5 + C_{17} X^4 Y + C_{18} X^3 Y^2 + C_{19} X^2 Y^3 +$$
$$C_{20} XY^4 + C_{21} Y^5 + C_{22} X^6 + C_{23} X^5 Y + C_{24} X^4 Y^2 + C_{25} X^3 Y^3 +$$
$$C_{26} X^2 Y^4 + C_{27} XY^5 + C_{28} Y^6 + C_{29} X^7 + C_{30} X^6 Y + C_{31} X^5 Y^2 +$$
$$C_{32} X^4 Y^3 + C_{33} X^3 Y^4 + C_{34} X^2 Y^5 + C_{35} XY^6 + C_{36} Y^7 + \ldots$$

Here, "$C_j$" is described as "Cj" for the purpose of simpler explanation. Also, it should be understood that a coefficient c, Cj which are not accompanied with any data indicate 0 (zero).

| | | Light path 1 | | | |
|---|---|---|---|---|---|
| Surface No. | Radius of Curvature | Surface Interval | Eccentricity | Refractive Index | Abbe's Number |
| Physical Surface | ∞ | $d_0 = 0.50$ | | | |
| 1 | $r_1 = \infty$ | $d_1 = 1.00$ | | $n_1 = 1.5163$ | $v_1 = 64.1$ |
| 2 | $r_2 = \infty$ | $d_2 = 0.50$ | | | |

-continued

Light path 1

| Surface No. | Radius of Curvature | Surface Interval | Eccentricity | Refractive Index | Abbe's Number |
|---|---|---|---|---|---|
| 3 | $r_3 = 8.00$ | $d_3 = 1.00$ | | $n_2 = 1.5163$ | $\nu_2 = 64.1$ |
| 4 | $r_4 = 1.50$ | $d_4 = 1.50$ | | | |
| 5 | Aperture Surface | $d_5 = 2.00$ | | | |
| 6 | $r_6 = \infty$ | $d_6 = 0.00$ | Eccentricity [1] (Reference Point for Planes 7 to 10, Rotational Center) | | |
| 7 | FFS [1] | $d_7 = 0.00$ | Eccentricity [2] | $n_3 = 1.5163$ | $\nu_3 = 64.1$ |
| 8 | FFS [2] | $d_8 = 0.00$ | Eccentricity [3] | $n_3 = 1.5163$ | $\nu_3 = 64.1$ |
| 10 | FFS [2] | $d_{10} = 0.00$ | Eccentricity [3] | $n_3 = 1.5163$ | $\nu_3 = 64.1$ |
| 11 | FFS [1] | $d_{11} = 0.00$ | Eccentricity [2] | | |
| 12 | $r_{12} = \infty$ | $d_{12} = 0.00$ | | | |
| 13 | $r_{13} = \infty$ | $d_{13} = 0.00$ | Eccentricity [4](Plane 5 is a Reference Point) | | |
| Image Surface | $\infty$ | 0.00 | | | |

FFS [1]
C4   $3.5672 \times 10^{-2}$   C6   $1.2979 \times 10^{-1}$   C8   $3.0319 \times 10^{-3}$ FFS [2]
c    0.01444
C4   $-2.9151 \times 10^{-2}$   C6   $1.0956 \times 10^{-2}$   C8   $1.0098 \times 10^{-3}$
C10  $-7.4392 \times 10^{-4}$ Eccentricity [1]
X   0.00   Y   0.00   Z   0.00
$\alpha$   0.00   $\beta$   0.00   $\gamma$   0.00
Eccentricity [2]
X   0.00   Y   -0.33   Z   -0.95
$\alpha$   -9.82   $\beta$   0.00   $\gamma$   0.00
Eccentricity [3]
X   0.00   Y   -3.65   Z   -0.04
$\alpha$   -16.81   $\beta$   0.00   $\gamma$   0.00
Eccentricity [4]
X   0.00   Y   3.00   Z   -2.34
$\alpha$   136.54   $\beta$   0.00   $\gamma$   0.00

Light path 2

| Surface No. | Radius of Curvature | Surface Interval | Eccentricity | Refractive Index | Abbe's Number |
|---|---|---|---|---|---|
| Physical Surface | $\infty$ | $d_0 = 0.50$ | | | |
| 1 | $r_1 = \infty$ | $d_1 = 1.00$ | | $n_1 = 1.5163$ | $\nu_1 = 64.1$ |
| 2 | $r_2 = \infty$ | $d_2 = 0.50$ | | | |
| 3 | $r_3 = 8.00$ | $d_3 = 1.00$ | | $n_2 = 1.5163$ | $\nu_2 = 64.1$ |
| 4 | $r_4 = -8.00$ | $d_4 = 1.50$ | | | |
| 5 | Aperture Surface | $d_5 = 2.00$ | | | |
| 6 | $r_6 = \infty$ | $d_6 = 0.00$ | Eccentricity [1] (Reference Point for Planes 7 to 10, Rotational Center) | | |
| 7 | FFS [1] | $d_7 = 0.00$ | Eccentricity [2] | $n_3 = 1.5163$ | $\nu_3 = 64.1$ |
| 8 | FFS [2] | $d_8 = 0.00$ | Eccentricity [3] | $n_3 = 1.5163$ | $\nu_4 = 64.1$ |
| 9 | FFS [3] | $d_9 = 0.00$ | Eccentricity [5] | $n_4 = 1.5163$ | $\nu_4 = 64.1$ |
| 11 | FFS [1] | $d_{11} = 0.00$ | Eccentricity [2] | | |
| 12 | $r_{12} = \infty$ | $d_{12} = 0.00$ | | | |
| 13 | $r_{13} = \infty$ | $d_{13} = 0.00$ | Eccentricity [4](Plane 5 is a Reference Point) | | |
| Image Surface | $\infty$ | 0.00 | | | |

FFS [3]
c    -0.0668
C4   $8.4300 \times 10^{-3}$   C6   $3.3887 \times 10^{-2}$   C8   $-2.0433 \times 10^{-4}$
C10  $3.3733 \times 10^{-4}$ Eccentricity [5]
X   0.00   Y   3.55   Z   6.07
$\alpha$   -27.88   $\beta$   0.00   $\gamma$   0.00

As explained above, in the present example, it is possible to form a cemented optical element 6A in which a prismatic plane 6a is formed to be a rotationally-asymmetric free-form-surface, and the light path separating plane 6b and the reflecting plane 6c are formed to be rotationally-asymmetric free-form-surfaces.

EXAMPLE 2

Next, numerical data for the angle measuring device 60 according to the first embodiment which is explained above are explained with reference to FIG. 6A.

Parameters for the optical system according to the example 2 are shown as follows. Here, definitions for $r_i$, $d_i$, $n_i$, coordinate system, unit, refractive index, free-form-surface formula are the same as those explained in the example 1.

Light path 1

| Surface No. | Radius of Curvature | Surface Interval | Eccentricity | Refractive Index | Abbe's Number |
|---|---|---|---|---|---|
| Physical Surface | $\infty$ | $d_0 = 0.50$ | | | |
| 1 | $r_1 = \infty$ | $d_1 = 1.00$ | | $n_1 = 1.5163$ | $v_1 = 64.1$ |
| 2 | $r_2 = \infty$ | $d_2 = 0.50$ | | | |
| 3 | $r_3 = 8.00$ | $d_3 = 1.00$ | | $n_2 = 1.5163$ | $v_2 = 64.1$ |
| 4 | $r_4 = 8.00$ | $d_4 = 1.50$ | | | |
| 5 | Aperture Surface | $d_5 = 2.00$ | | | |
| 6 | $r_6 = \infty$ | $d_6 = 0.00$ | Eccentricity [1] (Reference Point for Planes 7 to 10, Rotational Center) | | |
| 7 | FFS [1] | $d_7 = 0.00$ | Eccentricity [2] | $n_3 = 1.5163$ | $v_3 = 64.1$ |
| 8 | FFS [2] | $d_8 = 0.00$ | Eccentricity [3] | $n_3 = 1.5163$ | $v_3 = 64.1$ |
| 10 | FFS [2] | $d_{10} = 0.00$ | Eccentricity [3] | $n_3 = 1.5163$ | $v_3 = 64.1$ |
| 11 | FFS [1] | $d_{11} = 0.00$ | Eccentricity [2] | | |
| 12 | $r_{12} = \infty$ | $d_{12} = 0.00$ | | | |
| 13 | $r_{13} = \infty$ | $d_{13} = 0.00$ | Eccentricity[4](Plane 5 is a Reference Point) | | |
| Image Surface | $\infty$ | 0.00 | | | |

| | | FFS [1] | | | |
|---|---|---|---|---|---|
| C4 | $9.6860 \times 10^{-2}$ | C6 | $1.11268 \times 10^{-1}$ | C8 | $5.5998 \times 10^{-3}$ |
| | | FFS [2] | | | |
| c | $-0.0015$ | | | | |
| C4 | $-5.33531 \times 10^{-2}$ | C6 | $1.0616 \times 10^{-2}$ | C8 | $-5.7472 \times 10^{-12}$ |
| C10 | $2.6785 \times 10^{-5}$ | | | | |

Eccentricity [1]
X   0.00  Y   0.00  Z   0.00
α   0.00  β   0.00  γ   0.00
Eccentricity [2]
X   0.00  Y   −0.34  Z   −0.94
α   −22.33  β   0.00  γ   0.00
Eccentricity [3]
X   0.00  Y   −2.95  Z   −0.68
α   −33.46  β   0.00  γ   0.00
Eccentricity [4]
X   0.00  Y   3.00  Z   0.32
α   107.82  β   0.00  γ   0.00

Light path 2

| Surface No. | Radius of Curvature | Surface Interval | Eccentricity | Refractive Index | Abbe's Number |
|---|---|---|---|---|---|
| Physical Surface | $\infty$ | $d_0 = 0.50$ | | | |
| 1 | $r_1 = \infty$ | $d_1 = 1.00$ | | $n_1 = 1.5163$ | $v_1 = 64.1$ |
| 2 | $r_2 = \infty$ | $d_2 = 0.50$ | | | |

-continued

Light path 2

| Surface No. | Radius of Curvature | Surface Interval | Eccentricity | Refractive Index | Abbe's Number |
|---|---|---|---|---|---|
| 3 | $r_3 = 8.00$ | $d_3 = 1.00$ | | $n_2 = 1.5163$ | $v_2 = 64.1$ |
| 4 | $r_4 = -8.00$ | $d_4 = 1.50$ | | | |
| 5 | Aperture Surface | $d_5 = 2.00$ | | | |
| 6 | $r_6 = \infty$ | $d_6 = 0.00$ | Eccentricity [1] (Reference Point for Planes 7 to 10, Rotational Center) | | |
| 7 | FFS [1] | $d_7 = 0.00$ | Eccentricity [2] | $n_3 = 1.5163$ | $v_3 = 64.1$ |
| 8 | FFS [2] | $d_8 = 0.00$ | Eccentricity [3] | $n_4 = 1.5163$ | $v_4 = 64.1$ |
| 9 | FFS [3] | $d_9 = 0.00$ | Eccentricity [3] | $n_4 = 1.5163$ | $v_4 = 64.1$ |
| 11 | FFS [1] | $d_{11} = 0.00$ | Eccentricity [2] | | |
| 12 | $r_{12} = \infty$ | $d_{12} = 0.00$ | | | |
| 13 | $r_{13} = \infty$ | $d_{13} = 0.00$ | Eccentricity [4](Plane 5 is a Reference Point) | | |
| Image Surface | $\infty$ | 0.00 | | | |

FFS [3]
c    −0.0822
C4   −3.5203 × 10⁻³   C6   4.1493 × 10⁻²   C8   −5.2570 × 10⁻¹²
C10   8.9237 × 10⁻⁶

Eccentricity [5]
X    0.00   Y   5.01   Z   8.25
α   −33.36   β   0.00   γ   0.00

As explained above, in the present embodiment, it is possible to form a cemented optical element 6B such that the prismatic plane 6a be an eccentric rotationally asymmetric free-form-surface and the light path separating plane 6b and the reflecting plane 6c be eccentric axially symmetric aspherical planes.

EXAMPLE 3

Next, a third numerical data for the angle measuring device 60 according to the second modified example according to the first embodiment which is explained above is explained with reference to FIG. 9A. Here, definitions for $r_i$, $d_i$, $n_i$, coordinate system, unit, refractive index, free-form-surface formula are the same as those explained in the example 1.

Light path 1

| Surface No. | Radius of Curvature | Surface Interval | Eccentricity | Refractive Index | Abbe's Number |
|---|---|---|---|---|---|
| Physical Surface | $\infty$ | $d_0 = 0.50$ | | | |
| 1 | $r_1 = \infty$ | $d_1 = 1.00$ | | $n_1 = 1.5163$ | $v_1 = 64.1$ |
| 2 | $r_2 = \infty$ | $d_2 = 0.50$ | | | |
| 3 | $r_3 = 5.00$ | $d_3 = 1.00$ | | $n_2 = 1.5163$ | $v_2 = 64.1$ |
| 4 | $r_4 = -5.00$ | $d_4 = 1.50$ | | | |
| 5 | Aperture Surface | $d_5 = 2.00$ | | | |
| 6 | $r_6 = \infty$ | $d_6 = 0.00$ | Eccentricity [1] (Reference Point for Plane 7, Rotational Center) | | |
| 7 | FFS [1] | $d_7 = 0.00$ | Eccentricity [2] | | |
| 10 | $r_{10} = \infty$ | $d_{10} = 0.00$ | | | |
| 11 | $r_{11} = \infty$ | $d_{11} = 10.00$ | Eccentricity [3] | (Plane 5 is a Reference Point) | |
| Image Surface | $\infty$ | 0.00 | | | |

FFS [1]
C4   −8.5083 × 10⁻²   C6   −1.2016 × 10⁻²   C8   1.6672 × 10⁻²
C10   1.3843 × 10⁻³

Eccentricity [1]
X    0.00   Y   0.00   Z   0.00
α    0.00   β   0.00   γ   0.00
Eccentricity [2]
X    0.00   Y   −0.28   Z   −1.00
α   −46.04   β   0.00   γ   0.00

-continued

Light path 1

| Surface No. | Radius of Curvature | Surface Interval | Eccentricity | Refractive Index | Abbe's Number |
|---|---|---|---|---|---|

Eccentricity [3]
X  0.00  Y  4.00  Z  0.00
α  85.03  β  0.00  γ  0.00

Light path 2

| Surface No. | Radius of Curvature | Surface Interval | Eccentricity | Refractive Index | Abbe's Number |
|---|---|---|---|---|---|
| Physical Surface | ∞ | $d_0 = 0.50$ | | | |
| 1 | $r_1 = \infty$ | $d_1 = 1.00$ | | $n_1 = 1.5163$ | $v_1 = 64.1$ |
| 2 | $r_2 = \infty$ | $d_2 = 0.50$ | | | |
| 3 | $r_3 = 5.00$ | $d_3 = 1.00$ | | $n_2 = 1.5163$ | $v_2 = 64.1$ |
| 4 | $r_4 = -5.00$ | $d_4 = 1.50$ | | | |
| 5 | Aperture Surface | $d_5 = 2.00$ | | | |
| 6 | $r_6 = \infty$ | $d_6 = 0.00$ | Eccentricity [1] (Reference Point for Planes 7 to 9, Rotational Center) | | |
| 7 | FFS [1] | $d_7 = 0.00$ | Eccentricity [2] | $n_3 = 1.5163$ | $v_3 = 64.1$ |
| 8 | FFS [2] | $d_8 = 0.00$ | Eccentricity [4] | $n_4 = 1.5163$ | $v_4 = 64.1$ |
| 9 | FFS [3] | $d_9 = 0.00$ | Eccentricity [5] | | |
| 10 | $r_{10} = \infty$ | $d_{10} = 0.00$ | | | |
| 11 | $r_{11} = \infty$ | $d_{11} = 0.00$ | Eccentricity [3](Plane 5 is a Reference Point) | | |
| Image Surface | ∞ | 0.00 | | | |

FFS [2]
C4  $-7.5221 \times 10^{-2}$   C6  $-5.3391 \times 10^{-2}$   C8  $5.6950 \times 10^{-3}$
C10  $-5.0902 \times 10^{-3}$ FFS [3]
C4  $1.8169 \times 10^{-1}$   C6  $2.3502 \times 10^{-1}$   C8  $-2.2068 \times 10^{-2}$
C10  $-2.2779 \times 10^{-1}$ Eccentricity [4]
X  0.00  Y  −0.08  Z  2.82
α  −50.79  β  0.00  γ  0.00
Eccentricity [5]
X  0.00  Y  1.79  Z  2.13
α  −106.57  β  0.00  γ  0.00

As explained above, in the present embodiment, it is possible to form a prismatic optical element 17 such that the light path separating plane 17a, the reflecting plane 17b, and the prismatic plane 17c be eccentric rotationally asymmetric free-form-surfaces.

EXAMPLE 4

Next, a fourth numerical data for the angle measuring device 60 according to the third modified example according to the first embodiment which is explained above is explained with reference to FIG. 11A. Here, definitions for $r_i$, $d_i$, $n_i$, coordinate system, unit, refractive index, free-form-surface formula are the same as those explained in the example 1.

Light path 1

| Surface No. | Radius of Curvature | Surface Interval | Eccentricity | Refractive Index | Abbe's Number |
|---|---|---|---|---|---|
| Physical Surface | $\infty$ | $d_0 = 0.50$ | | | |
| 1 | $r_1 = \infty$ | $d_1 = 1.00$ | | $n_1 = 1.5163$ | $\nu_1 = 64.1$ |
| 2 | $r_2 = \infty$ | $d_2 = 0.50$ | | | |
| 3 | $r_3 = 4.50$ | $d_3 = 1.00$ | | $n_2 = 1.5163$ | $\nu_2 = 64.1$ |
| 4 | $r_4 = -4.50$ | $d_4 = 1.50$ | | | |
| 5 | Aperture Surface | $d_5 = 2.00$ | | | |
| 6 | $r_6 = \infty$ | $d_6 = 0.00$ | Eccentricity [1] (Reference Point for Plane 7, Rotational Center) | | |
| 7 | FFS [1] | $d_7 = 0.00$ | Eccentricity [2] | | |
| 10 | $r_{10} = \infty$ | $d_{10} = 0.00$ | | | |
| 11 | $r_{11} = \infty$ | $d_{11} = 10.00$ | Eccentricity [3] (Plane 5 is a Reference Point) | | |
| Image Surface | $\infty$ | 0.00 | | | |

FFS [1]
C4   $-4.4568 \times 10^{-2}$   C6   $2.9456 \times 10^{-2}$   C8   $8.6364 \times 10^{-3}$
C10  $6.0985 \times 10^{-3}$ Eccentricity [1]
X   0.00   Y   0.00   Z   0.00
$\alpha$   0.00   $\beta$   0.00   $\gamma$   0.00
Eccentricity [2]
X   0.00   Y   2.10   Z   1.90
$\alpha$   -41.59   $\beta$   0.00   $\gamma$   0.00
Eccentricity [3]
X   0.00   Y   4.00   Z   0.00
$\alpha$   85.00   $\beta$   0.00   $\gamma$   0.00

Light path 2

| Surface No. | Radius of Curvature | Surface Interval | Eccentricity | Refractive Index | Abbe's Number |
|---|---|---|---|---|---|
| Physical Surface | $\infty$ | $d_0 = 0.50$ | | | |
| 1 | $r_1 = \infty$ | $d_1 = 1.00$ | | $n_1 = 1.5163$ | $\nu_1 = 64.1$ |
| 2 | $r_2 = \infty$ | $d_2 = 0.50$ | | | |
| 3 | $r_3 = 4.50$ | $d_3 = 1.00$ | | $n_2 = 1.5163$ | $\nu_2 = 64.1$ |
| 4 | $r_4 = -4.50$ | $d_4 = 1.50$ | | | |
| 5 | Aperture Surface | $d_5 = 2.00$ | | | |
| 6 | $r_6 = \infty$ | $d_6 = 0.00$ | Eccentricity [1] (Reference Point for Planes 7 to 9, Rotational Center) | | |
| 7 | FFS [1] | $d_7 = 0.00$ | Eccentricity [2] | $n_3 = 1.5163$ | $\nu_3 = 64.1$ |
| 8 | FFS [2] | $d_8 = 0.00$ | Eccentricity [4] | $n_4 = 1.5163$ | $\nu_4 = 64.1$ |
| 9 | FFS [1] | $d_9 = 0.00$ | Eccentricity [2] | | |
| 10 | $r_{10} = \infty$ | $d_{10} = 0.00$ | | | |
| 11 | $r_{11} = \infty$ | $d_{11} = 0.00$ | Eccentricity [3](Plane 5 is a Reference Point) | | |
| Image Surface | $\infty$ | 0.00 | | | |

FFS [2]
C4   $-8.8484 \times 10^{-2}$   C6   $-4.2308 \times 10^{-2}$   C8   $-5.8467 \times 10^{-3}$
C10  $-7.5986 \times 10^{-4}$ Eccentricity [4]
X   0.00   Y   0.12   Z   3.21
$\alpha$   -37.50   $\beta$   0.00   $\gamma$   0.00

As explained above, in the present embodiment, it is possible to form a prismatic optical element 19 such that the light path separating plane 19a and the reflecting plane 19b be eccentric rotationally asymmetric free-form-surfaces.

EXAMPLE 5

Next, a fifth numerical data for the angle measuring device 60 according to the fourth modified example according to the first embodiment which is explained above is explained with reference to FIG. 11A. Here, definitions for $r_i$, $d_i$, $n_i$, coordinate system, unit, refractive index, free-form-surface formula are the same as those explained in the example 1.

Light path 1

| Surface No. | Radius of Curvature | Surface Interval | Eccentricity | Refractive Index | Abbe's Number |
|---|---|---|---|---|---|
| Physical Surface | $\infty$ | $d_0 = 0.50$ | | | |
| 1 | $r_1 = \infty$ | $d_1 = 1.00$ | | $n_1 = 1.5163$ | $v_1 = 64.1$ |
| 2 | $r_2 = \infty$ | $d_2 = 0.50$ | | | |
| 3 | $r_3 = 5.00$ | $d_3 = 1.00$ | | $n_2 = 1.5163$ | $v_2 = 64.1$ |
| 4 | $r_4 = -5.00$ | $d_4 = 1.50$ | | | |
| 5 | Aperture Surface | $d_5 = 10.00$ | | | |
| 6 | $r_6 = \infty$ | $d_6 = 0.00$ | | Eccentricity [1] (Reference Point for Plane 7, Rotational Center) | |
| 7 | FFS [1] | $d_7 = 0.00$ | Eccentricity [2] | | |
| 10 | $r_{10} = \infty$ | $d_{10} = 0.00$ | | | |
| 11 | $r_{11} = \infty$ | $d_{11} = 0.00$ | Eccentricity [3] | (Plane 5 is a Reference Point) | |
| Image Surface | $\infty$ | 0.00 | | | |

FFS [1]
C4  $7.4146 \times 10^{-2}$   C6  $-1.4954 \times 10^{-2}$   C8  $2.1190 \times 10^{-2}$
C10 $2.0204 \times 10^{-3}$ Eccentricity [1]
X    0.00  Y   0.00  Z    0.00
$\alpha$  0.00  $\beta$  0.00  $\gamma$  0.00
Eccentricity [2]
X    0.00  Y   6.92  Z   -4.30
$\alpha$ -12.90 $\beta$  0.00  $\gamma$  0.00
Eccentricity [3]
X    0.00  Y  10.35  Z   10.62
$\alpha$ 80.36  $\beta$  0.00  $\gamma$  0.00

Light path 2

| Surface No. | Radius of Curvature | Surface Interval | Eccentricity | Refractive Index | Abbe's Number |
|---|---|---|---|---|---|
| Physical Surface | $\infty$ | $d_0 = 0.50$ | | | |
| 1 | $r_1 = \infty$ | $d_1 = 1.00$ | | $n_1 = 1.5163$ | $v_1 = 64.1$ |
| 2 | $r_2 = \infty$ | $d_2 = 0.50$ | | | |
| 3 | $r_3 = 5.00$ | $d_3 = 1.00$ | | $n_2 = 1.5163$ | $v_2 = 64.1$ |
| 4 | $r_4 = 5.00$ | $d_4 = 1.50$ | | | |
| 5 | Aperture Surface | $d_5 = 10.00$ | | | |
| 6 | $r_6 = \infty$ | $d_6 = 0.00$ | | Eccentricity [1] (Reference Point for Planes 7 to 9, Rotational Center) | |
| 7 | FFS [1] | $d_7 = 0.00$ | Eccentricity [2] | $n_3 = 1.5163$ | $v_3 = 64.1$ |
| 8 | FFS [2] | $d_8 = 0.00$ | Eccentricity [4] | $n_3 = 1.5163$ | $v_3 = 64.1$ |
| 9 | FFS [3] | $d_9 = 0.00$ | Eccentricity [5] | | |
| 10 | $r_{10} = \infty$ | $d_{10} = 0.00$ | | | |

-continued

Light path 2

| Surface No. | Radius of Curvature | Surface Interval | Eccentricity | Refractive Index | Abbe's Number |
|---|---|---|---|---|---|
| 11 | $r_{11} = \infty$ | $d_{11} = 0.00$ | Eccentricity [3](Plane 5 is a Reference Point) | | |
| Image Surface | $\infty$ | 0.00 | | | |
| | FFS [2] | | | | |
| C4 | $-3.3774 \times 10^{-2}$ | C6 $-2.2742 \times 10^{-2}$ | C8 | $7.7917 \times 10^{-3}$ | |
| C10 | $-5.4768 \times 10^{-4}$ | | | | |
| | FFS [3] | | | | |
| C4 | $1.1758 \times 10^{-1}$ | C6 $5.5096 \times 10^{-2}$ | C8 | $4.9930 \times 10^{-2}$ | |
| C10 | $-9.2125 \times 10^{-3}$ | | | | |

Eccentricity [4]
X  0.00  Y  4.94  Z  −1.01
α  −115.62  β  0.00  γ  0.00

As explained above, in the present embodiment, it is possible to form a prismatic optical element 21 such that the light path separating plane 21*a*, the reflecting plane 21*b*, and the prismatic plane 21*c* be eccentric rotationally asymmetric free-form-surfaces.

EXAMPLE 6

Next, a sixth numerical data for the angle measuring device 60 according to the fifth modified example according to the first embodiment which is explained above is explained with reference to FIG. 15A. Here, definitions for $r_i$, $d_i$, $n_i$, coordinate system, unit, refractive index, free-form-surface formula are the same as those explained in the example 1.

Light path 1

| Surface No. | Radius of Curvature | Surface Interval | Eccentricity | Refractive Index | Abbe's Number |
|---|---|---|---|---|---|
| Physical Surface | $\infty$ | $d_0 = 0.50$ | | | |
| 1 | $r_1 = \infty$ | $d_1 = 1.00$ | | $n_1 = 1.5163$ | $v_1 = 64.1$ |
| 2 | $r_2 = \infty$ | $d_2 = 0.50$ | | | |
| 3 | $r_3 = 2.50$ | $d_3 = 1.00$ | | $n_2 = 1.5163$ | $v_2 = 64.1$ |
| 4 | $r_4 = -2.50$ | $d_4 = 1.50$ | | | |
| 5 | Aperture Surface | $d_5 = 14.00$ | | | |
| 6 | $r_6 = \infty$ | $d_6 = 0.00$ | Eccentricity[1] (Reference Point for Plane 7, Rotational Center) | | |
| 7 | FFS[1] | $d_7 = 0.00$ | Eccentricity [2] | | |
| 12 | $r_{12} = \infty$ | $d_{12} = 0.00$ | | | |
| 13 | $r_{13} = \infty$ | $d_{13} = 0.00$ | Eccentricity [3] (Plane 5 is a Reference Point) | | |
| Image Surface | $\infty$ | 0.00 | | | |
| | FFS[1] | | | | |
| C4 | $-5.9388 \times 10^{-2}$ | C6 $-1.8954 \times 10^{-2}$ | C8 | $2.8868 \times 10^{-2}$ | |
| C10 | $-1.6388 \times 10^{-3}$ | | | | |

Eccentricity [1]
X  0.00  Y  0.00  Z  0.00
α  0.00  β  0.00  γ  0.00
Eccentricity [2]
X  0.00  Y  −3.90  Z  −10.80
α  −38.67  β  0.00  γ  0.00
Eccentricity [3]
X  0.00  Y  9.53  Z  1.28
α  149.43  β  0.00  γ  0.00

| | | Light path 2 | | | |
|---|---|---|---|---|---|
| Surface No. | Radius of Curvature | Surface Interval | Eccentricity | Refractive Index | Abbe's Number |
| Physical Surface | ∞ | $d_0 = 0.50$ | | | |
| 1 | $r_1 = \infty$ | $d_1 = 1.00$ | | $n_1 = 1.5163$ | $v_1 = 64.1$ |
| 2 | $r_2 = \infty$ | $d_2 = 0.50$ | | | |
| 3 | $r_3 = 2.50$ | $d_3 = 1.00$ | | $n_2 = 1.5163$ | $v_2 = 64.1$ |
| 4 | $r_4 = -2.50$ | $d_4 = 1.50$ | | | |
| 5 | Aperture Surface | $d_5 = 14.00$ | | | |
| 6 | $r_6 = \infty$ | $d_6 = 0.00$ | Eccentricity[1] (Reference Point for Planes 7 to 11, Rotational Center) | | |
| 7 | FFS[1] | $d_7 = 0.00$ | Eccentricity [2] | $n_3 = 1.5163$ | $v_3 = 64.1$ |
| 8 | FFS[2] | $d_8 = 0.00$ | Eccentricity [4] | $n_3 = 1.5163$ | $v_3 = 64.1$ |
| 9 | FFS[3] | $d_9 = 0.00$ | Eccentricity [5] | $n_3 = 1.5163$ | $v_3 = 64.1$ |
| 10 | $r_{10} = \infty$ | $d_{10} = 0.00$ | Eccentricity [6] | $n_3 = 1.5163$ | $v_3 = 64.1$ |
| 11 | $r_{11} = \infty$ | $d_{11} = 0.00$ | Eccentricity [7] | | |
| 12 | $r_{12} = \infty$ | $d_{12} = 0.00$ | | | |
| 13 | $r_{13} = \infty$ | $d_{13} = 0.00$ | Eccentricity[3] Plane 5 is Reference Point | | |
| Image Surface | ∞ | 0.00 | | | |

FFS[2]
C4  $-4.4259 \times 10^{-2}$   C6  $-2.7210 \times 10^{-3}$   C8  $2.7800 \times 10^{-3}$
C10 $-6.4788 \times 10^{-4}$ FFS[3]
C4  $4.0803 \times 10^{-2}$    C6  $-9.9992 \times 10^{-3}$   C8  $3.4188 \times 10^{-3}$
C10 $-4.1905 \times 10^{-4}$ Eccentricity [4]
X    0.00   Y   -7.25   Z   -9.89
α   -42.98  β    0.00   γ    0.00
Eccentricity [5]
X    0.00   Y   12.72   Z   -3.56
α   -17.56  β    0.00   γ    0.00
Eccentricity [6]
X    0.00   Y   20.59   Z    1.82
α   -16.00  β    0.00   γ    0.00
Eccentricity [7]
X    0.00   Y    8.80   Z   -3.51
α   134.95  β    0.00   γ    0.00

As explained above, in the present embodiment, it is possible to form a prismatic optical element 23 such that the light path separating plane 23*a*, the reflecting plane 23*b*, and the prismatic plane 23*c* be eccentric rotationally asymmetric free-form-surfaces.

EXAMPLE 6

Next, a seventh numerical data for the angle measuring device 62 according to the second embodiment which is explained above is explained with reference to FIG. 18A. Here, definitions for $r_i$, $d_i$, $n_i$, coordinate system, unit, refractive index, free-form-surface formula are the same as those explained in the example 1.

| | | Light path 1 | | | |
|---|---|---|---|---|---|
| Surface No. | Radius of Curvature | Surface Interval | Eccentricity | Refractive Index | Abbe's Number |
| Physical Surface | ∞ | $d_0 = 0.50$ | | | |
| 1 | $r_1 = \infty$ | $d_1 = 1.00$ | | $n_1 = 1.5163$ | $v_1 = 64.1$ |
| 2 | $r_2 = \infty$ | $d_2 = 0.50$ | | | |
| 3 | $r_3 = 6.90$ | $d_3 = 1.00$ | | $n_2 = 1.5163$ | $v_2 = 64.1$ |

-continued

Light path 1

| Surface No. | Radius of Curvature | Surface Interval | Eccentricity | Refractive Index | Abbe's Number |
|---|---|---|---|---|---|
| 4 | $r_4 = -6.90$ | $d_4 = 2.00$ | | | |
| 5 | $r_5 = \infty$ | $d_5 = 0.00$ | Eccentricity [1] | (Reference Point for Planes 6 to 11) | |
| 6 | Aperture Surface | $d_5 = 0.00$ | Eccentricity [2] | (Rotational Center) | |
| 7 | $r_7 = \infty$ | $d_7 = 0.00$ | Eccentricity [3] | $n_3 = 1.5234$ | $v_3 = 56.2$ |
| 8 | FFS[1] | $d_8 = 0.00$ | Eccentricity [4] | $n_3 = 1.5254$ | $v_3 = 56.2$ |
| 9 | $r_9 = \infty$ | $d_9 = 0.00$ | Eccentricity [3] | $n_3 = 1.5254$ | $v_3 = 56.2$ |
| 10 | $r_{10} = \infty$ | $d_{10} = 0.00$ | Eccentricity [5] | | |
| 11 | $r_{11} = \infty$ | $d_{11} = 0.00$ | Eccentricity [6] | | |
| Image Surface | $\infty$ | 0.00 | | | |

FFS[1]
C4  $1.3945 \times 10^{-2}$  C6  $-3.5030 \times 10^{-3}$  C8  $-2.7660 \times 10^{-3}$
C10  $-2.3003 \times 10^{-4}$ Eccentricity [1]
X   0.00   Y   0.00   Z   0.00
α   0.00   β   0.00   γ   0.00
Eccentricity [2]
X   0.00   Y   0.00   Z   2.00
α  -45.00  β   0.00   γ   0.00
Eccentricity [3]
X   0.00   Y   1.50   Z   1.00
α  90.00   β   0.00   γ   0.00
Eccentricity [4]
X   0.00   Y   2.60   Z   2.00
α -118.00  β   0.00   γ   0.00
Eccentricity [5]
X   0.00   Y   2.50   Z  -1.20
α  -40.00  β   0.00   γ   0.00
Eccentricity [6]
X   0.00   Y   2.53   Z  -2.00
α  -42.00  β   0.00   γ   0.00

Light path 2

| Surface No. | Radius of Curvature | Surface Interval | Eccentricity | Refractive Index | Abbe's Number |
|---|---|---|---|---|---|
| Physical Surface | $\infty$ | $d_0 = 0.50$ | | | |
| 1 | $r_1 = \infty$ | $d_1 = 0.50$ | | $n_1 = 1.5163$ | $v_1 = 64.1$ |
| 2 | $r_2 = \infty$ | $d_2 = 0.50$ | | | |
| 3 | $r_3 = 6.90$ | $d_3 = 1.00$ | | $n_2 = 1.5163$ | $v_2 = 64.1$ |
| 4 | $r_4 = -6.90$ | $d_4 = 2.00$ | | | |
| 5 | $r_5 = \infty$ | $d_5 = 0.00$ | Eccentricity[1] | (Reference Point of Planes 6 to 15) | |
| 6 | Aperture Surface | $d_5 = 0.00$ | Eccentricity[2] | (Rotational Center) | |
| 7 | $r_7 = \infty$ | $d_7 = 0.00$ | Eccentricity [3] | $n_3 = 1.5254$ | $v_3 = 56.2$ |
| 12 | $r_{12} = 7.00$ | $d_{12} = 0.00$ | Eccentricity[7] | | |
| 13 | $r_{13} = \infty$ | $d_{13} = 0.00$ | Eccentricity[8] | | |
| Image Surface | $\infty$ | 0.00 | | | |

Eccentricity [7]
X   0.00   Y   4.00   Z   2.00
α  90.00   β   0.00   γ   0.00
Eccentricity [8]
X   0.00   Y   4.50   Z   2.00
α  90.00   β   0.00   γ   0.00

As explained above, in the above embodiment, it is possible to form the cemented optical element 25 such that the light path separating plane 25b be a eccentric rationally-asymmetric free-form-surface, the light path of the reflected light 2a on the separating plane is folded on the incident plane 25a which serves for reflecting an entire light, and the emitting plane 25c near transmitting section having a positive power is disposed on a front stage of the light receiving plane 11a.

Here, in the third and the fourth embodiment of the present invention, explanations are made under condition that the angle measuring device according to the first and the second embodiment of the present invention is employed for the optical signal switching system and the information recording/replaying system. More importantly, the angle measuring device according to the present invention can be used for performing other angle measuring operations. For example, the angle measuring device can be used effectively for an optical wireless communication and a laser rader.

As explained above, according to the present, the angle measuring device of the present invention, it is possible to measure the inclination of the test sample under multiple measurement conditions by a compact structure. There is an effect that it is possible to improve various performance such as a reliability of the device, measurement accuracy of the inclination and measurement range for the inclination by such a multiple measurement.

Also, according to the optical signal switching system and the information recording/replaying system, there is an effect in that it is possible to improve various performances such as reliability of the system, switching characteristics, and the tracking characteristics.

According to the present invention, the light which is emitted from the light source is emitted as a plurality of light fluxes according to the inclination of the test sample by the light path separating/deviating section which can be inclined synchronously in accordance with the test sample; thus, it is possible to measure the inclination of the light fluxes by the light measuring device independently. Therefore, it is possible to measure the inclinations under multiple measurement conditions. Also, the light path between the light source and the light path separating plane is used commonly; thus, it is possible to form the device compactly. Furthermore, either of the reflected light flux or the transmitted light which is separated on the light path separating plane is reflected on the post-separation reflecting plane; therefore, it is possible to return the light path so as to dispose the light measuring device in a preferable position.

According to the present invention, the light path of the light which is reflected on the reflecting plane for measurement is separated by the light path separating section so as to measure the inclination of each light path by a plurality of light measuring devices independently; therefore, it is possible to measure the inclination of the test sample by a plurality of light measuring devices simultaneously under multiple measuring conditions. The light separating plane or other optical plane are formed so as to have power; therefore, it is possible to dispose the light measuring device in a preferable position. In addition, an eccentric optical plane is formed so as to have power; therefore, it is possible to adjust movement of the light flux and diameter of the light flux on the light receiving plane of the light measuring device; thus, it is possible to change sensitiveness for measuring the angles and range for measuring the angles easily.

According to the present invention, the movement amount of the light flux on the light receiving plane of each light measuring device according to the inclination of the test sample varies; therefore, it is possible to differentiate the sensitiveness for measuring angles and range for measuring the angles on each light measuring device. Also, by using light measuring devices having different size of the light receiving planes, it is possible to use each light receiving plane efficiently.

According to the present invention, it is possible to vary a ratio of the outputs on the light receiving planes by changing the diameters of the light fluxes on the light receiving planes on a plurality of light measuring devices; thus, it is possible to differentiate the sensitiveness for measuring the angles and the range for measuring the angles in the light receiving device.

According to the present invention, the sensitiveness for measuring the angle in light measuring devices are different from each other; therefore, it is possible to obtain a measurement output in which the difference of sensitiveness for measuring angle is great easily by combining the movement amount of a plurality of the light fluxes and the diameter of the light flux.

According to the present invention, the ranges for measuring the angles in a plurality of the light receiving devices are different from each other; thus, it is possible to obtain a measurement output in which the difference of sensitiveness for measuring angle is great easily by combining the movement amount of a plurality of the light fluxes and the diameter of the light flux.

According to the present invention, the light receiving planes in a plurality of the light measuring devices are disposed so as to be close each other; therefore, it is possible to form devices compactly.

According to the present invention, the light receiving devices are disposed on an approximately the same plane, it is possible to form devices compactly. Also, it is possible to dispose the devices easily; thus, it is possible to manufacture the devices because it is possible to arrange the layout of the devices easily.

According to the present invention, the light paths of a plurality of the emitted light fluxes between the light path separating plane and the light receiving plane are different from each other; thus, it is possible to differentiate the movement amounts of the light fluxes on the light receiving planes which correspond to the inclination of the test sample from each other. As a result, it is possible to vary the sensitiveness for measuring angles respectively.

According to the present invention, at least an optical planes among a plurality of optical planes in the light path separating/deviation planes or the light path separating sections has a power; therefore, it is possible to condense the light fluxes which are emitted from the light path separating/deviating section or the light path separating plane and change the movement amount and the diameters of the light fluxes on a plurality of the light receiving planes.

According to the present invention, the optical planes having power for condensing the light fluxes are formed, not by transmitting planes such as a biconvex lens, but by reflecting planes; therefore, it is possible to set a plane having smaller curvature than that of a convex lens. Therefore, it is possible to prevent an occurrence of a curvature of image; thus, it is possible to perform an accurate measurement in which a difference of the spot diameters between a center of the light receiving plane and an end section of the light receiving plane is small.

According to the present invention, an optical planes having power is disposed eccentrically, it is possible to condense the light fluxes and fold the light path desirably. Therefore, it is possible to dispose the optical planes and the light receiving planes more freely; thus, it is possible to form devices compactly. Also, it is possible to design the movement amounts of the light fluxes and the diameter of the light fluxes on the light receiving planes adequately by setting the power appropriately; thus, it is possible to improve accuracy for measuring angles.

According to the present invention, the light path separating plane is formed as an eccentric optical plane; thus, it is possible to condense the light flux and dispose the light path in a desirable direction. Therefore, it is possible to dispose the optical planes and the light receiving planes more freely; thus, it is possible to form the devices compactly. Also, it is possible to set the movement amount of the light flux and the diameter of the light flux on the light receiving plane by setting the power preferably. Also, it is possible to improve accuracy for measuring the angles. Also, a main power is disposed on the light path separating plane; thus, it is possible to reduce the optical planes and divide the power; thus, it is possible to reduce a cost for manufacturing the device and reduce aberration.

According to the present invention, it is possible to condense a plurality of light fluxes and realize a movement amount of the light flux and the diameter of the light flux on the light receiving plane such that it is possible to obtain the accuracy for measuring the angles and range for measuring the angles in a plurality of the light measuring devices according to the requirement by setting the positive power preferably.

According to the present invention, aspherical optical planes having power is provided; thus, it is possible to correct spherical aberration and a comatic aberration by a fewer number of optical planes. Therefore, it is possible to improve the diameter of a plurality of the light fluxes and optical characteristics of a plurality of the light fluxes on the light receiving planes.

According to the present invention, freely-formed optical planes having power are provided; it is possible to reduce aberrations. Thus, it is possible to improve the optical characteristics. In particular, it is possible to desirably correct the aberration which is typically caused in an asymmetric eccentric optical systems by providing a rotationally asymmetric free-form-surface so as to vary the curvature and the inclination of the optical planes within an effective diameter. Also, if a reflection plane is formed in a free-form-surface, it is possible to correct aberration more effectively. Furthermore, if an optical plane having a power is formed in an eccentric optical plane having a power, it is possible to prevent an occurrence of the eccentric aberration.

According to the present invention, it is possible to condense a radiated light from the light source; therefore, it is possible to improve efficiency for using the light which is incident into the light path separating/deviating section or the light path separating plane. Also, it is possible to set the diameter of the light flux on the light receiving plane in the light receiving device preferably. Furthermore, if there is other optical plane having the power, it is possible to reduce the distribution of the power on the optical plane.

According to the present invention, it is possible that the light fluxes have different powers respectively by the optical plane having the power which is disposed in the light path of the reflected light flux and the transmitted light flux; thus, it is possible to differentiate the movement amounts and the diameters of the light fluxes on the light receiving plane from each other. Also, an optical plane having power is disposed between the light source and the light path separating plane; therefore, it is possible to disperse the power for realizing desirable movement amounts and the diameters of the light fluxes on the light receiving planes. Therefore, it is possible to restrict an occurrence of aberration.

Also, it is preferable to form the optical plane having power between the light source and the light path separating plane so as to be a rotationally symmetric plane, by doing this, it is possible to reduce occurrence of the eccentric aberrations more effectively by distributing the power by such a rotationally symmetric surface to a great extent.

According to the present invention, it is possible to fold the light path in a zigzag manner by using two reflecting planes; thus, it is possible to form the device compactly. Here, it should be understood that the zigzag manner indicates a condition under which a plurality of patterns having a "Z" letter shape or "W" letter shape is repeated geometrically.

According to the present invention, the reflecting plane reflects entire incident light; therefore, there is no loss of a light amount. Thus, it is possible to improve usage ratio for using the light. There is not a transmitted light on the reflecting plane; thus, it is possible to prevent a stray light such as a flare which is caused by the transmitted light.

According to the present invention, the optical plane is formed by a prismatic member; it is possible to dispose the optical plane accurately and easily by using other surface of the prismatic member as a reference plane for assembling operation even if the optical plane is disposed eccentrically. Also, the refractive index in the prismatic member is 1 (one) or greater; therefore, it is possible to form the optical plane which reflects entire light flux in the prismatic member easily.

According to the present invention, the optical planes are formed unitarily with the prismatic member; it is not necessary to adjust the position of the optical planes respectively by forming other optical plane around an outer periphery of a singular glass member; thus, it is possible to reduce the number of the member for the device. Furthermore, it is possible to form the light path separating/deviating section or the light path separating plane unitarily with the prism; thus, it is not necessary to cement the optical elements; therefore, it is possible to improve operability in the manufacturing processes.

According to the present invention, a beam splitter is used. Therefore, the beam splitter serves as an optical plane for separating the light path. Therefore, it is possible to set the deviated direction of the transmitted light and the reflected light desirably; thus, it is possible to optimize the ratio for the light amount by varying the designed conditionfor the coating operation. Here, for such an optimal ratio, for example, it is possible to mention to factors which relate to a usage efficiency for the light amount in a plurality of the measuring devices.

According to the present invention, the light path is separated according to the deviation component; thus, it is possible to perform the separation and the deviation of the light path. Also, it is possible to equalize the post-separation deviation component. Therefore, it is possible to form the device such that the reflection ratio and the transmission ratio on the post-separation optical plane be optimal according to the eccentric component. As a result, it is possible to reduce a loss for the light amount. According to the present invention, an eccentric beam splitter is used; thus, it is possible to form an eccentric separating plane easily.

According to the present invention, a four-divided light receiving device is used; therefore, it is possible to measure a relational change under a two-dimensional condition according to the change in the output which is calculated according to the light flux spot on the four-divided light receiving plane accurately. Therefore, it is possible to measure the angle around two axes; thus, it is possible to measure the inclination under a two-dimensional condition.

According to the present invention, a two-dimensional position measuring device is used; it is possible to measure a simple analogue signal for two-dimensional position according to the center of the light amount of the spot of the light flux on the light receiving plane. Thus, it is possible to measure the angle around the two axes in the measurement range according to an area of the light receiving plane. Thus, it is possible to measure a broad range of the inclination under two-dimensional condition.

According to the present invention, a two-dimensional CCD is used. Therefore, if the spot diameter on the light receiving plane is small, it is possible to measure the inclination under the two-dimensional condition easily according to the position of the spot diameter. If the spot diameter on the light receiving plane has a random area, it is possible to extract the distribution of the light amount of the spot as an output; therefore, it is possible to measure the central position of the spot of the light flux by performing a preferable processing operation for the signals. As a result, it is possible to measure the angle around the two axes in a measurement range according to the area of the light receiving plane. Thus, it is possible to measure the broad range of the inclination under the two-dimensional condition. In such a case, it is possible to eliminate stray lights such as a flare which are overlapping which can be a noise for the measurement by performing an appropriate processing operation for the signals. Therefore, it is possible to measure the angle under a high S/N ration condition.

According to the present invention, it is possible to measure the inclination under the two-dimensional condition easily and accurately by using the four-divided light receiving device having a high measurement sensitiveness without using an expensive measuring device such as a position measuring light receiving device or a CCD.

According to the present invention, a four-divided light receiving device having a narrow measurement range and a high sensitiveness and a two-dimensional CCD which can measure a broad range are used. Therefore, it is possible to measure the inclination under the two-dimensional condition accurately and easily without using an expensive light measuring device by performing a rough measurement for the angle by using a low price CCD instead of an expensive CCD having fine specification so as to measure the accurate value by the four-divided light receiving device. That is, it is possible to perform both a high sensitive angle measurement and a broad range of angle measurement under multiple measuring conditions.

According to the present invention, a laser is used for a light source in which chromatic aberration does not occur and it is possible to realize a desirable focusing characteristics; therefore, it is possible to form a light flux diameter having a superior measurement accuracy on the light receiving plane of the light receiving device.

According to the present invention, a light deviating element is used for a test sample and an angle measuring device is provided so as to measure the deviated angle of the test sample. Therefore, it is possible to form an optical signal switching system having functions and effects which are realized by such an angle measuring device. Furthermore, the reflecting plane for measurement is provided unitarily with the light deviating element; thus, the number of the members for the device can be reduced, and it is possible to improve operability in the assembling operations. Thus, the device can be compact, and it is possible to reduce the manufacturing cost for the device. Also, every angle measuring device is provided with a plurality of light measuring devices which can measure angles independently; thus, it is possible to improve the reliability of the device while using one of those light measuring devices for a backup purpose so as to realize a multiple measuring condition and measure the angle while varying the accuracy for measuring the angle.

According to the present invention, a light deviating element is used for a test sample and an angle measuring device is provided so as to measure the deviated angle of the test sample. Therefore, it is possible to form an information recording/replaying system having functions and effects which are realized by such an angle measuring device. Therefore, it is possible to form the device which is provided with a plurality of light measuring devices in which every angle measuring device can measure the angle independently. Thus, it is possible to form the information recording/replaying system compactly. Also, it is possible to improve the reliability of the device while using one of those light measuring devices for a backup purpose so as to realize a multiple measuring condition and measure the angle while varying the accuracy for measuring the angle.

What is claimed is:

1. An angle measuring device which measures an inclination angle of a test sample comprising:

a light source for emitting a light;

a light separating/deviating section which is disposed so as to be tilted in coordination with an inclination angle of the test sample and provided with a plurality of optical planes including an optical path separating plane for separating a light into a reflected light flux and a transmitted light flux and a reflecting plane for reflecting any one of the separated light which is separated on the optical path separating plane so as to emit a plurality of light flux formed by a light which is incident from the light source; and a plurality of light measuring device which receive a plurality of the light flux which are emitted from the optical path separating/deviating section so as to measure the inclination angles of the test samples independently.

2. An angle measuring device which measures an inclination angle of a test sample comprising:

a light source for emitting a light toward a reflecting plane for a measurement which is provided on the test sample;

a light separating section having a plurality of optical planes as an eccentric optical plane in which any one of optical planes, which has refractive power, is disposed eccentrically including an optical path separating plane for separating a light into a reflected light flux and a transmitted light flux so as to emit a plurality of light flux after the light reflected in respect of the reflecting plane for a measurement carries out incidence; and a plurality of light measuring device which receive a plurality of the light flux which are emitted from the optical path separating/deviating section so as to measure the inclination angles of the test samples independently.

3. An angle measuring device according to claim 1 or 2 wherein movements of the light flux on light-receiving-planes on a plurality of the optical measuring devices which correspond to delta of the inclination angle the test sample are different from each other.

4. An angle measuring device according to claim 1 or 2 wherein diameters in the light flux on the light-receiving planes in a plurality of the light measuring devices are different from each other.

5. An angle measuring device according to claim 1 or 2 wherein sensitiveness for measuring angles by a plurality of the light measuring devices are different from each other.

6. An angle measuring device according to claim 1 or 2 wherein ranges for measuring angles by a plurality of light measuring devices are different from each other.

7. An angle measuring device according to claim 1 or 2 wherein a light-receiving plane which is randomly selected among a plurality of light measuring devices is disposed near one of the rest of the light-receiving planes.

8. An angle measuring device according to claim 1 or 2 wherein the light-receiving planes of a plurality of the light measuring devices are disposed on an approximate plane.

9. An angle measuring device according to claim 1 or 2 wherein lengths of optical paths are different from each other between the length of the optical path between the light-receiving plane of the light measuring device in an optical path which is reflected on the light separating pane and directed toward the light measuring device and the light path separating plane and the length of the optical path between the light-receiving plane of the light receiving device in a light path which is directed toward the other light measuring device in the light measuring device after transmitted through the light path separating plane and the light path separating plane.

10. An angle measuring device according to claim 1 or 2 wherein at least an optical plane among a plurality of the optical planes has a power.

11. An angle measuring device according to claim 10 wherein the optical plane having a power is a reflective plane.

12. An angle measuring device according to claim 10 wherein the optical plane having a power is an eccentric optical plane which is disposed eccentrically.

13. An angle measuring device according to claim 10 wherein the light path separating plane is an eccentric optical plane in which an optical plane having a power is disposed eccentrically.

14. An angle measuring device according to claim 10 wherein the optical plane having a power has a positive power.

15. An angle measuring device according to claim 10 wherein the optical plane having a power is an aspherical plane.

16. An angle measuring device according to claim 10 wherein the optical plane having a power is a free-form-surface.

17. An angle measuring device according to claim 1 or 2 wherein an optical element having a positive power for condensing a light which is emitted from the light source between the light source and the light separating plane.

18. An angle measuring device according to claim 14 wherein the optical plane having a power is disposed between the light source, the optical plane having a power is disposed in a light path of a reflected light flux, and the optical plane having a power is disposed in a light path of the transmitted light flux.

19. An angle measuring device according to claim 1 or 2 wherein at least two optical planes among a plurality of the optical planes are disposed so as to face each other approximately such that the optical path may be folded in a zigzag manner.

20. An angle measuring device according to claim 1 or 2 wherein at least an optical plane among a plurality of the optical planes is a reflecting plane so as to reflect entire light which is incident to the reflecting plane.

21. An angle measuring device according to claim 1 or 2 wherein at least an optical plane among a plurality of the optical planes is formed by a prism member.

22. An angle measuring device according to claim 21 wherein a plurality of the optical planes are formed so as to be united to the prism member.

23. An angle measuring device according to claim 1 or 2 wherein the light path separating plane is formed by a beam splitter.

24. An angle measuring device according to claim 1 or 2 wherein the light separating plane is formed by a light deviating/separating plane for separating the light path by a deviating component.

25. An angle measuring device according to claim 24 wherein the light deviating/separating plane is formed by a light deviating beam splitter.

26. An angle measuring device according to claim 1 or 2 wherein at least a light measuring device among a plurality of the light measuring devices is a four-divided light receiving device which is provided with a light receiving plane which is divided into four sections.

27. An angle measuring device according to claim 1 or 2 wherein at least a light measuring device among a plurality of the light measuring devices is a two-dimensional position detecting light receiving device.

28. An angle measuring device according to claim 1 or 2 wherein at least a light measuring device among a plurality of the light measuring devices is a two-dimensional CCD.

29. An angle measuring device according to claim 1 or 2 wherein a plurality of the light measuring devices include a four-divided light receiving device which is provided with a light receiving plane which is divided into four sections and a two-dimensional position detecting light receiving device.

30. An angle measuring device according to claim 1 or 2 wherein a plurality of the light measuring devices include a four-divided light receiving device which is provided with a light receiving plane which is divided into four sections and a two-dimensional CCD.

31. An angle measuring device according to claim 1 or 2 wherein the light source is a laser light source.

32. An optical signal switching system for switching a light path for an optical signal which is transmitted from a light transmission path to other light transmission path among a plurality of the light transmission paths comprising:
a light deviating element for switching a light path for the optical signal;
a reflecting plane which is disposed to the light deviating element unitarily for measuring a deviating angle in the light deviating element;
an angle measuring device according to claim 31 for measuring a deviated angle of a test sample such as a light deviating element; and
a deviating angle measuring device for controlling the deviated angle of the light deviating element according to the deviated angle which is measured by the angle measuring device.

33. An information recording/replaying system which performs a recording operation and/or a replaying operation of the information signal on a recording medium having a recording plane on which the recording operation and/or the replaying operation can be operated by emitting a light comprising:
a light source;
an optical system in which a light flux is focused on the recording plane on the recording medium;
a light deviating element which is provided with a reflecting plane for a measurement which is disposed in the optical system so as to deviate the light flux in a surface parallel with the recording plane and change an inclination angle of the reflecting plane synchronously according to the deviated angle; and
an angle measuring device according to claim 31 for measuring an inclination of the test sample such as the light deviating element.

* * * * *

UNITED STATES PATENT AND TRADEMARK OFFICE
CERTIFICATE OF CORRECTION

PATENT NO.         : 7,113,269 B2
APPLICATION NO. : 10/740554
DATED                  : September 26, 2006
INVENTOR(S)        : Junko Takahashi et al.

It is certified that error appears in the above-identified patent and that said Letters Patent is hereby corrected as shown below:

Column 10, line 67, change "the prism 7 the" to --the prism 7. The--;

Column 34, line 35, change "Here, Cj indicates" to --Here, $C_j$ ($_j$ indicates--;

Column 41, line 1, delete "Light path 1 header";

Column 51, line 64, change "be a eccentric rationally" to --be an eccentric rotationally-- and Column 56, line 50, at "According to the present" begin new paragraph.

Signed and Sealed this

Twentieth Day of February, 2007

JON W. DUDAS
*Director of the United States Patent and Trademark Office*